(12) United States Patent
Shibata et al.

(10) Patent No.: US 10,437,026 B2
(45) Date of Patent: *Oct. 8, 2019

(54) ZOOM LENS SYSTEM, IMAGING APPARATUS, AND METHOD FOR ZOOMING THE ZOOM LENS SYSTEM

(71) Applicant: NIKON CORPORATION, Chiyoda-ku, Tokyo (JP)

(72) Inventors: Satoru Shibata, Yokohama (JP); Takeshi Suzuki, Yokohama (JP); Hiroshi Yamamoto, Kawasaki (JP)

(73) Assignee: Nikon Corporation, Tokyo (JP)

( * ) Notice: Subject to any disclaimer, the term of this patent is extended or adjusted under 35 U.S.C. 154(b) by 530 days.

This patent is subject to a terminal disclaimer.

(21) Appl. No.: 14/092,748

(22) Filed: Nov. 27, 2013

(65) Prior Publication Data

US 2014/0085732 A1 Mar. 27, 2014

Related U.S. Application Data

(63) Continuation of application No. 13/545,651, filed on Jul. 10, 2012, now abandoned, which is a (Continued)

(30) Foreign Application Priority Data

Jul. 21, 2006 (JP) .................................. 2006-199860
Dec. 19, 2006 (JP) .................................. 2006-341590
(Continued)

(51) Int. Cl.
*G02B 15/14* (2006.01)
*G02B 13/04* (2006.01)
(Continued)

(52) U.S. Cl.
CPC ............. *G02B 13/04* (2013.01); *G02B 13/18* (2013.01); *G02B 15/14* (2013.01); *G02B 15/177* (2013.01); *G02B 27/646* (2013.01)

(58) Field of Classification Search
CPC ........ G02B 15/00; G02B 15/14; G02B 15/15; G02B 15/16; G02B 15/177; G02B 15/20; G02B 27/64; G02B 27/646
See application file for complete search history.

(56) References Cited

U.S. PATENT DOCUMENTS 4,591,235 A * 5/1986 Tokumaru ............ G02B 15/177
                                                              359/680
5,000,550 A * 3/1991 Takahashi ............. G02B 15/22
                                                              359/680

(Continued)

FOREIGN PATENT DOCUMENTS

JP     63-281113     11/1988
JP      2-136812      5/1990
(Continued)

OTHER PUBLICATIONS

Extended European Search Report and Opinion from European Patent Appln. No. 08252182, dated Jan. 15, 2009.
(Continued)

*Primary Examiner* — Thong Q Nguyen
(74) *Attorney, Agent, or Firm* — Shapiro, Gabor and Rosenberger, PLLC

(57) ABSTRACT

Providing a zoom lens system having excellent optical performance with a high zoom ratio, an imaging apparatus, and a method for zooming the zoom lens system. The system including, in order from an object, a first group G1 having negative refractive power, a second group G2 having positive refractive power, a third group G3 having negative refractive power, and a fourth group G4 having positive refractive power. An aperture stop S is disposed between the
(Continued)

second group G2 and the fourth group G4. Upon zooming from a wide-angle end state to a telephoto end state, each group is moved such that a distance between the second group G2 and the third group G3 increases, a distance between the third group G3 and the fourth group G4 decreases, and the aperture stop S is moved together with the third group G3. Given conditions are satisfied.

24 Claims, 49 Drawing Sheets

Related U.S. Application Data continuation of application No. 13/090,936, filed on Apr. 20, 2011, now abandoned, which is a continuation of application No. 12/303,305, filed as application No. PCT/JP2007/064300 on Jul. 12, 2007, now abandoned.

(30) Foreign Application Priority Data

| Dec. 25, 2006 | (JP) | ................................. 2006-347841 |
| Jul. 5, 2007 | (JP) | ................................. 2007-177530 |
| Jul. 5, 2007 | (JP) | ................................. 2007-177540 |

(51) Int. Cl.
  *G02B 13/18* (2006.01)
  *G02B 15/177* (2006.01)
  *G02B 27/64* (2006.01)

(56) References Cited

U.S. PATENT DOCUMENTS

| 5,329,401 | A | | 7/1994 | Sato |
| 5,517,361 | A | | 5/1996 | Inadome et al. |
| 5,585,970 | A | | 12/1996 | Shibayama |
| 5,774,267 | A | | 6/1998 | Kodama et al. |
| 5,805,351 | A | | 9/1998 | Hayashi |
| 5,835,272 | A | | 11/1998 | Kodama |
| 5,847,875 | A | | 12/1998 | Kodama et al. |
| 5,914,820 | A | | 6/1999 | Takimoto et al. |
| 5,963,377 | A | * | 10/1999 | Okada ............... G02B 15/177 359/663 |
| 5,999,329 | A | | 12/1999 | Ohtake |
| 6,317,271 | B1 | * | 11/2001 | Sensui ............... G02B 15/177 359/680 |
| 6,320,698 | B1 | | 11/2001 | Suzuki |
| 6,618,198 | B1 | | 9/2003 | Endo |
| 6,639,721 | B2 | * | 10/2003 | Endo ............... G02B 15/177 359/566 |
| 6,710,931 | B1 | * | 3/2004 | Misaka ............... G02B 15/177 359/676 |
| 6,989,939 | B2 | | 1/2006 | Yamasaki et al. |
| 7,075,730 | B2 | | 7/2006 | Nishimura |
| 7,102,829 | B2 | | 9/2006 | Nishimura |
| 7,106,520 | B2 | | 9/2006 | Saori |
| 7,126,758 | B2 | | 10/2006 | Fujimoto et al. |
| 7,126,759 | B2 | | 10/2006 | Sensui |
| 7,196,852 | B2 | | 3/2007 | Nishimura |
| 7,230,772 | B2 | * | 6/2007 | Saori ............... G02B 15/177 359/676 |
| 7,382,550 | B2 | | 6/2008 | Nishimura |
| 7,443,604 | B2 | | 10/2008 | Nishimura |
| 7,453,642 | B2 | | 11/2008 | Fujimoto et al. |
| 2005/0013015 | A1 | | 1/2005 | Sensui |
| 2005/0036207 | A1 | | 2/2005 | Yamasaki et al. |
| 2005/0063069 | A1 | | 3/2005 | Nishimura |
| 2005/0275949 | A1 | | 12/2005 | Fujimoto et al. |
| 2005/0286139 | A1 | | 12/2005 | Nishimura |
| 2006/0061873 | A1 | | 3/2006 | Saori |
| 2006/0203356 | A1 | | 9/2006 | Fujimoto et al. |
| 2007/0070517 | A1 | | 3/2007 | Harada |
| 2007/0223105 | A1 | | 9/2007 | Sensui |
| 2009/0002841 | A1 | | 1/2009 | Yamamoto |

FOREIGN PATENT DOCUMENTS

| JP | 04-235514 A | 8/1992 |
| JP | 04-235515 | 8/1992 |
| JP | 05-134184 A | 5/1993 |
| JP | 05-313065 | 11/1993 |
| JP | 06-180423 | 6/1994 |
| JP | 07-152002 | 6/1995 |
| JP | 07-287168 A | 10/1995 |
| JP | 08-106048 | 4/1996 |
| JP | 9-113808 A | 5/1997 |
| JP | 09-211323 | 8/1997 |
| JP | 10-020192 A | 1/1998 |
| JP | 10-039210 | 2/1998 |
| JP | 10-133106 A | 5/1998 |
| JP | 10-253885 A | 9/1998 |
| JP | 11-174329 A | 7/1999 |
| JP | 2001-116992 | 4/2001 |
| JP | 2001-183585 A | 7/2001 |
| JP | 2001-215410 A | 8/2001 |
| JP | 2003-215455 A | 7/2003 |
| JP | 2004-061910 A | 2/2004 |
| JP | 2004-212541 A | 7/2004 |
| JP | 2004-240038 A | 8/2004 |
| JP | 2004-246043 A | 9/2004 |
| JP | 2004-354980 A | 12/2004 |
| JP | 2005-049843 | 2/2005 |
| JP | 2005-92056 A | 4/2005 |
| JP | 2005-106948 A | 4/2005 |
| JP | 2005-107036 | 4/2005 |
| JP | 2005-352057 A | 12/2005 |
| JP | 2006-039531 A | 2/2006 |
| JP | 2006-098961 | 4/2006 |
| JP | 2006-113573 A | 4/2006 |
| JP | 2006-208889 A | 8/2006 |
| JP | 2007-078834 | 3/2007 |
| JP | 2007-093976 | 4/2007 |
| WO | WO 2008/010563 | 1/2008 |

OTHER PUBLICATIONS

Notification of Reason for Refusal issued in Japanese Patent Application No. 2007-177540, dated May 1, 2012.
Extended European Search Report and Opinion from European Patent Appln. No. 07791042.0, dated May 11, 2012.
Office Action (Communication pursuant to Article 94(3) EPC) dated Jul. 9, 2018, in European Patent Application No. 07791042.0.
Office Action dated May 20, 2019, in European Patent Application No. 07791042.0.
Nakai et al., "Research on multi-layer diffractive optical elements and their application to camera lenses," Diffractive Optics and Micro Optics (DOMO), Tuscon, Arizona, Jan. 1, 2002, p. DMA2.

* cited by examiner

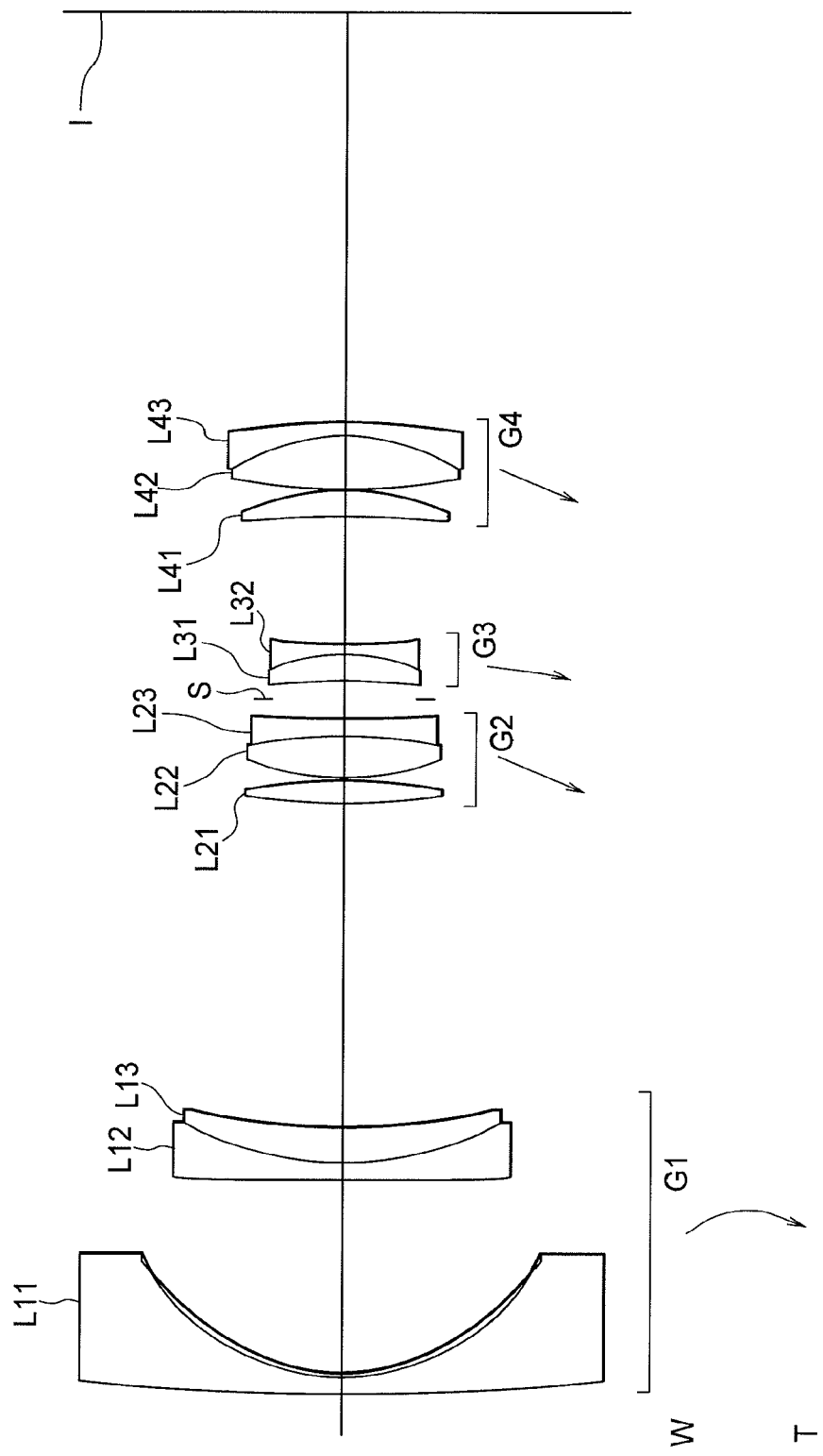

FIG. 2A
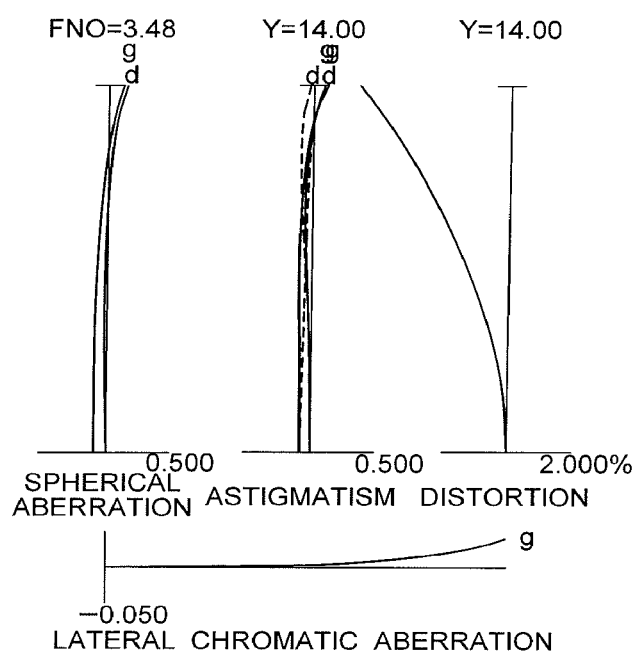
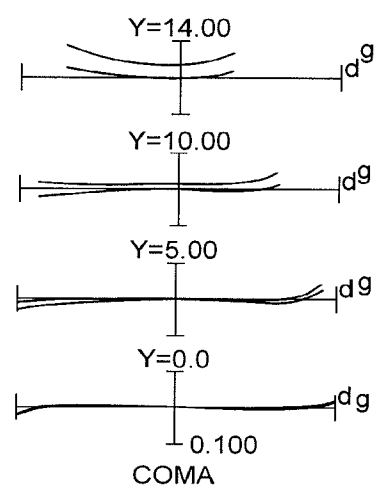
FIG. 2B
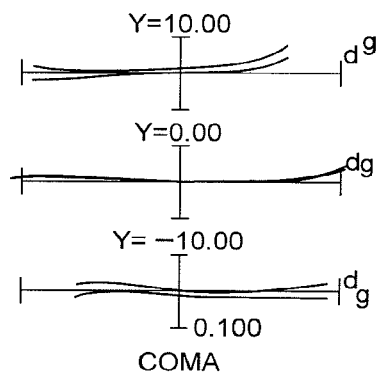

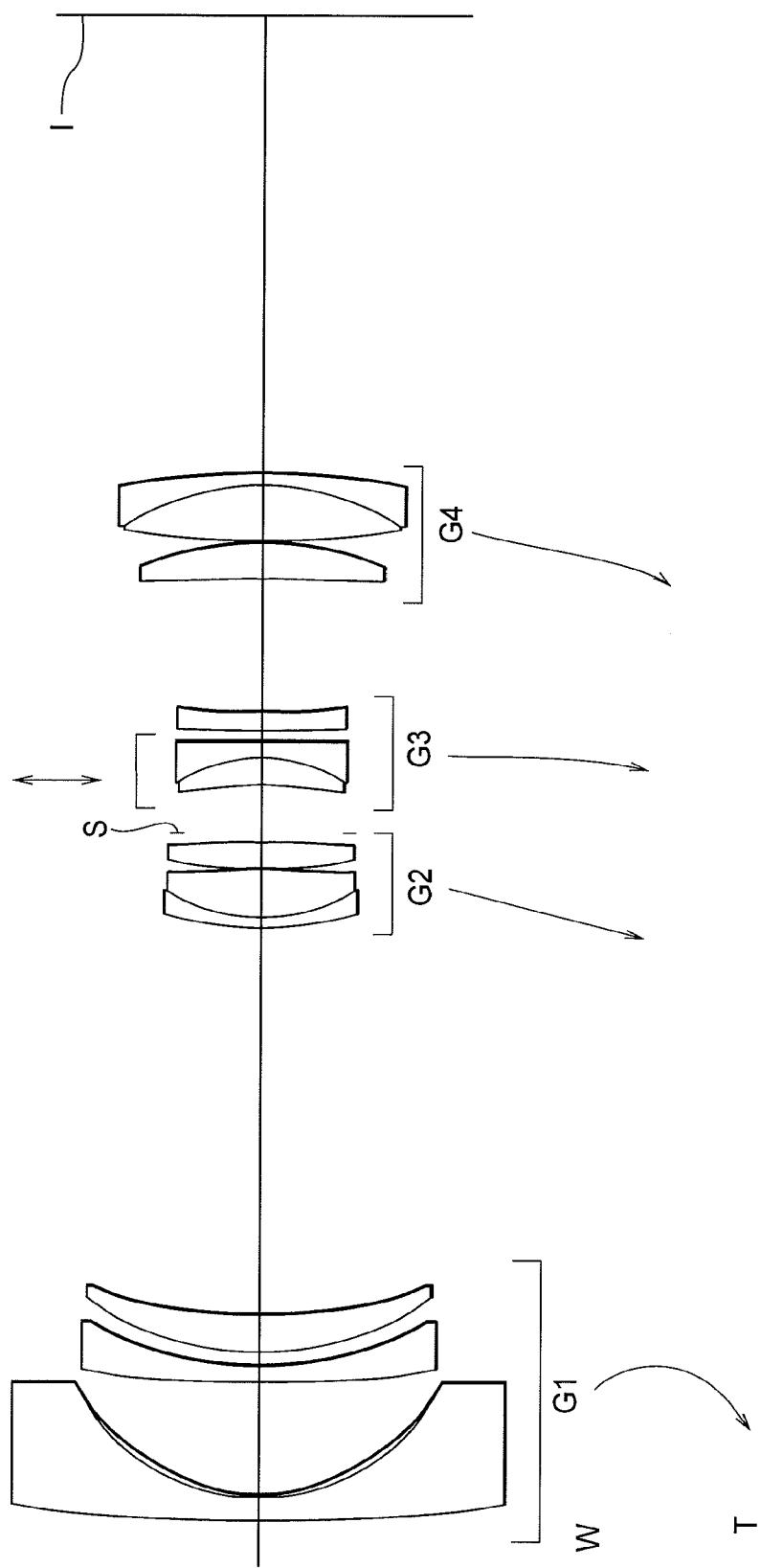

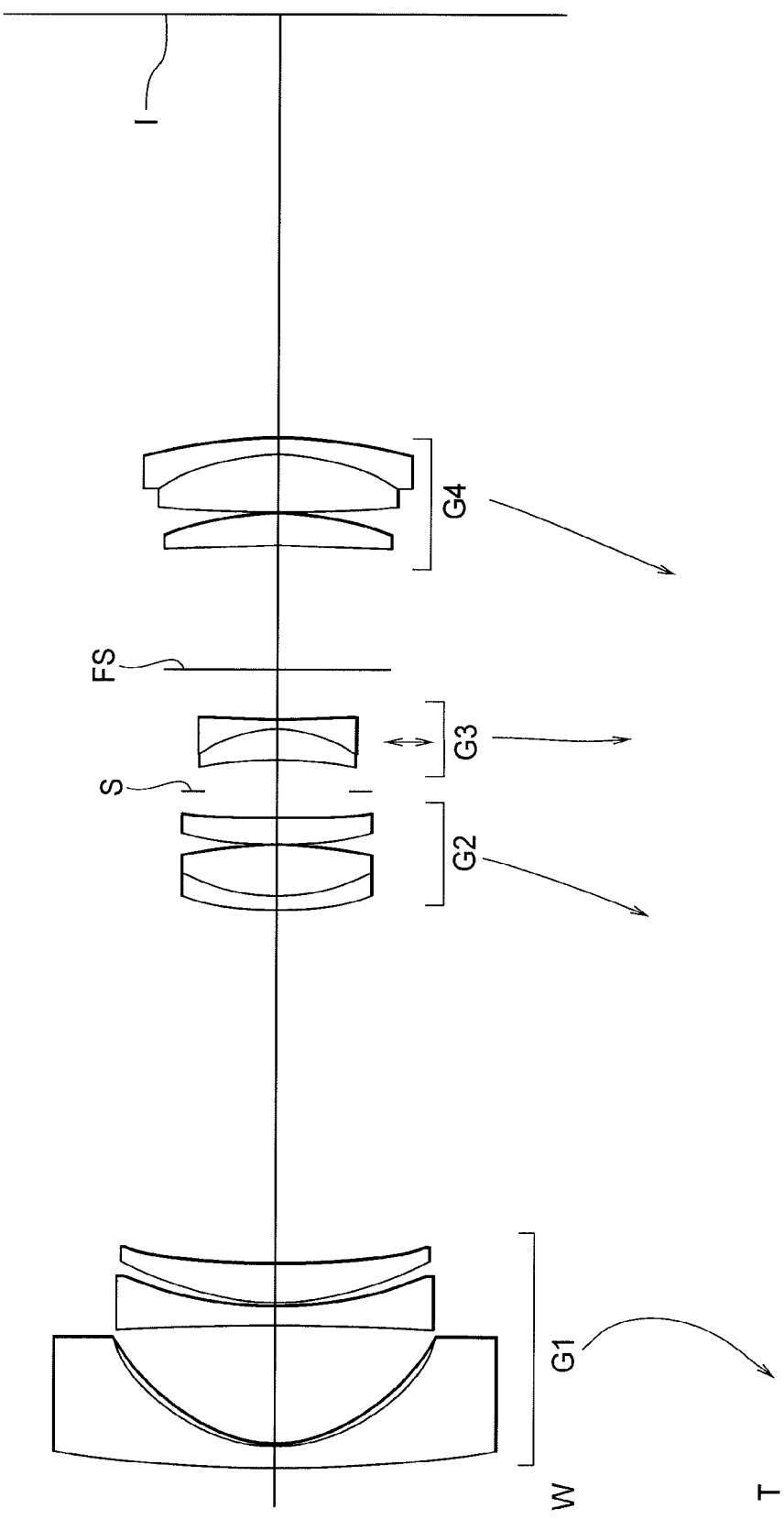

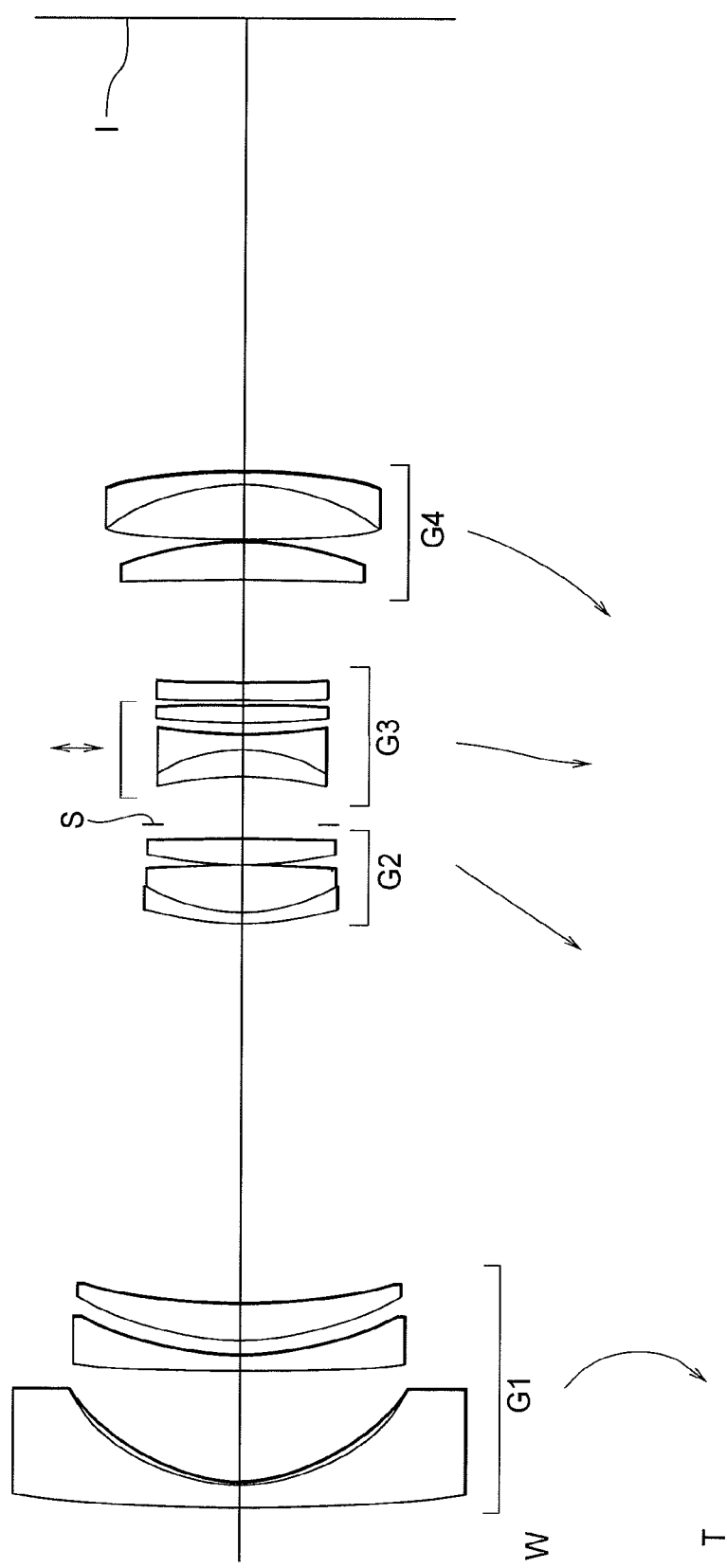

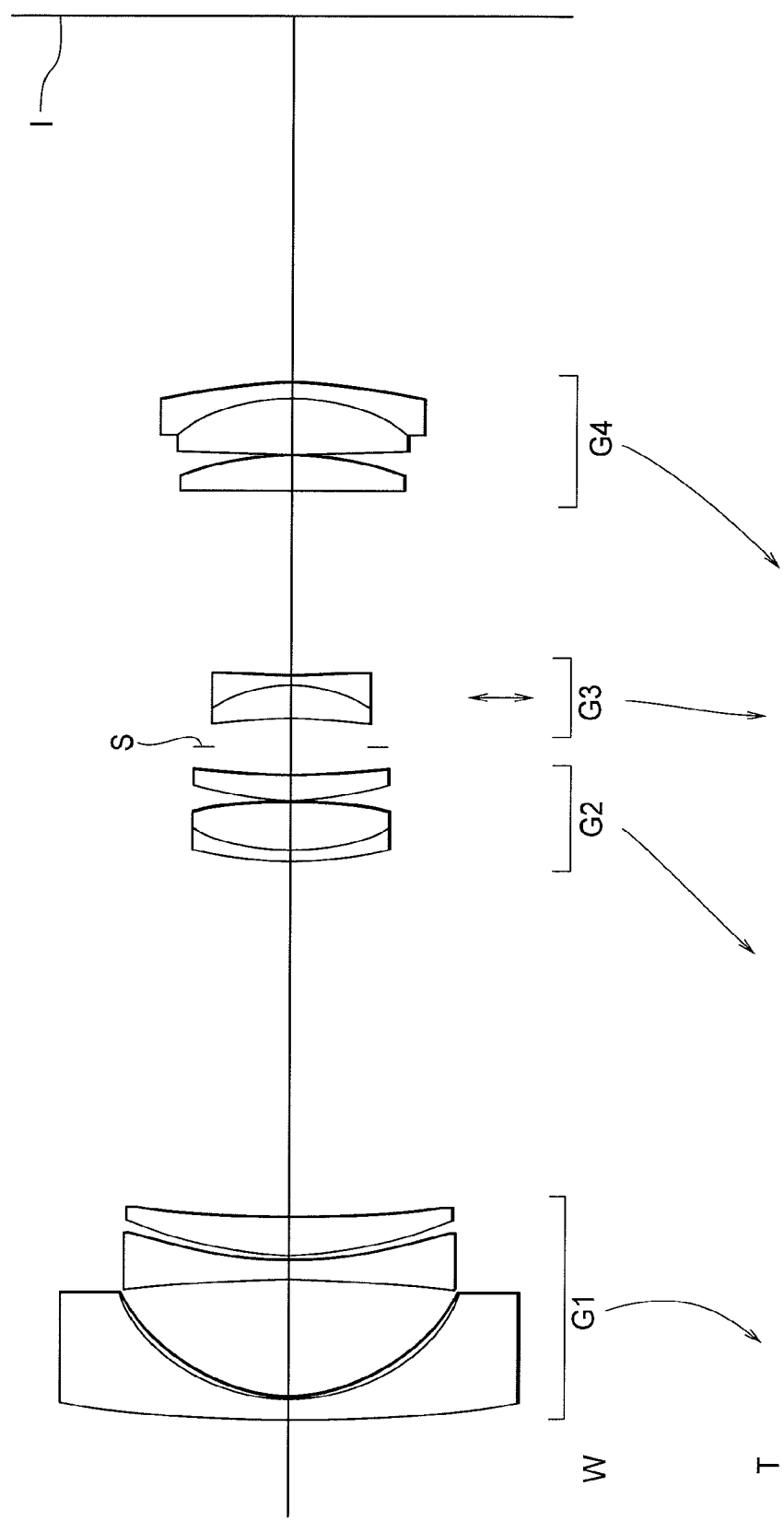

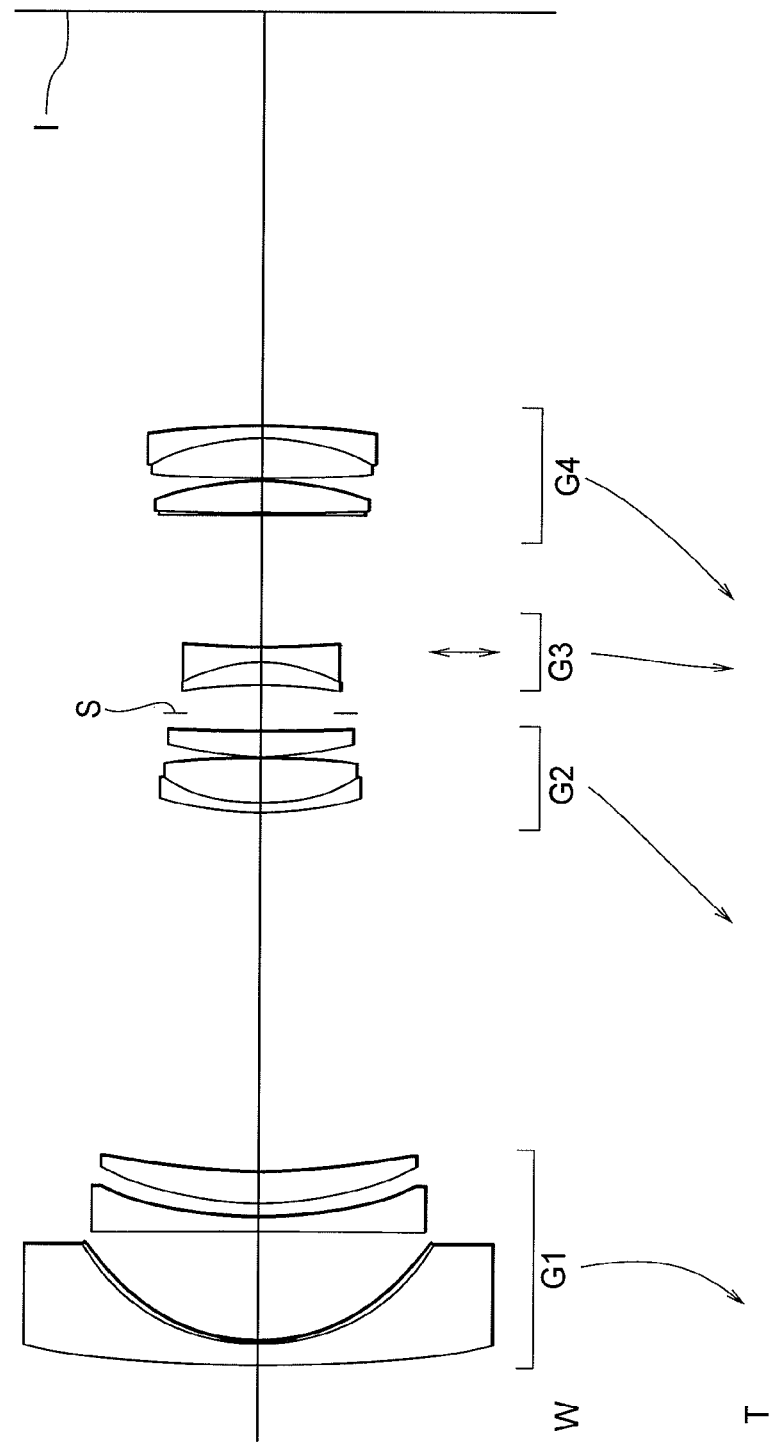

ZOOM LENS SYSTEM, IMAGING APPARATUS, AND METHOD FOR ZOOMING THE ZOOM LENS SYSTEM

TECHNICAL FIELD

The present invention relates to a zoom lens system, an imaging apparatus and a method for zooming the zoom lens system.

BACKGROUND ART

A zoom lens system suitable for a film camera, an electronic still camera, and a video camera has been proposed (for example, Japanese Patent Application Laid-Open Nos. 2004-61910, and 11-174329).

However, conventional zoom lens system has a zoom ratio of about two, so that a requirement for a high zoom ratio cannot be sufficiently satisfied. Moreover, since the position of an aperture stop is not optimized, excellent optical performance cannot be accomplished.

SUMMARY OF THE INVENTION

The present invention is made in view of the aforementioned problems and has an object to provide a zoom lens system having excellent optical performance with a high zoom ratio, an imaging apparatus, and a method for zooming the zoom lens system.

According to a first aspect of the present invention, there is provided a zoom lens system comprising, in order from an object: a first lens group having negative refractive power; a second lens group having positive refractive power; a third lens group having negative refractive power; and a fourth lens group having positive refractive power; an aperture stop being disposed between the second lens group and the third lens group, upon zooming from a wide-angle end state to a telephoto end state, each lens group being moved such that a distance between the second lens group and the third lens group varies, and a distance between the third lens group and the fourth lens group varies, and the aperture stop being moved together with the third lens group, and the following conditional expressions (1) and (2) being satisfied:

$$1.20 < f2/fw < 2.50 \quad (1)$$

$$-2.10 < f3/fw < -0.80 \quad (2)$$

where f2 denotes a focal length of the second lens group, f3 denotes a focal length of the third lens group, and fw denotes a focal length of the zoom lens system in the wide-angle end state.

According to a second aspect of the present invention, there is provided an imaging apparatus equipped with the zoom lens system according the first aspect.

According to a third aspect of the present invention, there is provided a zoom lens system comprising, in order from an object: a first lens group having negative refractive power; a second lens group having positive refractive power; a third lens group having negative refractive power; and a fourth lens group having positive refractive power; an aperture stop being disposed between the second lens group and the third lens group, upon zooming from a wide-angle end state to a telephoto end state, each lens group being moved such that a distance between the second lens group and the third lens group varies and a distance between the third lens group and the fourth lens group varies, and the aperture stop being moved together with the third lens group, each of the second lens group, the third lens group, and the fourth lens group including at least one cemented lens, the cemented lens in the fourth lens group being composed of, in order from the object, a positive lens cemented with a negative lens, the most image plane side lens surface of the zoom lens system being a convex shape facing the image plane, and the following conditional expression (3) being satisfied:

$$0.3 < (d1w - d1t)/Ymax < 0.17 \quad (3)$$

where d1w denotes a distance along an optical axis between the most object side lens surface of the zoom lens system to the image plane in the wide-angle end state, d1t denotes a distance along the optical axis between the most object side lens surface of the zoom lens system to the image plane in the telephoto end state, and Ymax denotes the maximum image height.

According to a fourth aspect of the present invention, there is provided a zoom lens system comprising, in order from an object: a first lens group having negative refractive power; a second lens group having positive refractive power; a third lens group having negative refractive power; and a fourth lens group having positive refractive power; upon zooming from a wide-angle end state to a telephoto end state, a distance between the second lens group and the third lens group varying and a distance between the third lens group and the fourth lens group varying, the third lens group or a portion of the third lens group being moved as a vibration reduction lens group in a direction perpendicular to the optical axis, and the following conditional expression (5) being satisfied:

$$0.12 < (r2 + r1)/(r2 - r1) < 1.30 \quad (5)$$

where r1 denotes a radius of curvature of the object side of the vibration reduction lens group, and r2 denotes a radius of curvature of the image side of the vibration reduction lens group.

According to a fifth aspect of the present invention, there is provided an imaging apparatus equipped with the zoom lens system according fourth aspect.

According to a sixth aspect of the present invention, there is provided a method for zooming a zoom lens system including, in order from an object, a first lens group having negative refractive power, a second lens group having positive refractive power, a third lens group having negative refractive power, and a fourth lens group having positive refractive power, the method comprising steps of: providing an aperture stop between the second lens group and the third lens group; moving each lens group upon zooming from a wide-angle end state to a telephoto end state such that a distance between the second lens group and the third lens group varies, and a distance between the third lens group and the fourth lens group varies; moving aperture stop together with the third lens group upon zooming from the wide-angle end state to the telephoto end state; and satisfying the following conditional expressions (1) and (2):

$$1.20 < f2/fw < 2.50 \quad (1)$$

$$-2.10 < f3/fw < -0.80 \quad (2)$$

where f2 denotes a focal length of the second lens group, f3 denotes a focal length of the third lens group, and fw denotes a focal length of the zoom lens system in the wide-angle end state.

According to a seventh aspect of the present invention, there is provided a method for zooming a zoom lens system including, in order from an object, a first lens group having negative refractive power, a second lens group having positive refractive power, a third lens group having negative refractive power, and a fourth lens group having positive refractive power, the method comprising steps of: providing an aperture stop between the second lens group and the third lens group; moving each lens group upon zooming from a wide-angle end state to a telephoto end state such that a distance between the second lens group and the third lens group varies, a distance between the third lens group and the fourth lens qroup varies; moving the aperture stop together with the third lens group upon zooming from the wide-angle end state to the telephoto end state; providing each of the second lens group, the third lens group, and the fourth lens group including at least one cemented lens; providing the cemented lens in the fourth lens group composed of, in order from the object, a positive lens cemented with a negative lens; providing the most image plane side lens surface being convex shape facing the image plane; and satisfying the following conditional expression (3):

$$-0.3 < (d1w - d1t)/Ymax < 0.17 \quad (3)$$

where d1w denotes a distance between the most object side lens surface of the zoom lens system to the image plane in the wide-angle end state, d1t denotes a distance between the most object side lens surface of the zoom lens system to the image plane in the telephoto end state, and Ymax denotes the maximum image height.

According to an eighth aspect of the present invention, there is provided a method for zooming a zoom lens system including, in order from an object, a first lens group having negative refractive power, a second lens group having positive refractive power, a third lens group having negative refractive power, and a fourth lens group having positive refractive power, the method comprising steps of: varying a distance between the second lens group and the third lens group, and a distance between the third lens group and the fourth lens group upon zooming from a wide-angle end state to a telephoto end state; shifting the third lens group or a portion of the third lens group in a direction perpendicular to an optical axis as a vibration reduction lens group; and satisfying the following conditional expression (5):

$$0.12 < (r2+r1)/(r2-r1) < 1.30 \quad (5)$$

where r1 denotes a radius of curvature of the object side of the vibration reduction lens group, and r2 denotes a radius of curvature of the image side of the vibration reduction lens group.

The present invention makes it possible to provide a zoom lens system having a vibration reduction function with excellent optical performance capable of correcting an image blur on the image plane caused by a camera shake with keeping a high zoom ratio.

BRIEF DESCRIPTION OF THE DRAWINGS

FIG. 1 is a sectional view showing a lens configuration of a zoom lens system according to Example 1 of a first embodiment in a wide-angle end state.

FIGS. 2A and 2B are graphs showing various aberrations of the zoom lens system according to Example 1 of the first embodiment in the wide-angle end state upon focusing on infinity, and coma upon correcting rotational camera shake of 0.734 degrees, respectively.

FIG. 21 is a sectional view showing a lens configuration of a zoom lens system according to Example 6 of the first embodiment in the wide-angle end state.

FIG. 29 is a sectional view showing a lens configuration of a zoom lens system according to Example 8 of the second embodiment in the wide-angle end state.

FIG. 33 is a sectional view showing a lens configuration of a zoom lens system according to Example 9 of the second embodiment in the wide-angle end state.

FIG. 37 is a sectional view showing a lens configuration of a zoom lens system according to Example 10 of a third embodiment in the wide-angle end state.

FIG. 45 is a sectional view showing a lens configuration of a zoom lens system according to Example 12 of the third embodiment in the wide-angle end state.

THE BEST MODE FOR CARRYING OUT THE INVENTION

First Embodiment

Figure 3:
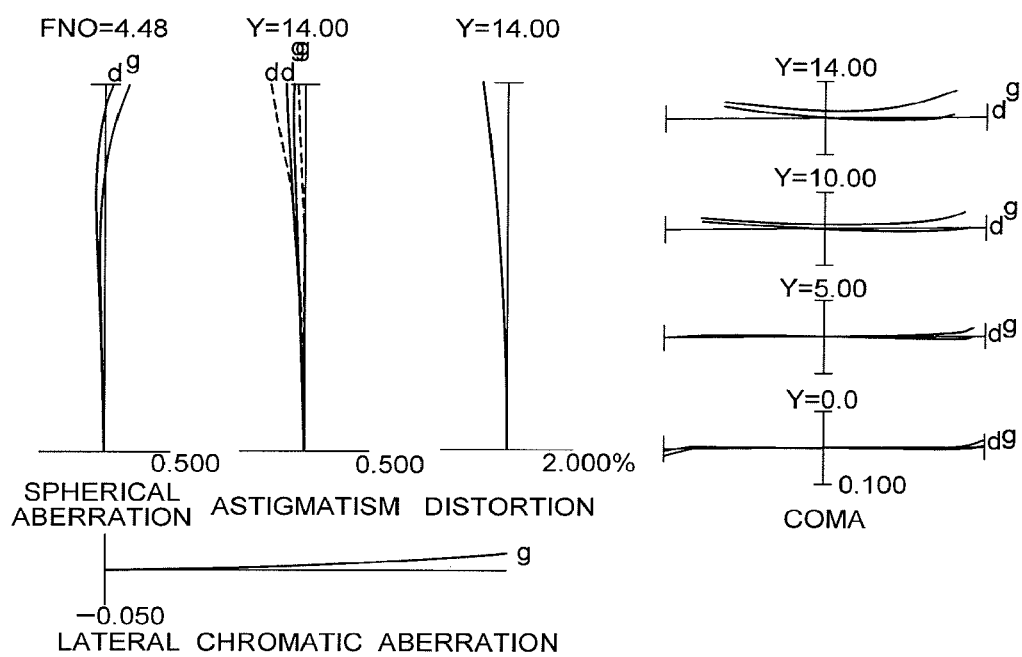
FIG. 3 is graphs showing various aberrations of the zoom lens system according to Example 1 of the first embodiment in an intermediate focal length state upon focusing on infinity.

A zoom lens system, an imaging apparatus, and a method for zooming the zoom lens system according to the first embodiment of the present application are explained.

The zoom lens system includes, in order from an object, a first lens group having negative refractive power, a second lens group having positive refractive power, a third lens group having negative refractive power, a fourth lens group having positive refractive power. An aperture stop is disposed between the second lens group and the third lens group. Upon zooming from a wide-angle end state to a telephoto end state, each lens group is moved such that a distance between the second lens group and the third lens group increases, and a distance between the third lens group and the fourth lens group decreases, and the aperture stop is moved together with the third lens group. The following conditional expressions (1) and (2) are satisfied:

$$1.20 < f2/fw < 2.50 \tag{1}$$

$$-2.10 < f3/fw < -0.80 \tag{2}$$

where f2 denotes a focal length of the second lens group, f3 denotes a focal length of the third lens group, and fw denotes a focal length of the zoom lens system in the wide-angle end state.

The zoom lens system carries out vibration reduction by shifting the third lens group in a direction perpendicular to the optical axis.

Conditional expression (1) defines an appropriate range of refractive power of the second lens group. With satisfying conditional expression (1), the zoom lens system makes it possible to realize excellent optical performance, even upon performing vibration reduction with effectively securing a given zoom ratio.

When the value is equal to or falls below the lower limit of conditional expression (1), refractive power of the second lens group becomes too large, so that coma becomes worse. Moreover, decentered aberration upon vibration reduction, in other words, coma or astigmatism become worse.

In order to secure the effect of the present invention, it is preferable to set the lower limit of conditional expression (1) to 1.30.

On the other hand, when the value is equal to or exceeds the upper limit of conditional expression (1), refractive power of the second lens group becomes too small, so that moving amount of each lens group upon zooming increases. Accordingly, it becomes difficult to correct curvature of field and chromatic aberration upon zooming from a wide-angle end state to a telephoto end state.

In order to secure the effect of the present invention, it is preferable to set the upper limit of conditional expression (1) to 1.80.

Conditional expression (2) defines refractive power of the third lens group. In the present zoom lens system, with satisfying conditional expression (2), it becomes possible to realize excellent optical performance even upon performing vibration reduction with effectively securing a given zoom ratio.

When the value is equal to or falls below the lower limit of conditional expression (2), refractive power of the third lens group becomes too small, so that moving amount of the third lens group upon zooming becomes large. Accordingly, variation in curvature of field upon zooming becomes large, so that it becomes difficult to correct this.

On the other hand, when the value is equal to or exceeds the upper limit of conditional expression (2), refractive power of the third lens group becomes too large, so that spherical aberration becomes worse. Moreover, decentered aberration upon vibration reduction such as coma and astigmatism become worse.

In order to secure the effect of the present invention, it is preferable to set the upper limit of conditional expression (2) to −1.50. In order to secure the effect of the present invention, it is preferable to set the lower limit of conditional expression (2) to −2.00.

As described above in the present zoom lens system, an aperture stop is disposed between the second lens group and the fourth lens group, and moved together with the third lens group upon zooming from a wide-angle end state to a telephoto end state.

With this construction, it becomes possible to correct off-axis coma with good balance upon zooming, and to realize excellent optical performance.

In the present zoom lens system, it is preferable that the third lens group has a cemented lens.

With this configuration, it becomes possible to excellently correct variation in lateral chromatic aberration upon zooming.

In the present zoom lens system, it is preferable that the fourth lens group is composed of, in order from an image side, a cemented lens constructed by a negative lens and a positive lens, and a single lens having positive refractive power.

With this configuration, it becomes possible to excellently correct lateral chromatic aberration and spherical aberration with securing sufficient space between the third lens group and the fourth lens group. Moreover, with constructing the third lens group to be a vibration reduction lens group, it becomes possible to excellently correct coma and astigmatism upon vibration reduction.

In the present zoom lens system, it is preferable that each of the second lens group, the third lens group and the fourth lens group has at least one cemented lens.

With this configuration, it becomes possible to excellently correct variation in lateral chromatic aberration upon zooming.

In the present zoom lens system, it is preferable that the first lens group moves at first to the image side then to the object side upon zooming from the wide-angle end state to the telephoto end state.

With this configuration, the present zoom lens system makes it possible to become compact and have a high zoom ratio.

The present zoom lens system preferably satisfies the following conditional expression (3):

$$-0.3 < (d1w - d1t)/Y\max < 0.17 \tag{3}$$

where d1w denotes a distance between the most object side lens surface of the zoom lens system to the image plane in the wide-angle end state, d1t denotes a distance between the most object side lens surface of the zoom lens system to the image plane in the telephoto end state, and Ymax denotes the maximum image height.

Conditional expression (3) defines moving condition of the first lens group upon zooming from the wide-angle end state to the telephoto end state. With satisfying conditional expression (3), the present zoom lens system makes it possible to realize excellent optical performance and compactness with effectively securing a given zoom ratio.

When the value is equal to or falls below the lower limit of conditional expression (3), moving amount of the first lens group having large refractive power upon zooming becomes too large, so that it becomes impossible to excellently correct spherical aberration from the wide-angle end state to the telephoto end state.

In order to secure the effect of the present invention, it is preferable to set the lower limit of conditional expression (3) to −0.15.

On the other hand, when the value is equal to or exceeds the upper limit of conditional expression (3), moving amounts of the second lens group and the third lens group become small, so that refractive power of the second lens group and the third lens group becomes too large, and spherical aberration becomes worse. Moreover, decentered aberration upon vibration reduction, in other words, coma and astigmatism become worse.

In order to secure the effect of the present invention, it is preferable to set the upper limit of conditional expression (3) to 0.05.

In the present zoom lens system, it is preferable that the most image side lens surface of the zoom lens system has a convex shape facing the image.

With this configuration, it becomes possible to reduce ghost images by the reflection light from the image plane.

Moreover, the zoom lens system comprises, in order from an object: a first lens group having negative refractive power; a second lens group having positive refractive power; a third lens group having negative refractive power; and a fourth lens group having positive refractive power. An aperture stop is disposed between the second lens group and the third lens group. Upon zooming from a wide-angle end state to a telephoto end state, the first lens group is moved at first to an image side and then to the object side, each lens group is moved such that a distance between the second lens group and the third lens group increases, and a distance between the third lens group and the fourth lens group decreases, the aperture stop is moved together with the third lens group. Each of the second lens group, the third lens group, and the fourth lens group has at least one cemented lens. The cemented lens in the fourth lens group is composed of, in order from the object, a positive lens and a negative lens. The most image side lens surface of the zoom lens system is a convex shape facing the image, and the following conditional expression (3) is satisfied:

$$-0.3 < (d1w - d1t)/Y\max < 0.17 \quad (3)$$

where d1w denotes a distance between the most object side lens surface of the zoom lens system to the image plane in the wide-angle end state, d1t denotes a distance between the most object side lens surface of the zoom lens system to the image plane in the telephoto end state, and Ymax denotes the maximum image height.

As described above, in the present zoom lens system, upon zooming from the wide-angle end state to the telephoto end state, the first lens group is moved at first to the image and then to the object. With this configuration, it becomes possible to make the zoom lens system compact and to realize a high zoom ratio.

As described above, in the present zoom lens system, upon zooming from the wide-angle end state to the telephoto end state, the aperture stop is moved together with the third lens group. With this configuration, it becomes possible to correct off-axis coma upon zooming with good balance, and to realize excellent optical performance.

As described above, in the present zoom lens system, each of the second lens group, the third lens group, and the fourth lens group has at least one cemented lens. With this configuration, it becomes possible to excellently correct variation in lateral chromatic aberration upon zooming.

As described above, in the present zoom lens system, the fourth lens group is composed of, in order from the image side, a cemented lens constructed by a negative lens cemented with a positive lens, and a single lens having positive refractive power. With this configuration, it becomes possible to excellently correct lateral chromatic aberration, spherical aberration and coma with securing sufficient space between the third lens group and the fourth lens group. Moreover, with constructing the third lens group as the vibration reduction lens group, it becomes possible to excellently correct coma and astigmatism upon vibration reduction.

As described above, in the present zoom lens system, the most image side lens surface of the zoom lens system has a convex shape facing the image. With this configuration it becomes possible to reduce ghost images by the reflection light from the image plane.

Regarding conditional expression (3), explanation is the same as described above, so that duplicated explanation is omitted.

In the present zoom lens system, the following conditional expression (4) is preferably satisfied:

$$0.72 < f2/(-f3) < 1.5 \quad (4)$$

where f2 denotes a focal length of the second lens group, and f3 denotes a focal length of the third lens group.

Conditional expression (4) suitably defines refractive power of the second lens group and refractive power of the third lens group. In the present zoom lens system, with satisfying conditional expression (4), it becomes possible to realize excellent optical performance.

When the value is equal to or falls below the lower limit of conditional expression (4), refractive power of the second lens group becomes too large, so that it becomes impossible to excellently correct coma upon zooming.

In order to secure the effect of the present invention, it is preferable to set the lower limit of conditional expression (4) to 0.75.

On the other hand, when the value is equal to or exceeds the upper limit of conditional expression (4), absolute value of refractive power of the third lens group becomes too large, so that it becomes difficult to excellently correct spherical aberration with realizing a high zoom ratio.

In order to secure the effect of the present invention, it is preferable to set the upper limit of conditional expression (4) to 1.1.

The present imaging apparatus is equipped with the zoom lens system described above.

With this construction, it becomes possible to realize an imaging apparatus having excellent optical performance with a high zoom ratio.

A method for zooming the present zoom lens system comprising, in order from an object, a first lens group having negative refractive power, a second lens group having positive refractive power, a third lens group having negative refractive power, and a fourth lens group having positive refractive power; the method comprising steps of: providing an aperture stop between the second lens group and the third lens group; moving each lens group such that a distance between the second lens group and the third lens group increases, a distance between the third lens group and the fourth lens group decreases upon zooming from a wide-angle end state to a telephoto end state; moving the aperture stop together with the third lens group upon zooming from the wide-angle end state to the telephoto end state; and satisfying the following conditional expressions (1) and (2):

$$1.20 < f2/fw < 2.50 \quad (1)$$

$$-2.10 < f3/fw < -0.80 \quad (2)$$

where f2 denotes a focal length of the second lens group, f3 denotes a focal length of the third lens group, and fw denotes a focal length of the zoom lens system in the wide-angle end state.

With this configuration, the zoom lens system makes it possible to realize excellent optical performance and a high zoom ratio.

A method for zooming the zoom lens system comprising, in order from an object, a first lens group having negative refractive power, a second lens group having positive refractive power, a third lens group having negative refractive power, and a fourth lens group having positive refractive power, each of the second lens group, third lens group, and the fourth lens group including at least one cemented lens, the cemented lens in the fourth lens group composed of, in order from the object, a positive lens and a negative lens, and the most image side lens surface of the zoom lens system having a convex shape facing the image; the method comprising steps of: providing an aperture stop between the second lens group and the third lens group; moving the first lens group at first to an image side then to the object side, the aperture stop together with the third lens group, and each lens group such that a distance between the second lens group and the third lens group increases, and a distance between the third lens group and the fourth lens group decreases upon zooming from a wide-angle end state to a telephoto end state; and satisfying the following conditional expression (3):

$$-0.3 < (d1w - d1t)/Ymax < 0.17 \quad (3)$$

where d1w denotes a distance between the most object side lens surface of the zoom lens system to the image plane in the wide-angle end state, d1t denotes a distance between the most object side lens surface of the zoom lens system to the image plane in the telephoto end state, and Ymax denotes the maximum image height.

With this configuration, it becomes possible to realize excellent optical performance and a high zoom ratio.

A zoom lens system according to each numerical example of the first embodiment is explained below with reference to accompanying drawings.

Example 1

FIG. 1 is a sectional view showing a lens configuration of a zoom lens system according to Example 1 of a first embodiment in a wide-angle end state.

The zoom lens system according to Example 1 is composed of, in order from an object, a first lens group G1 having negative refractive power, a second lens group G2 having positive refractive power, a third lens group G3 having negative refractive power, and a fourth lens group G4 having positive refractive power.

The first lens group G1 is composed of, in order from the object, a negative meniscus lens L11 having a convex surface facing the object, and a cemented lens constructed by a negative meniscus lens L12 having a convex surface facing the object cemented with a positive meniscus lens L13 having a convex surface facing the object. The negative meniscus lens L11 is an aspherical lens on which an aspherical surface is formed by forming a resin layer on the image side glass surface.

The second lens group G2 is composed of, in order from the object, a double convex positive lens L21, and a cemented lens constructed by a double convex positive lens L22 cemented with a double concave negative lens L23.

The third lens group G3 is composed of a cemented lens constructed by, in order from the object, a positive meniscus lens L31 having a concave surface facing the object cemented with a double concave negative lens L32.

The fourth lens group G4 is composed of, in order from the object, a positive meniscus lens L41 having a concave surface facing the object, and a cemented lens constructed by a double convex positive lens L42 cemented with a negative meniscus lens L43 having a convex surface facing to the image.

In the zoom lens system according to Example 1, upon zooming from the wide-angle end state to the telephoto end state, the first lens group G1 is moved at first to the image side and then to the object side, and the second lens group G2, the third lens group G3, and the fourth lens group G4 are moved to the object such that a distance between the second lens group G2 and the third lend group G3 increases, and a distance between the third lens group G3 and the fourth lens group G4 decreases.

The aperture stop S is disposed between the second lens group G2 and the third lens group G3, and is moved together with the third lens group G3 upon zooming from the wide-angle end state to the telephoto end state.

In the zoom lens system according to Example 1, image plane correction upon occurring an image blur is carried out by shifting the third lens group G3 in a direction perpendicular to the optical axis.

Various values associated with the zoom lens system according to Example 1 of the present application are listed in Table 1.

In Specification, f denotes a focal length, FNO denotes an f-number, W denotes a wide-angle end state, M denotes an intermediate focal length state, T denotes a telephoto end state.

In Lens Data, the first column "N" shows the lens surface number counted in order from the object side, the second column "r" shows a radius of curvature of each lens surface, the third column "d" shows a distance to the next surface, the fourth column "vd" shows an Abbe number of the lens material at d-line (wavelength λ=587.6 nm), and the fifth column "nd" shows a refractive index of the lens material at d-line (wavelength λ=587.6 nm). Moreover, r=0.0000 denotes a plane surface. Refractive index of the air nd=1.000000 is omitted from the Lens Data, and Bf denotes a back focal length.

In Aspherical Data, aspherical coefficients when the aspherical surface is exhibited by the following expression are shown:

$$x = (h^2/r)/[1 + [1 - \kappa(h^2/r^2)]^{1/2}] + C4 \times h^4 + C6 \times h^6 + C8 \times h^8 + C10 \times h^{10}$$

where h denotes a vertical height from the optical axis, x denotes a sag amount which is a distance along the optical axis from the tangent surface at the vertex of the aspherical surface to the aspherical surface at the vertical height h from the optical axis, r denotes a radius of curvature of a reference sphere (paraxial radius of curvature), κ denotes a conical coefficient, C4, C6, C8, C10 denote aspherical coefficients.

"E-n" (n: integer) denotes "×10$^{-n}$", for example, "1.234E-05" means "1.234×10$^{-5}$".

In Variable Distances, a focal length f, and each variable distance are shown.

In the tables for various values, "mm" is generally used for the unit of length such as a focal length f, a radius of curvature r, a surface distance d and the like. However, since similar optical performance can be obtained by an optical system proportionally enlarged or reduced its dimension, the unit is not necessarily to be limited to "mm", and any other suitable unit can be used. The explanation of reference symbols is the same in the other Examples, so that duplicated explanations are omitted.

In a zoom lens system having a focal length of f, a vibration reduction coefficient, which is a ratio of a moving amount of an image on the image plane I to that of the vibration reduction lens group perpendicularly to the optical axis upon correcting a camera shake, of K, in order to correct rotational camera shake of an angle of θ, the vibration reduction lens group for correcting the camera shake may be moved by the amount of (f·tan θ)/K perpendicularly to the optical axis.

In the wide-angle end state (W) in Example 1, the vibration reduction coefficient K is 1.321, and the focal length is 18.5 (mm), so that the moving amount of the third lens group G3 for correcting a rotational camera shake of 0.734 degrees is 0.179 (mm). In the telephoto end state (T), the vibration reduction coefficient K is 2.2, and the focal length is 53.4 (mm), so that the moving amount of the third lens group G3 for correcting a rotational camera shake of 0.432 degrees is 0.183 (mm).

TABLE 1

Specifications

|   | W | M | T |
|---|---|---|---|
| f = | 18.5 | 35.1 | 53.4 |
| FNO = | 3.5 | 4.5 | 5.8 |

Lens Data

| N | r | d | vd | nd |
|---|---|---|---|---|
| 1 | 173.629 | 1.5 | 64.12 | 1.5168 |
| 2 | 19.129 | 0.3 | 38.09 | 1.5539 |
| 3 | 16.519 | 18.0 | | |
| 4 | 376.908 | 1.3 | 64.12 | 1.5168 |
| 5 | 26.093 | 3.3 | 27.51 | 1.7552 |
| 6 | 47.125 | D6 | | |
| 7 | 40.729 | 2.2 | 64.12 | 1.5168 |
| 8 | −50.200 | 0.3 | | |
| 9 | 21.500 | 3.9 | 64.12 | 1.5168 |
| 10 | −44.106 | 1.7 | 27.79 | 1.7408 |
| 11 | 104.215 | D11 | | |
| 12 | 0.000 | 1.8 | Aperture Stop S | |
| 13 | −53.374 | 2.4 | 25.43 | 1.8052 |
| 14 | −16.560 | 0.9 | 49.61 | 1.7725 |
| 15 | 38.304 | D15 | | |
| 16 | −113.888 | 2.5 | 64.12 | 1.5168 |
| 17 | −21.331 | 0.1 | | |
| 18 | 41.108 | 5.1 | 58.89 | 1.5182 |
| 19 | −16.154 | 1.0 | 29.52 | 1.7174 |
| 20 | −87.760 | Bf | | |

Aspherical Data
Surface Number: 3

κ = 1
C4 = 1.14970E−05
C6 = 3.77420E−09
C8 = 2.18460E−11
C10 = −9.39740E−15

TABLE 1-continued

Variable Distances

|   | W | M | T |
|---|---|---|---|
| f = | 18.5 | 35.1 | 53.4 |
| D6 = | 30.53 | 9.36 | 2.64 |
| D11 = | 1.85 | 7.24 | 11.50 |
| D15 = | 12.04 | 6.64 | 2.38 |
| Bf = | 38.10 | 51.38 | 65.90 |

Values for Conditional Expressions (1): f2/fw = 1.49
(2): f3/fw = −1.60
(3): (d1w − d1t)/Ymax = 0.01
(4): f2/(−f3) = 0.936

FIGS. 2A and 2B are graphs showing various aberrations of the zoom lens system according to Example 1 of the first embodiment in the wide-angle end state upon focusing on infinity, and coma upon correcting rotational camera shake of 0.734 degrees, respectively.

FIG. 3 is graphs showing various aberrations of the zoom lens system according to Example 1 of the first embodiment in an intermediate focal length state upon focusing on infinity.

Figure 4A:
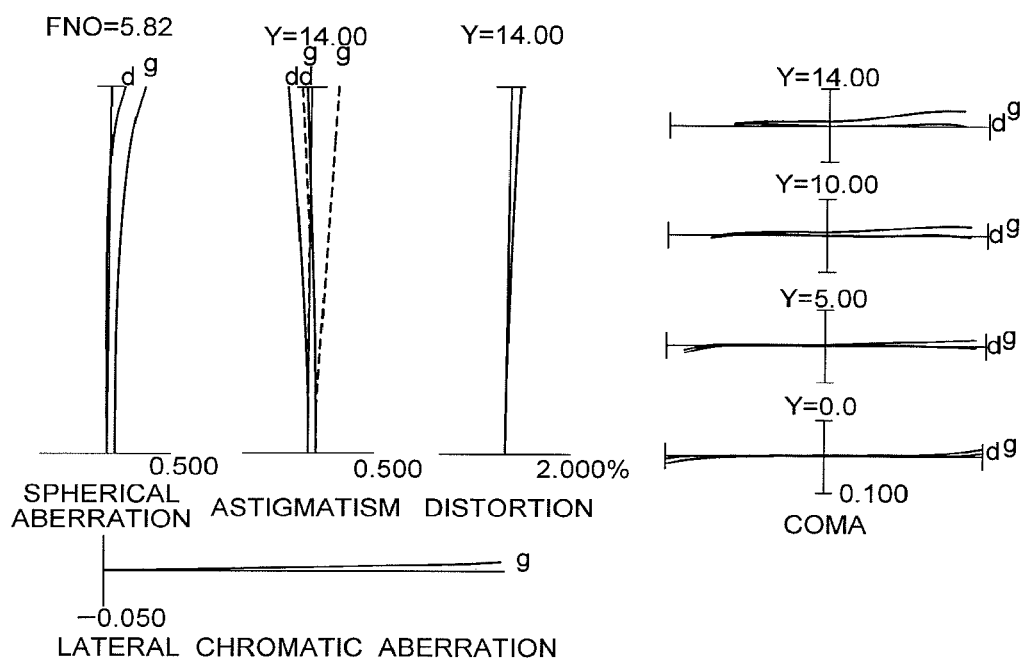
FIGS. 4A and 4B are graphs showing various aberrations of the zoom lens system according to Example 1 of the first embodiment in a telephoto end state upon focusing on infinity, and coma upon correcting rotational camera shake of 0.432 degrees, respectively.
Figure 4B:
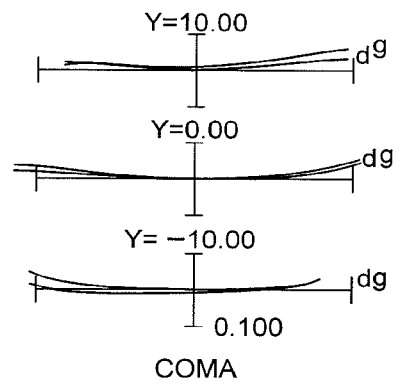

FIGS. 4A and 4B are graphs showing various aberrations of the zoom lens system according to Example 1 of the first embodiment in a telephoto end state upon focusing on infinity, and coma upon correcting rotational camera shake of 0.432 degrees, respectively.

In respective graphs, FNO denotes an f-number, Y denotes an image height. In respective graphs showing spherical aberration, the f-number with respect to the maximum aperture is shown. In graphs showing astigmatism and distortion, the maximum value of the image height is shown. In graphs showing coma, coma with respect to each image height is shown. In respective graphs, d denotes aberration curve at d-line (wavelength λ=587.6 nm), and g denotes aberration curve at g-line (wavelength λ=435.8 nm). In graphs showing astigmatism, a solid line indicates a sagittal image plane, and a broken line indicates a meridional image plane.

The above-described explanation regarding various aberration graphs is the same as the other Examples.

As is apparent from the respective graphs, the zoom lens system according to Example 1 shows superb optical performance as a result of good corrections to various aberrations from the wide-angle end state to the telephoto end state.

Example 2

Figure 5:
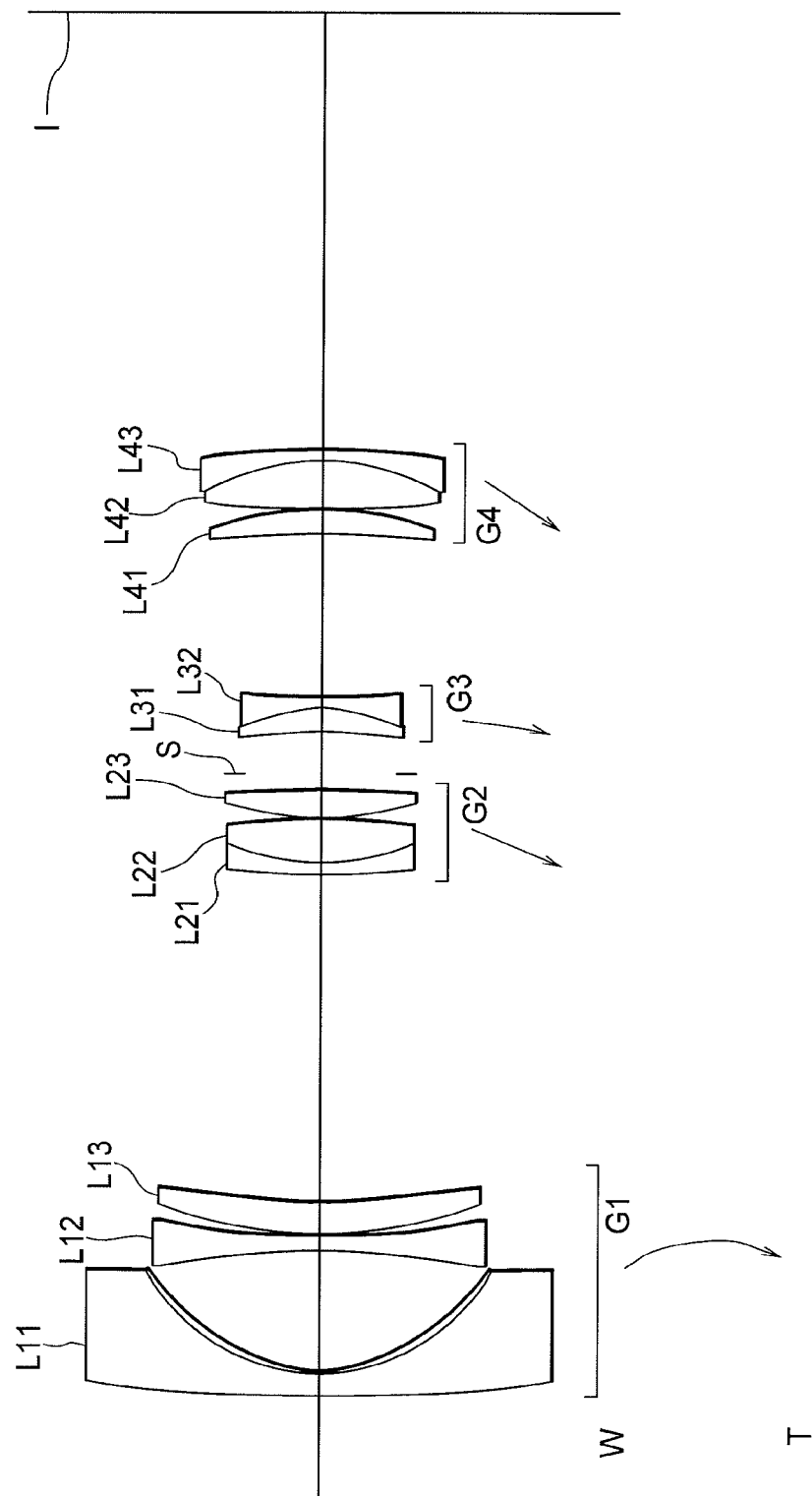
FIG. 5 is a sectional view showing a lens configuration of a zoom lens system according to Example 2 of the first embodiment in the wide-angle end state.

FIG. 5 is a sectional view showing a lens configuration of a zoom lens system according to Example 2 of the first embodiment in a wide-angle end state.

The zoom lens system according to Example 2 is composed of, in order from an object, a first lens group G1 having negative refractive power, a second lens group G2 having positive refractive power, a third lens group G3 having negative refractive power, and a fourth lens group G4 having positive refractive power.

The first lens group G1 is composed of, in order from the object, a negative meniscus lens L11 having a convex surface facing the object, a double concave negative lens L12, and a positive meniscus lens L13 having a convex surface facing the object. The negative meniscus lens L11 is an aspherical lens on which an aspherical surface is formed by forming a resin layer on the image side glass surface.

The second lens group G2 is composed of, in order from the object, a cemented lens constructed by a negative meniscus lens L21 having a convex surface facing the object cemented with a double convex positive lens L22, and a double convex positive lens L23.

The third lens group G3 is composed of a cemented lens constructed by, in order from the object, a positive meniscus lens L31 having a concave surface facing the object cemented with a double concave negative lens L32.

The fourth lens group G4 is composed of, in order from the object, a positive meniscus lens L41 having a concave surface facing the object, and a cemented lens constructed by a double convex positive lens L42 cemented with a negative meniscus lens L43 having a convex surface facing an image.

In the zoom lens system according to Example 2, upon zooming from a wide-angle end state to a telephoto end state, the first lens group G1 is moved at first to the image and then to the object, and the second lens group G2, the third lens group G3, and the fourth lens group G4 are moved to the object such that a distance between the second lens group G2 and the third lens group G3 increases, and a distance between the third lens group G3 and the fourth lens group G4 decreases.

An aperture stop S is disposed between the second lens group G2 and the third lens group G3 and moved together with the third lens group G3 upon zooming from the wide-angle end state to the telephoto end state.

In the zoom lens system according to Example 2, image plane correction upon occurring an image blur is carried out by shifting the third lens group G3 in a direction perpendicular to the optical axis.

Various values associated with the zoom lens system according to Example 2 of the present application are listed in Table 2.

In the wide-angle end state in Example 2, the vibration reduction coefficient is 1.162, and the focal length is 18.5 (mm), so that the moving amount of the third lens group G3 for correcting a rotational camera shake of 0.734 degrees is 0.204 (mm) In the telephoto end state, the vibration reduction coefficient is 1.914, and the focal length is 53.6 (mm), so that the moving amount of the third lens group G3 for correcting a rotational camera shake of 0.432 degrees is 0.211 (mm).

TABLE 2

Specifications

|   | W | M | T |
|---|---|---|---|
| f = | 18.5 | 35.0 | 53.6 |
| FNO = | 3.6 | 4.4 | 5.8 |

Lens Data

| N | r | d | vd | nd |
|---|---|---|---|---|
| 1 | 116.595 | 1.90 | 64.12 | 1.5168 |
| 2 | 16.600 | 0.15 | 38.09 | 1.5539 |
| 3 | 13.845 | 10.70 | | |
| 4 | −87.169 | 1.40 | 64.12 | 1.5168 |
| 5 | 65.000 | 0.10 | | |
| 6 | 34.878 | 2.80 | 23.78 | 1.8467 |
| 7 | 60.763 | D7 | | |
| 8 | 48.800 | 1.00 | 31.06 | 1.6889 |
| 9 | 16.779 | 4.00 | 64.12 | 1.5168 |
| 10 | −69.242 | 0.10 | | |
| 11 | 21.789 | 2.50 | 70.45 | 1.4875 |
| 12 | −183.971 | D12 | | |
| 13 | 0.000 | 3.80 | Aperture Stop S | |
| 14 | −46.101 | 2.10 | 25.43 | 1.8052 |
| 15 | −13.882 | 1.00 | 49.61 | 1.7725 |

TABLE 2-continued

| 16 | 58.127 | D16 | | |
|---|---|---|---|---|
| 17 | −113.509 | 2.20 | 49.61 | 1.7725 |
| 18 | −25.375 | 0.10 | | |
| 19 | 62.209 | 4.30 | 58.89 | 1.5182 |
| 20 | −17.500 | 1.00 | 25.43 | 1.8052 |
| 21 | −80.164 | Bf | | |

Aspherical Data
Surface Number: 3

$\kappa = 1$
$C4 = 2.24200E{-}05$
$C6 = 1.02000E{-}08$
$C8 = 1.07640E{-}10$
$C10 = 6.23540E{-}14$ Variable Distances

|   | W | M | T |
|---|---|---|---|
| f = | 18.5 | 35.0 | 53.6 |
| D7 = | 29.39 | 8.52 | 1.70 |
| D12 = | 1.59 | 7.60 | 12.18 |
| D16 = | 14.78 | 8.77 | 4.19 |
| Bf = | 38.85 | 52.64 | 68.70 |

Values for Conditional Expressions (1): f2/fw = 1.52
(2): f3/fw = −1.88
(3): (d1w − d1t)/Ymax = −0.15
(4): f2/(−f3) = 0.806

Figure 6A:
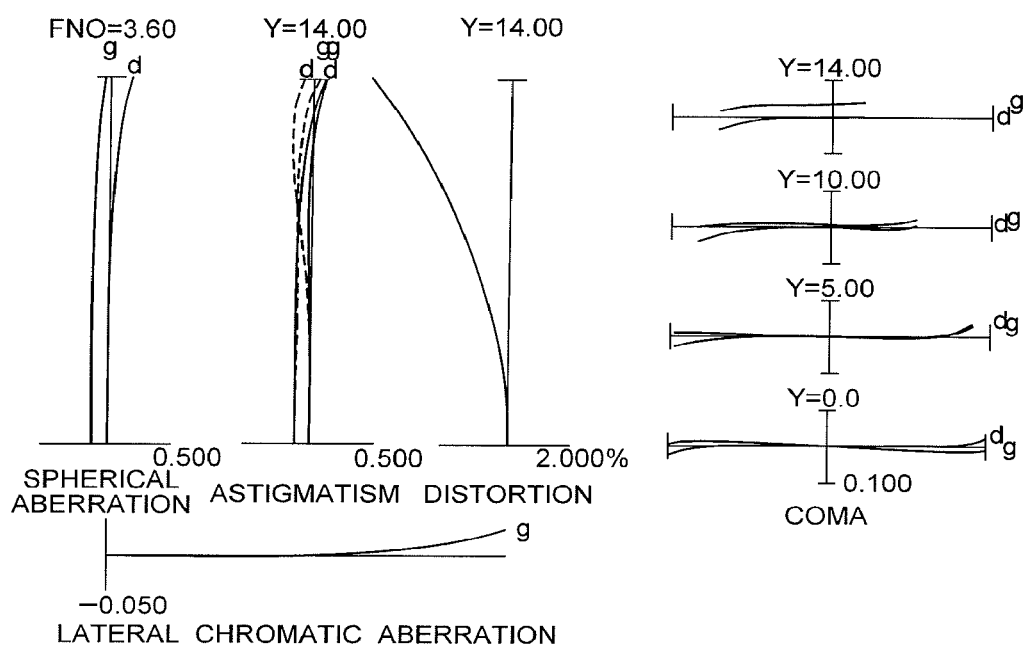
FIGS. 6A and 6B are graphs showing various aberrations of the zoom lens system according to Example 2 of the first embodiment in the wide-angle end state upon focusing on infinity, and coma upon correcting rotational camera shake of 0.734 degrees, respectively.
Figure 6B:
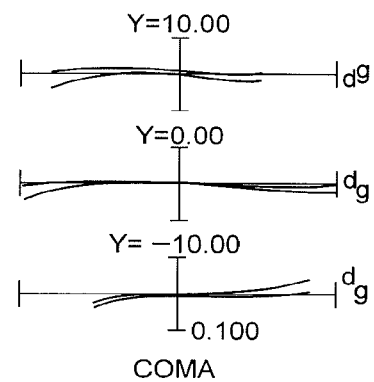

FIGS. 6A and 6B are graphs showing various aberrations of the zoom lens system according to Example 2 of the first embodiment in the wide-angle end state upon focusing on infinity, and coma upon correcting rotational camera shake of 0.734 degrees, respectively.

Figure 7:
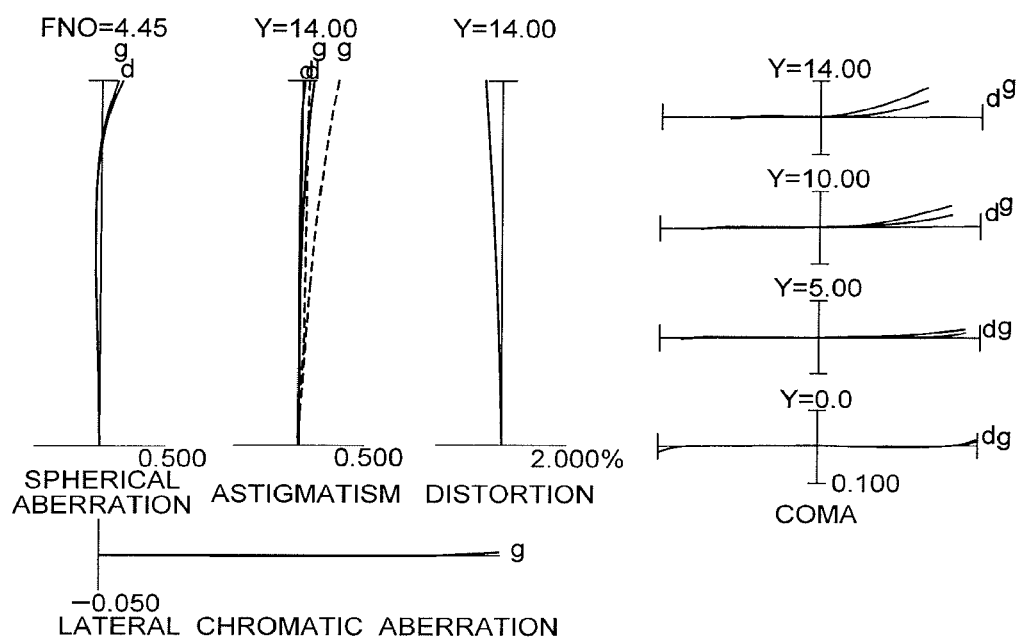
FIG. 7 is graphs showing various aberrations of the zoom lens system according to Example 2 of the first embodiment in the intermediate focal length state upon focusing on infinity.

FIG. 7 is graphs showing various aberrations of the zoom lens system according to Example 2 of the first embodiment in the intermediate focal length state upon focusing on infinity.

Figure 8A:
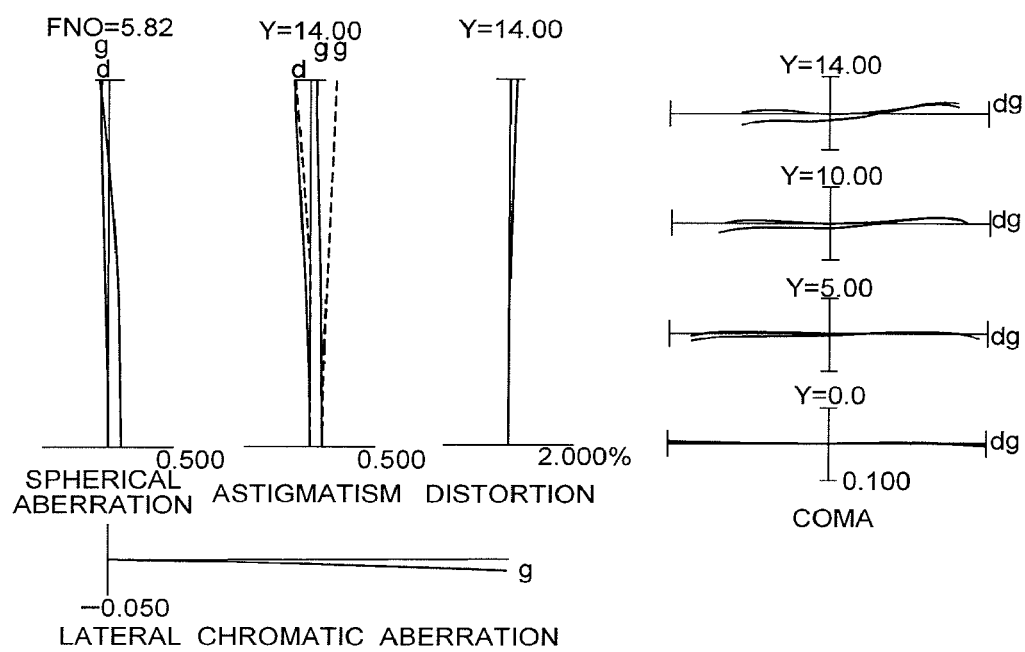
FIGS. 8A and 8B are graphs showing various aberrations of the zoom lens system according to Example 2 of the first embodiment in the telephoto end state upon focusing on infinity, and coma upon correcting rotational camera shake of 0.432 degrees, respectively.
Figure 8B:
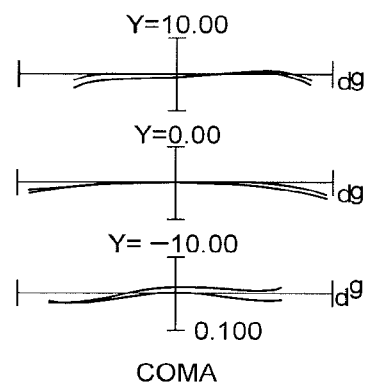

FIGS. 8A and 8B are graphs showing various aberrations of the zoom lens system according to Example 2 of the first embodiment in the telephoto end state upon focusing on infinity, and coma upon correcting rotational camera shake of 0.432 degrees, respectively.

As is apparent from the respective graphs, the zoom lens system according to Example 2 shows superb optical performance as a result of good corrections to various aberrations from the wide-angle end state to the telephoto end state.

Example 3

Figure 9:
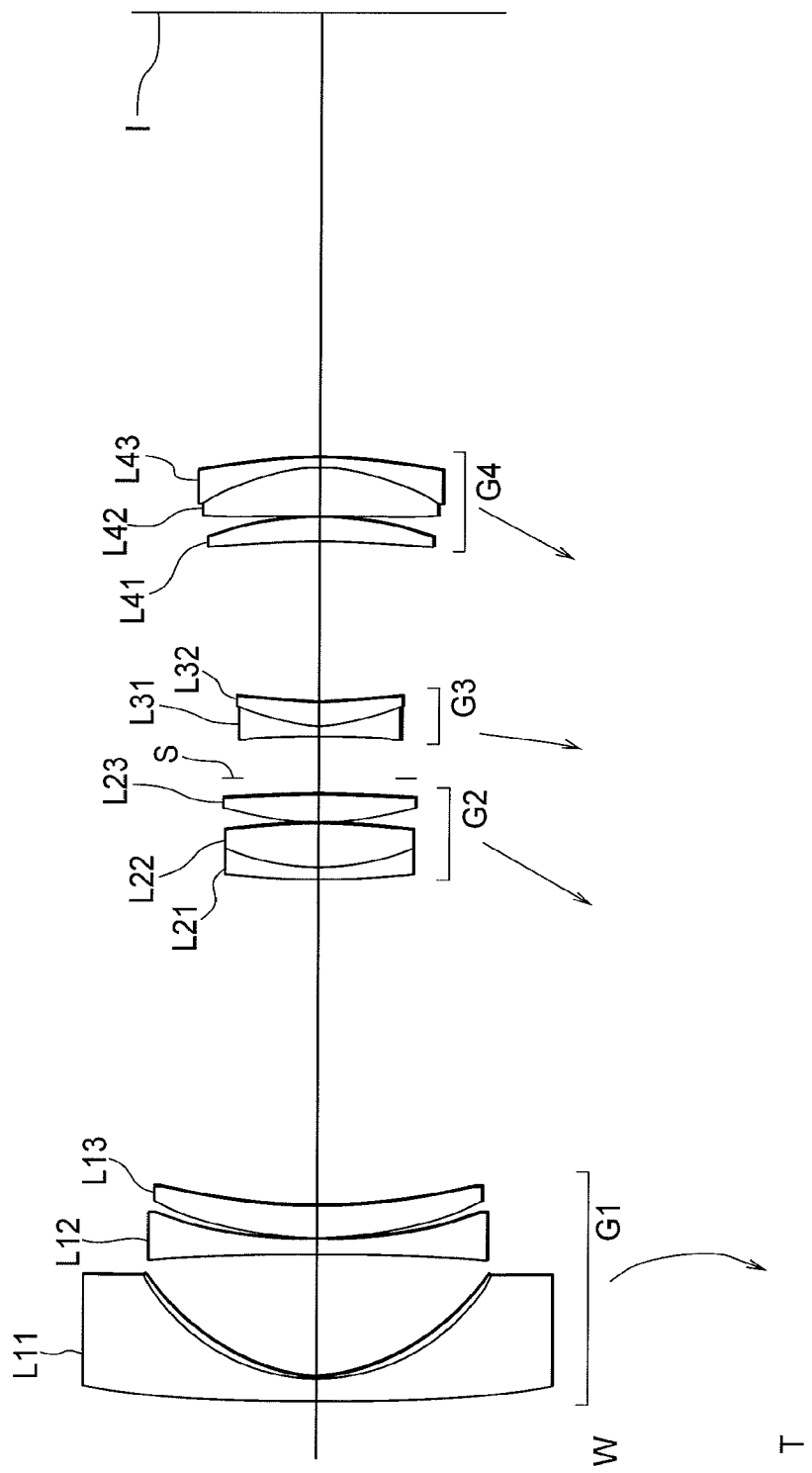
FIG. 9 is a sectional view showing a lens configuration of a zoom lens system according to Example 3 of the first embodiment in the wide-angle end state.

FIG. 9 is a sectional view showing a lens configuration of a zoom lens system according to Example 3 of the first embodiment in a wide-angle end state.

The zoom lens system according to Example 3 is composed of, in order from an object, a first lens group G1 having negative refractive power, a second lens group G2 having positive refractive power, a third lens group G3 having negative refractive power, and a fourth lens group G4 having positive refractive power.

The first lens group G1 is composed of, in order from the object, a negative meniscus lens L11 having a convex surface facing the object, a double concave negative lens L12, and a positive meniscus lens L13 having a convex surface facing the object. The negative meniscus lens L11 is an aspherical lens on which an aspherical surface is formed by forming a resin layer on the image side glass surface.

The second lens group G2 is composed of, in order from the object, a cemented lens constructed by a negative meniscus lens L21 having a convex surface facing the object cemented with a double convex positive lens L22, and a double convex positive lens L23.

The third lens group G3 is composed of a cemented lens constructed by, in order from the object, a double concave negative lens L31 cemented with a positive meniscus lens L32 having a convex surface facing the object.

The fourth lens group G4 is composed of, in order from the object, a positive meniscus lens L41 having a concave surface facing the object, and a cemented lens constructed by a double convex positive lens L42 cemented with a negative meniscus lens L43 having a convex surface facing an image.

In the zoom lens system according to Example 2, upon zooming from a wide-angle end state to a telephoto end state, the first lens group G1 is moved at first to the image and then to the object, and the second lens group G2, the third lens group G3, and the fourth lens group G4 are moved to the object such that a distance between the second lens group G2 and the third lens group G3 increases, and a distance between the third lens group G3 and the fourth lens group G4 decreases.

An aperture stop S is disposed between the second lens group G2 and the third lens group G3 and moved together with the third lens group G3 upon zooming from the wide-angle end state to the telephoto end state.

In the zoom lens system according to Example 3, image plane correction upon occurring an image blur is carried out by shifting the third lens group G3 in a direction perpendicular to the optical axis.

Various values associated with the zoom lens system according to Example 3 of the present application are listed in Table 3.

In the wide-angle end state in Example 3, the vibration reduction coefficient is 1.162, and the focal length is 18.5 (mm), so that the moving amount of the third lens group G3 for correcting a rotational camera shake of 0.734 degrees is 0.204 (mm) In the telephoto end state, the vibration reduction coefficient is 2.037, and the focal length is 53.6 (mm), so that the moving amount of the third lens group G3 for correcting a rotational camera shake of 0.432 degrees is 0.198 (mm).

TABLE 3

| Specifications | | | |
| --- | --- | --- | --- |
| | W | M | T |
| f = | 18.5 | 35.0 | 53.6 |
| FNO = | 3.6 | 4.5 | 5.8 |

| Lens Data | | | | |
| --- | --- | --- | --- | --- |
| N | r | d | vd | nd |
| 1 | 143.864 | 1.90 | 64.12 | 1.5168 |
| 2 | 16.600 | 0.15 | 38.09 | 1.5539 |
| 3 | 13.845 | 10.70 | | |
| 4 | −320.286 | 1.40 | 64.12 | 1.5168 |
| 5 | 39.392 | 0.10 | | |
| 6 | 28.859 | 2.80 | 23.78 | 1.8467 |
| 7 | 48.651 | D7 | | |
| 8 | 53.792 | 1.00 | 31.06 | 1.6889 |
| 9 | 15.892 | 4.00 | 64.12 | 1.5168 |
| 10 | −81.342 | 0.10 | | |
| 11 | 21.430 | 2.50 | 70.45 | 1.4875 |
| 12 | −93.281 | D12 | | |
| 13 | 0.000 | 3.80 | Aperture Stop S | |

TABLE 3-continued

| 14 | −54.293 | 1.00 | 49.61 | 1.7725 |
| --- | --- | --- | --- | --- |
| 15 | 14.759 | 2.10 | 25.43 | 1.8052 |
| 16 | 49.157 | D16 | | |
| 17 | −120.012 | 2.20 | 49.61 | 1.7725 |
| 18 | −26.196 | 0.10 | | |
| 19 | 174.074 | 4.30 | 58.89 | 1.5182 |
| 20 | −15.904 | 1.00 | 25.43 | 1.8052 |
| 21 | −44.146 | Bf | | |

Aspherical Data
Surface Number: 3

$\kappa = 1$
$C4 = 2.2420E-05$
$C6 = 1.0200E-08$
$C8 = 1.0764E-10$
$C10 = 6.2354E-14$

| Variable Distances | | | |
| --- | --- | --- | --- |
| | W | M | T |
| f = | 18.5 | 35.0 | 53.6 |
| D7 = | 29.15 | 8.27 | 1.45 |
| D12 = | 1.64 | 7.65 | 12.22 |
| D16 = | 14.15 | 8.14 | 3.56 |
| Bf = | 39.65 | 53.43 | 69.49 |

| Values for Conditional Expressions | |
| --- | --- |
| (1): f2/fw = | 1.52 |
| (2): f3/fw = | −1.88 |
| (3): (d1w − d1t)/Ymax = | −0.15 |
| (4): f2/(−f3) = | 0.806 |

Figure 10A:
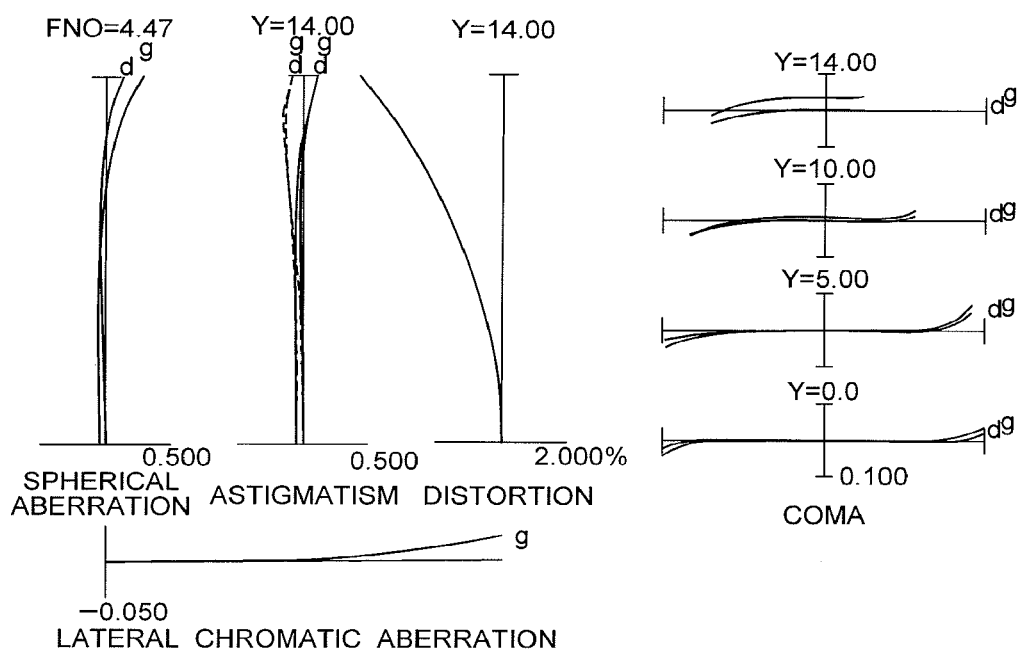
FIGS. 10A and 10B are graphs showing various aberrations of the zoom lens system according to Example 3 of the first embodiment in the wide-angle end state upon focusing on infinity, and coma upon correcting rotational camera shake of 0.734 degrees, respectively.
Figure 10B:
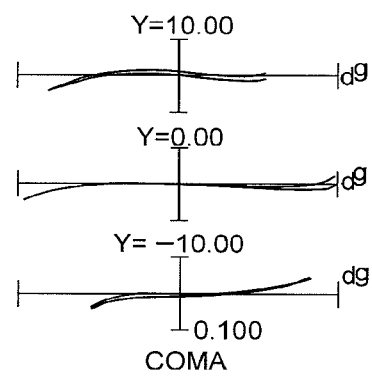

FIGS. 10A and 10B are graphs showing various aberrations of the zoom lens system according to Example 3 of the first embodiment in the wide-angle end state upon focusing on infinity, and coma upon correcting rotational camera shake of 0.734 degrees, respectively.

Figure 11:
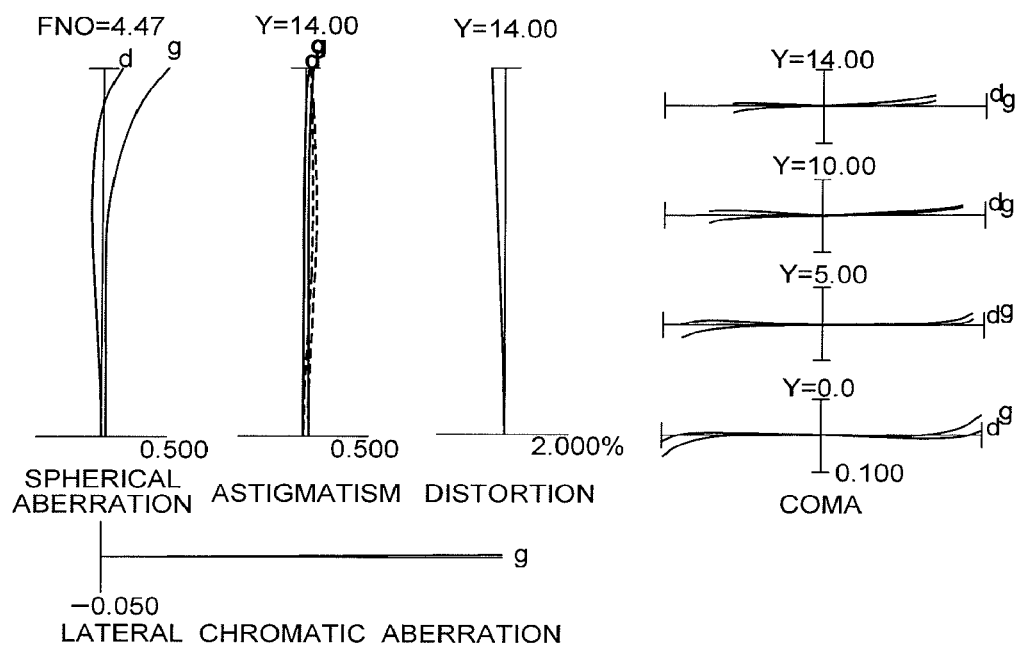
FIG. 11 is graphs showing various aberrations of the zoom lens system according to Example 3 of the first embodiment in the intermediate focal length state upon focusing on infinity.

FIG. 11 is graphs showing various aberrations of the zoom lens system according to Example 3 of the first embodiment in the intermediate focal length state upon focusing on infinity.

Figure 12A:
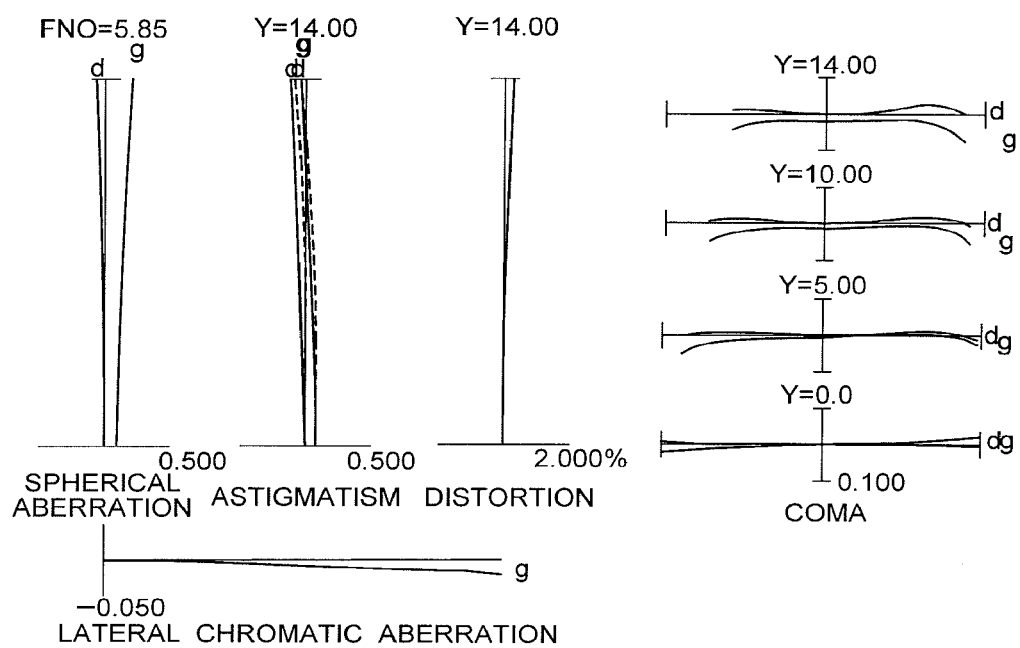
FIGS. 12A and 12B are graphs showing various aberrations of the zoom lens system according to Example 3 of the first embodiment in the telephoto end state upon focusing on infinity, and coma upon correcting rotational camera shake of 0.432 degrees, respectively.
Figure 12B:
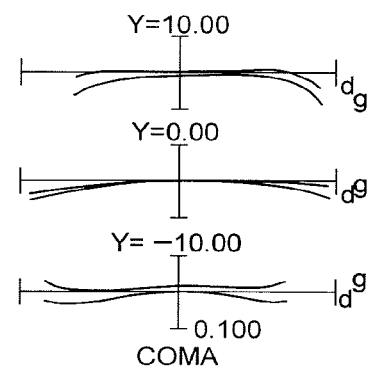

FIGS. 12A and 12B are graphs showing various aberrations of the zoom lens system according to Example 3 of the first embodiment in the telephoto end state upon focusing on infinity, and coma upon correcting rotational camera shake of 0.432 degrees, respectively.

As is apparent from the respective graphs, the zoom lens system according to Example 3 shows superb optical performance as a result of good corrections to various aberrations from the wide-angle end state to the telephoto end state.

Example 4

Figure 13:
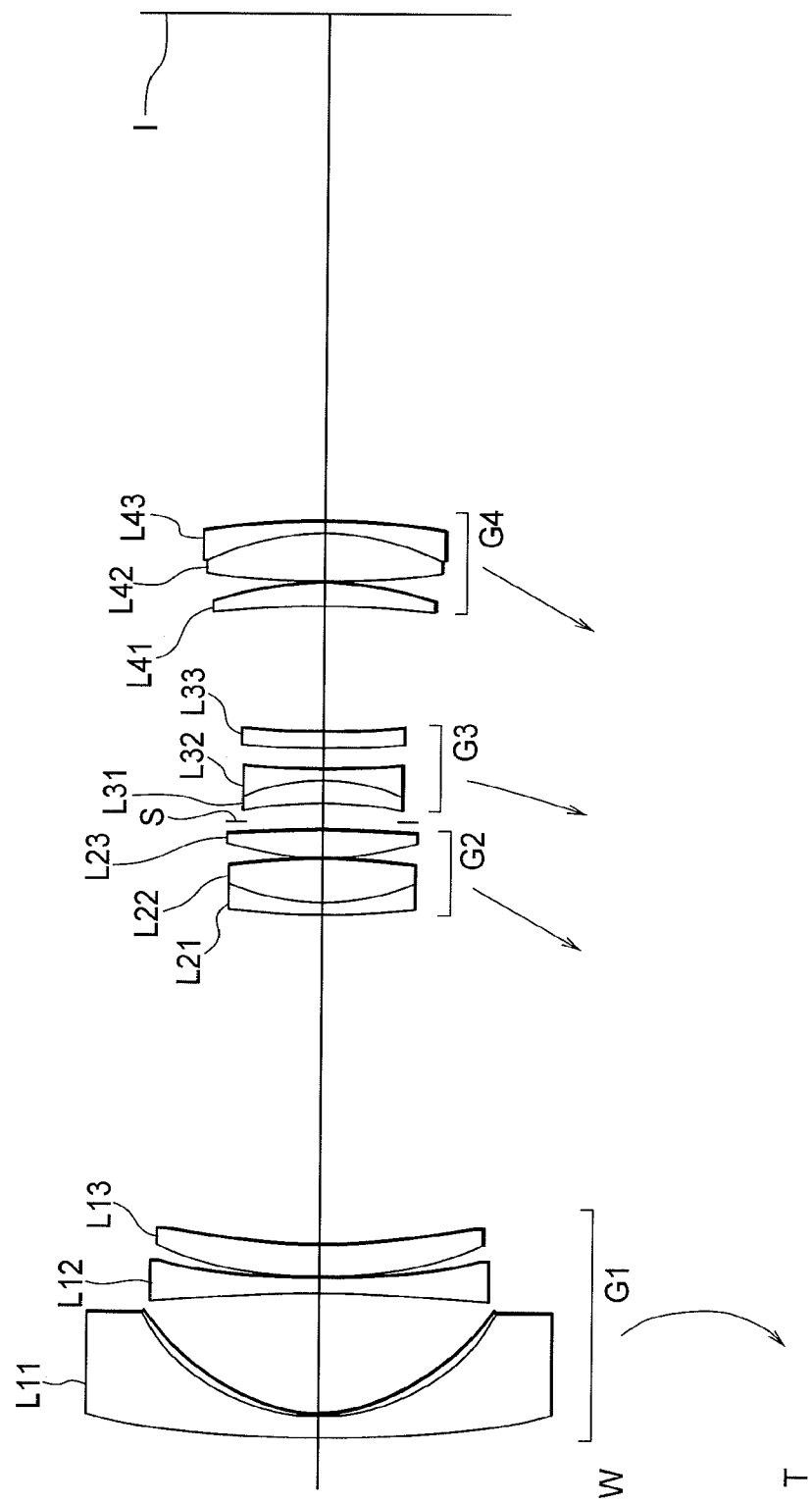
FIG. 13 is a sectional view showing a lens configuration of a zoom lens system according to Example 4 of the first embodiment in the wide-angle end state.

FIG. 13 is a diagram showing a lens configuration of a zoom lens system according to Example 4 of the first embodiment in a wide-angle end state.

The zoom lens system according to Example 4 is composed of, in order from an object, a first lens group G1 having negative refractive power, a second lens group G2 having positive refractive power, a third lens group G3 having negative refractive power, and a fourth lens group G4 having positive refractive power.

The first lens group G1 is composed of, in order from the object, a negative meniscus lens L11 having a convex surface facing the object, a double concave negative lens L12, and a positive meniscus lens L13 having a convex surface facing the object. The negative meniscus lens L11 is an aspherical lens on which an aspherical surface is formed by forming a resin layer on the image side glass surface.

The second lens group G2 is composed of, in order from the object, a cemented lens constructed by a negative meniscus lens L21 having a convex surface facing the object cemented with a double convex positive lens L22, and a double convex positive lens L23.

The third lens group G3 is composed of, in order from the object, a cemented lens constructed by a positive meniscus lens L31 having a concave surface facing the object cemented with a double concave negative lens L32, and a positive meniscus lens L33 having a concave surface facing an image.

The fourth lens group G4 is composed of, in order from the object, a positive meniscus lens L41 having a concave surface facing the object, and a cemented lens constructed by a double convex positive lens L42 cemented with a negative meniscus lens L43 having a convex surface facing an image.

In the zoom lens system according to Example 4, upon zooming from a wide-angle end state to a telephoto end state, the first lens group G1 is moved at first to the image and then to the object, and the second lens group G2, the third lens group G3, and the fourth lens group G4 are moved to the object such that a distance between the second lens group G2 and the third lens group G3 increases, and a distance between the third lens group G3 and the fourth lens group G4 decreases.

An aperture stop S is disposed between the second lens group G2 and the third lens group G3 and moved together with the third lens group G3 upon zooming from the wide-angle end state to the telephoto end state.

In the zoom lens system according to Example 4, image plane correction upon occurring an image blur is carried out by shifting the third lens group G3 in a direction perpendicular to the optical axis.

Various values associated with the zoom lens system according to Example 4 of the present application are listed in Table 4.

In the wide-angle end state in Example 4, the vibration reduction coefficient is 1.325, and the focal length is 18.5 (mm), so that the moving amount of the third lens group G3 for correcting a rotational camera shake of 0.734 degrees is 0.179 (mm) In the telephoto end state, the vibration reduction coefficient is 2.128, and the focal length is 53.6 (mm), so that the moving amount of the third lens group G3 for correcting a rotational camera shake of 0.432 degrees is 0.190 (mm).

TABLE 4

Specifications

|     | W    | M    | T    |
|-----|------|------|------|
| f = | 18.5 | 35.7 | 53.6 |
| FNO = | 3.7 | 4.7 | 6.0 |

Lens Data

| N | r | d | vd | nd |
|---|---|---|----|----|
| 1 | 90.250 | 1.90 | 64.12 | 1.5168 |
| 2 | 16.600 | 0.15 | 38.09 | 1.5539 |
| 3 | 13.845 | 10.70 | | |
| 4 | −170.312 | 1.40 | 64.12 | 1.5168 |
| 5 | 55.920 | 0.10 | | |
| 6 | 33.079 | 2.80 | 23.78 | 1.8467 |
| 7 | 56.888 | D7 | | |
| 8 | 42.316 | 1.00 | 31.06 | 1.6889 |

TABLE 4-continued

| 9 | 17.208 | 4.00 | 64.12 | 1.5168 |
|---|--------|------|-------|--------|
| 10 | −119.089 | 0.10 | | |
| 11 | 22.273 | 2.50 | 70.45 | 1.4875 |
| 12 | −369.961 | D12 | | |
| 13 | 0.000 | 1.50 | Aperture Stop S | |
| 14 | −37.195 | 2.10 | 25.43 | 1.8052 |
| 15 | −14.987 | 1.00 | 49.61 | 1.7725 |
| 16 | 51.526 | 2.00 | | |
| 17 | 59.269 | 1.50 | 64.12 | 1.5168 |
| 18 | 83.855 | D18 | | |
| 19 | −82.278 | 2.20 | 49.61 | 1.7725 |
| 20 | −23.946 | 0.10 | | |
| 21 | 55.755 | 4.30 | 58.89 | 1.5182 |
| 22 | −19.219 | 1.00 | 25.43 | 1.8052 |
| 23 | −68.528 | Bf | | |

Aspherical Data
Surface Number: 3

κ = 1
C4 = 2.2420E−05
C6 = 1.0200E−08
C8 = 1.0764E−10
C10 = 6.2354E−14

Variable Distances

|     | W | M | T |
|-----|---|---|---|
| f = | 18.5 | 35.7 | 53.6 |
| D7 = | 29.72 | 8.84 | 2.02 |
| D12 = | 1.00 | 9.30 | 13.87 |
| D18 = | 11.32 | 5.31 | 1.50 |
| Bf = | 39.47 | 53.26 | 43.33 |

Values for Conditional Expressions

| (1): f2/fw = | 1.64 |
|---|---|
| (2): f3/fw = | −1.68 |
| (3): (d1w − d1t)/Ymax = | −0.11 |
| (4): f2/(−f3) = | 0.98 |

Figure 14A:
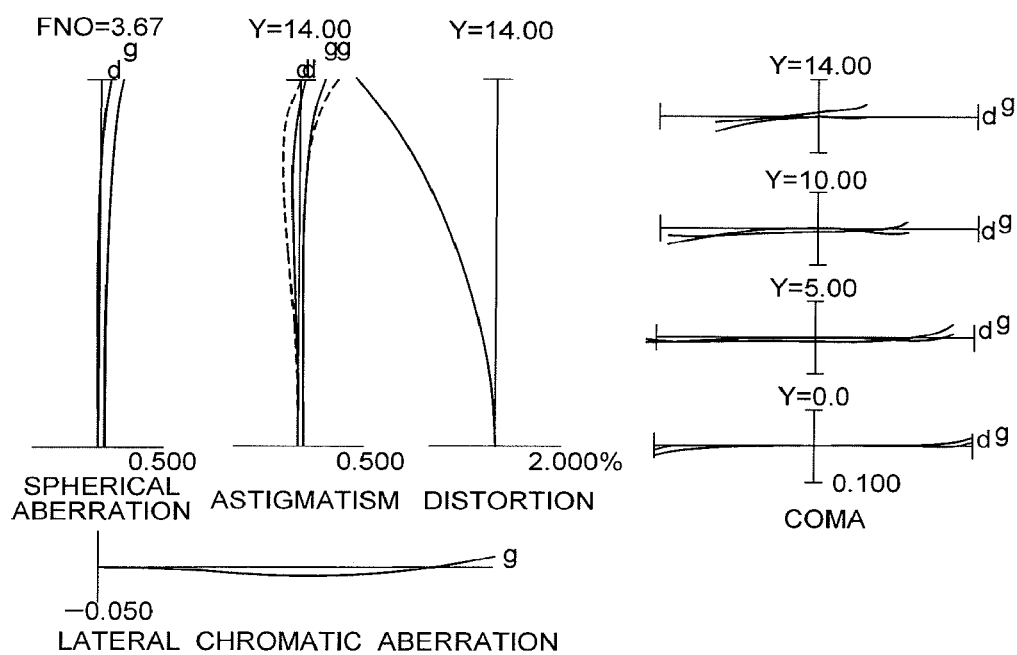
FIGS. 14A and 14B are graphs showing various aberrations of the zoom lens system according to Example 4 of the first embodiment in the wide-angle end state upon focusing on infinity, and coma upon correcting rotational camera shake of 0.734 degrees, respectively.
Figure 14B:
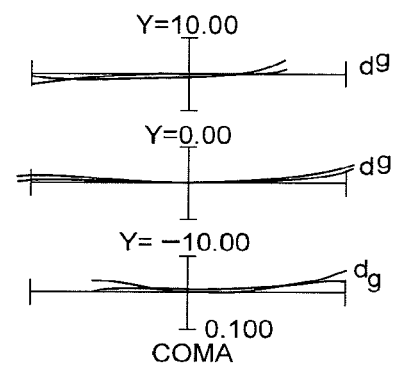

FIGS. 14A and 14B are graphs showing various aberrations of the zoom lens system according to Example 4 of the first embodiment in the wide-angle end state upon focusing on infinity, and coma upon correcting rotational camera shake of 0.734 degrees, respectively.

Figure 15:
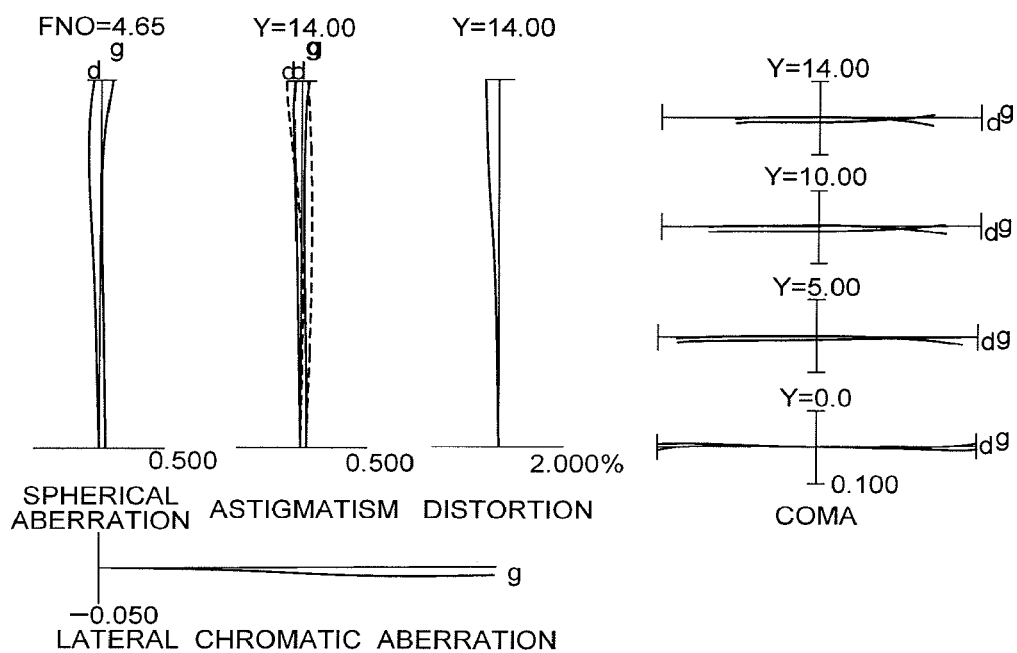
FIG. 15 is graphs showing various aberrations of the zoom lens system according to Example 4 of the first embodiment in the intermediate focal length state upon focusing on infinity.

FIG. 15 is graphs showing various aberrations of the zoom lens system according to Example 4 of the first embodiment in the intermediate focal length state upon focusing on infinity.

Figure 16A:
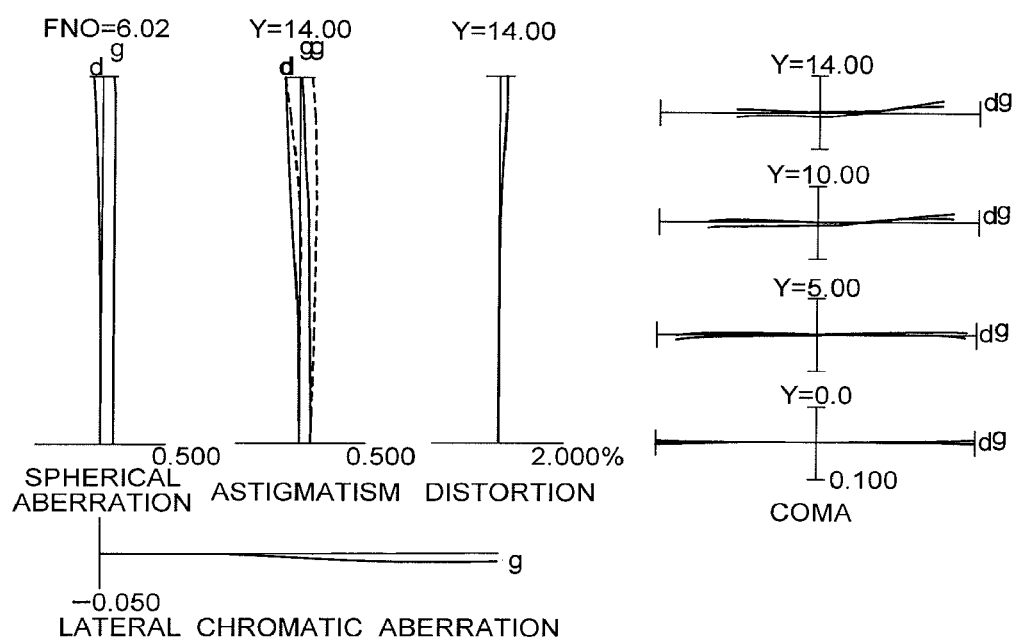
FIGS. 16A and 16B are graphs showing various aberrations of the zoom lens system according to Example 4 of the first embodiment in the telephoto end state upon focusing on infinity, and coma upon correcting rotational camera shake of 0.432 degrees, respectively.
Figure 16B:
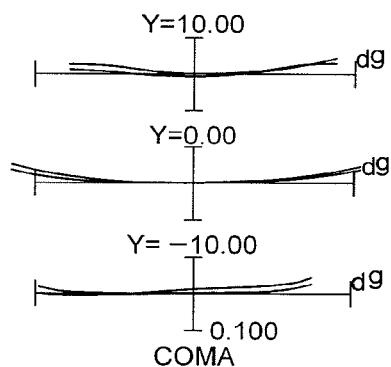

FIGS. 16A and 16B are graphs showing various aberrations of the zoom lens system according to Example 4 of the first embodiment in the telephoto end state upon focusing on infinity, and coma upon correcting rotational camera shake of 0.432 degrees, respectively.

As is apparent from the respective graphs, the zoom lens system according to Example 4 shows superb optical performance as a result of good corrections to various aberrations from the wide-angle end state to the telephoto end state.

Second Embodiment

A zoom lens system having a vibration reduction function according to a second embodiment is explained below.

A zoom lens system having a vibration reduction function according to the second embodiment includes, in order from an object, a first lens group having negative refractive power, a second lens group having positive refractive power, a third lens group having negative refractive power, and a fourth lens group having positive refractive power. Upon zooming from a wide-angle end state to a telephoto end state, a distance between the second lens group and the third lens group increases, and a distance between the third lens group and the fourth lens group decreases. An image blur caused by a camera shake is corrected by moving the third lens group or a portion of the third lens group as a vibration reduction lens group in a direction perpendicular to an optical axis. The following conditional expressions (5) and (6) are satisfied:

$$0.12 < (r2+r1)/(r2-r1) < 1.30 \qquad (5)$$

$$1.20 < |fvr/fw| < 3.30 \qquad (6)$$

where r1 denotes a radius of curvature of the object side of the vibration reduction lens group, r2 denotes a radius of curvature of the image side of the vibration reduction lens group, fvr denotes a focal length of the vibration reduction lens group, and fw denotes a focal length of the zoom lens system in the wide-angle end state.

Conditional expression (5) defines the shape of the vibration reduction lens group. With satisfying this, it becomes possible to realize excellent optical performance upon vibration reduction with keeping excellent optical performance with effectively securing a given zoom ratio.

When the value is equal to or falls below the lower limit of conditional expression (5), variation in decentered coma becomes large, and vibration reduction effect becomes small, or power becomes weak, and the zoom ratio cannot be secured. On the other hand, when the value is equal to or exceeds the upper limit of conditional expression (5), it becomes difficult to correct spherical aberration upon zooming.

In order to secure the effect of the present invention, it is preferable to set the lower limit of conditional expression (5) to 0.25. In order to secure the effect of the present invention, it is preferable to set the upper limit of conditional expression (5) to 1.00. In order to further secure the effect of the present invention, it is most preferable to set the lower limit of conditional expression (5) to 0.36.

Conditional expression (6) defines the focal length of the vibration reduction lens group with respect to the focal length of the zoom lens system in the wide-angle end state. With satisfying this, it becomes possible to secure excellent optical performance upon vibration reduction.

When the value is equal to or tails below the lower limit of conditional expression (6), variation in curvature of field by decentering becomes excessively large. On the other hand, when the value is equal to or exceeds the upper limit of conditional expression (6), power of the vibration reduction lens group becomes too weak, so that the vibration reduction effect becomes small. As a result, refractive power of the first lens group becomes strong, and spherical aberration is generated, so that it is undesirable.

In order to secure the effect of the present invention, it is preferable to set the lower limit of conditional expression (6) to 1.60. In order to secure the effect of the present invention, it is preferable to set the upper limit of conditional expression (6) to 3.00.

In a zoom lens system having a vibration reduction function according to the second embodiment, it is preferable to satisfy the following conditional expression (7):

$$0.50 < |fvr/f2| < 2.30 \qquad (7)$$

where fvr denotes the focal length of the vibration reduction lens group, and f2 denotes a focal length of the second lens group.

Conditional expression (7) defines the focal length of the vibration reduction lens group with respect to the focal length of the second lens group. With satisfying this condition, it becomes possible to realize excellent optical performance upon vibration reduction.

When the value is equal to or falls below the lower limit of conditional expression (7), it becomes impossible to correct decentered aberrations such as coma and curvature of field. On the other hand, when the value is equal to or exceeds the upper limit of conditional expression (7), refractive power of the vibration reduction lens group becomes weak, so that vibration reduction effect cannot be obtained. As a result, refractive power of the first lens group becomes strong, and spherical aberration is generated, so that it is undesirable.

In order to secure the effect of the present invention, it is preferable to set the lower limit of conditional expression (7) to 1.10. In order to secure the effect of the present invention, it is preferable to set the upper limit of conditional expression (7) to 2.00.

A zoom lens system having a vibration reduction function according to the second embodiment includes, in order from an object, a first lens group having negative refractive power, a second lens group having positive refractive power, a third lens group having negative refractive power, and a fourth lens group having positive refractive power. Upon zooming from a wide-angle end state, a distance between the second lens group and the third lens group increases, and a distance between the third lens group and the fourth lens group decreases. An image blur caused by a camera shake is corrected by moving the third lens group or a portion of the third lens group as a vibration reduction lens group in a direction perpendicular to an optical axis. The following conditional expressions (5) and (7) are satisfied:

$$0.12 < (r2+r1)/(r2-r1) < 1.30 \qquad (5)$$

$$0.50 < |fvr/f2| < 2.30 \qquad (7)$$

where r1 denotes a radius of curvature of the object side of the vibration reduction lens group, r2 denotes a radius of curvature of the image side of the vibration reduction lens group, fvr denotes a focal length of the vibration reduction lens group, and f2 denotes a focal length of the second lens group.

Conditional expression (5) defines the shape of the vibration reduction lens group, but has already been explained above, so the duplicated explanation is omitted.

Conditional expression (7) defines the focal length of the vibration reduction lens group with respect to the focal length of the second lens group. With satisfying this condition, it becomes possible to realize excellent optical performance upon vibration reduction.

When the value is equal to or falls below the lower limit of conditional expression (7), it becomes impossible to correct decentered aberrations such as coma and curvature of field. On the other hand, when the value is equal to or exceeds the upper limit of conditional expression (7), refractive power of the vibration reduction lens group becomes weak, so that vibration reduction effect cannot be obtained. As a result, refractive power of the first lens group becomes strong, and spherical aberration is generated, so that it is undesirable.

In order to secure the effect of the present invention, it is preferable to set the lower limit of conditional expression (7) to 1.10. In order to secure the effect of the present invention, it is preferable to set the upper limit of conditional expression (7) to 2.00.

In a zoom lens system having a vibration reduction function according to the second embodiment, upon zooming from the wide-angle end state to the telephoto end state, the first lens group is preferably moved along a trajectory having convex shape facing the image. With this movement, it becomes possible to accomplish a high zoom ration and to make a moving amount of each lens group small.

In a zoom lens system having a vibration reduction function according to the second embodiment, it is preferable that the most image side lens surface has a convex surface facing the image plane. With this configuration, it becomes possible to excellently correct curvature of field and to reduce ghost images caused by reflection light from the image plane.

In a zoom lens system having a vibration reduction function according to the second embodiment, it is preferable that the fourth lens group includes, in order from the object, a negative lens, a positive lens, and a positive lens. With this configuration, it becomes possible to excellently correct lateral chromatic aberration and coma with securing the distance between the third lens group as a vibration reduction lens group and the fourth lens group.

In a zoom lens system having a vibration reduction function according to the second embodiment, the third lens group preferably has a cemented lens. With this configuration, it becomes possible to excellently keep lateral chromatic aberration upon vibration reduction.

In a zoom lens system having a vibration reduction function according to the second embodiment, it is preferable that each of the second lens group, the third lens group, and the fourth lens group includes a cemented lens. With this configuration, it becomes possible to excellently secure chromatic aberration in particular lateral chromatic aberration upon zooming.

In a zoom lens system having a vibration reduction function according to the second embodiment, it is preferable that upon zooming from the wide-angle end state to the telephoto end state, the second lens group and the fourth lens group are moved in a body. With this configuration, it becomes possible to excellently correct decentered aberration such as coma and curvature of field generated by the vibration reduction lens group with securing a high zoom ratio.

In a zoom lens system having a vibration reduction function according to the second embodiment, it is preferable that an aperture stop is disposed in the vicinity of the third lens group, and moved together with the third lens group upon zooming from the wide-angle end state to the telephoto end state. Here, the range in the vicinity of the third lens group includes a space between the second lens group and the third lens group, a space inside of the third lens group, and a space between the third lens group and the fourth lens group. With this configuration, it becomes possible to excellently correct coma and to ease lowering peripheral quantity of light.

In a zoom lens system having a vibration reduction function according to the second embodiment, it is preferable that the aperture stop is disposed in the vicinity of the second lens group and moved together with the second lens group upon zooming from the wide-angle end state to the telephoto end state. Here, the range in the vicinity of the second lens group includes a space between the first lens group and the second lens group, a space inside of the second lens group, and a space between the second lens group and the third lens group. With this configuration, it becomes possible to excellently correct coma and to ease lowering peripheral quantity of light.

In a zoom lens system having a vibration reduction function according to the second embodiment, it is preferable that a fixed stop is disposed between the third lens group and the fourth lens group. With this configuration, it becomes possible to block coma flare and to secure excellent optical performance.

A zoom lens system having a vibration reduction function according to each numerical example of the second embodiment is explained below with reference to accompanying drawings.

Example 5

Figure 17:
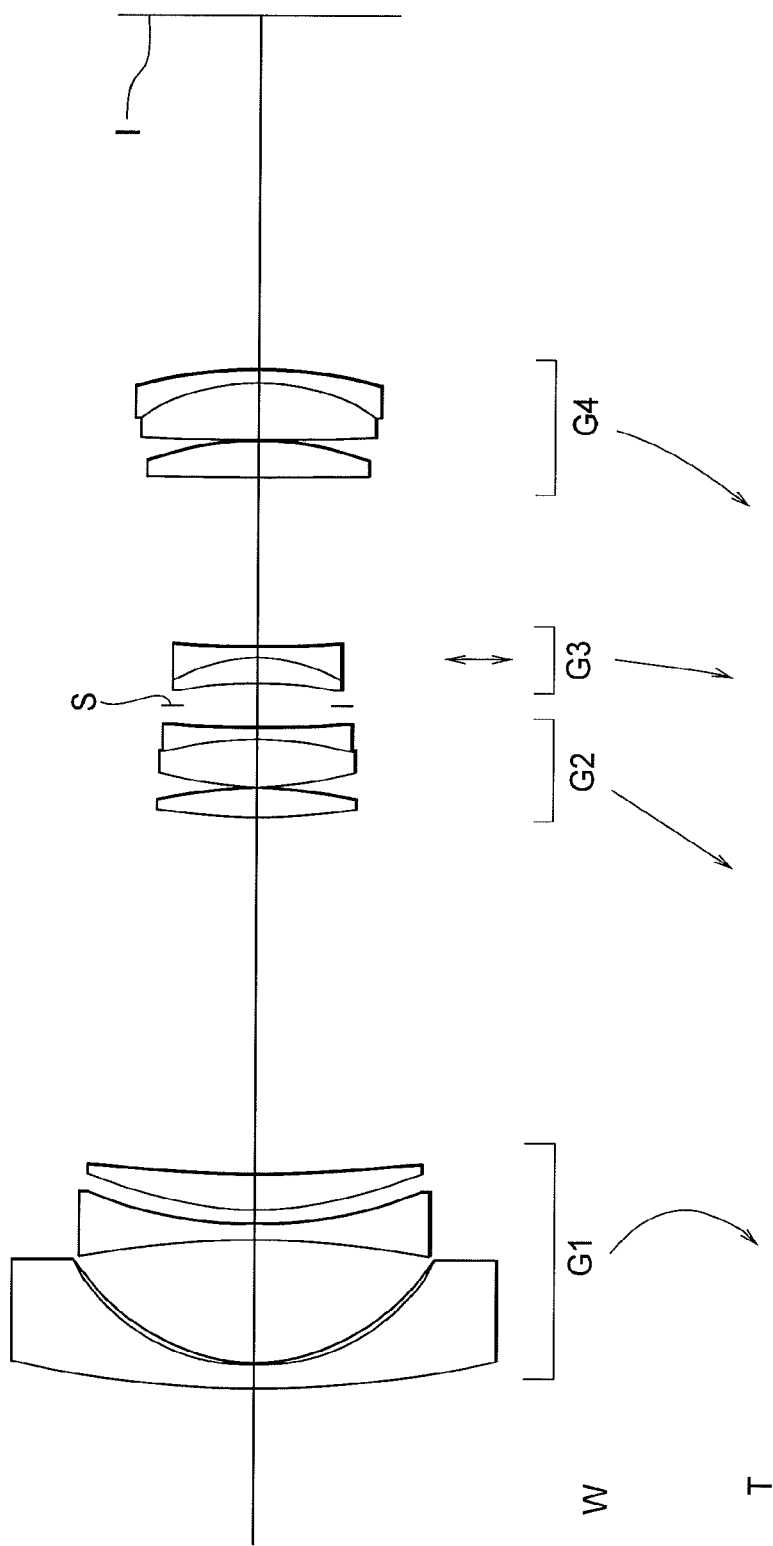
FIG. 17 is a sectional view showing a lens configuration of a zoom lens system according to Example 5 of the first embodiment in the wide-angle end state.

FIG. 17 is a sectional view showing a lens configuration of a zoom lens system having a vibration reduction function according to Example 5 of the second embodiment in a wide-angle end state.

The zoom lens system having a vibration reduction function according to Example 5 as shown in FIG. 17 includes, in order from an object, a first lens group G1 having negative refractive power, a second lens group G2 having positive refractive power, an aperture stop S, a third lens group G3 having negative refractive power, and a fourth lens group G4 having positive refractive power.

The first lens group G1 is composed of, in order from the object, a negative meniscus lens having a convex surface facing the object, a double concave negative lens, and a positive meniscus lens having a convex surface facing the object. The most object side negative meniscus lens is an aspherical lens on which an aspherical surface is formed by forming a resin layer on the image plane I side of the glass lens surface.

The second lens group G2 is composed of, in order from the object, a double convex positive lens, and a cemented lens constructed by a double convex positive lens cemented with a plano-concave negative lens having a plane surface facing the image plane I side.

The third lens group G3 is composed of a cemented lens constructed by, in order from the object, a positive meniscus lens having a concave surface facing the object cemented with a double concave negative lens.

The fourth lens group G4 is composed of, in order from the object, a positive meniscus lens having a concave surface facing the object, and a cemented lens constructed by a double convex positive lens cemented with a negative meniscus lens having a convex surface facing to the image plane I side.

The aperture stop S is disposed between the second lens group G2 and the third lens group G3, and moved together with the third lens group G3 upon zooming from the wide-angle end state to the telephoto end state.

Upon zooming from the wide-angle end state to the telephoto end state, the first lens group G1 is moved along a trajectory having a convex shape facing the image plane I side, the second lens group G2 and the fourth lens group G4 are moved in a body to the object, and the third lens group G3 is moved to the object.

In the zoom lens system having a vibration reduction function according to Example 5, an image blur on the image plane is corrected by moving the third lens group G3 in a direction perpendicular to the optical axis.

In the wide-angle end state in Example 5, the vibration reduction coefficient K is 1.02, and the focal length is 18.5 (mm), so that the moving amount of the third lens group G3 for correcting a rotational camera shake of 0.734 degrees is 0.232 (mm).

In the telephoto end state, the vibration reduction coefficient K is 1.71, and the focal length is 53.4 (mm), so that the moving amount of the third lens group G3 for correcting a rotational camera shake of 0.432 degrees is 0.235 (mm).

Various values associated with the zoom lens system having a vibration reduction function according to Example 5 are listed in Table 5.

TABLE 5

| Specifications | | | |
|---|---|---|---|
| | W | M | T |
| f = | 18.5 | 35.0 | 53.4 |
| FNO = | 3.6 | 4.5 | 5.9 |

| Lens Data | | | | |
|---|---|---|---|---|
| N | r | d | vd | nd |
| 1 | 60.622 | 1.9 | 64.10 | 1.5174 |
| 2 | 17.000 | 0.2 | 38.09 | 1.5539 |
| 3 | 13.553 | 9.5 | | |
| 4 | −58.369 | 1.3 | 60.68 | 1.5638 |
| 5 | 31.778 | 1.2 | | |
| 6 | 30.611 | 2.9 | 25.43 | 1.8052 |
| 7 | 124.231 | D7 | | |
| 8 | 61.265 | 2.2 | 64.10 | 1.5168 |
| 9 | −38.686 | 0.1 | | |
| 10 | 25.081 | 4.1 | 70.41 | 1.4875 |
| 11 | −30.802 | 1.0 | 28.46 | 1.7283 |
| 12 | 0.000 | D12 | | |
| 13 | 0.000 | 1.8 | Aperture Stop S | |
| 14 | −38.161 | 2.1 | 32.35 | 1.8503 |
| 15 | −13.420 | 1.0 | 49.61 | 1.7725 |
| 16 | 88.250 | D16 | | |
| 17 | −142.040 | 2.5 | 70.41 | 1.4875 |
| 18 | −24.777 | 0.1 | | |
| 19 | 105.560 | 5.4 | 70.41 | 1.4875 |
| 20 | −15.502 | 1.0 | 32.35 | 1.8503 |
| 21 | −29.334 | Bf | | |

Aspherical Data
Surface Number: 3

$\kappa = 1$
$C4 = 2.72910E-05$
$C6 = 4.86920E-08$
$C8 = -5.03710E-11$
$C10 = 9.29550E-13$

| Variable Distances | | | |
|---|---|---|---|
| | W | M | T |
| D7 = | 29.69 | 8.81 | 2.00 |
| D12 = | 3.39 | 9.41 | 13.97 |
| D16 = | 12.84 | 6.81 | 2.25 |
| Bf = | 40.10 | 55.68 | 3.76 |

| Values for Conditional Expressions | |
|---|---|
| (5): (r2 + r1)/(r2 − r1) = | 0.543 |
| (6): \|fvr/fw\| = | 2.028 |
| (7): \|fvr/f2\| = | 1.275 |

Figure 18A:
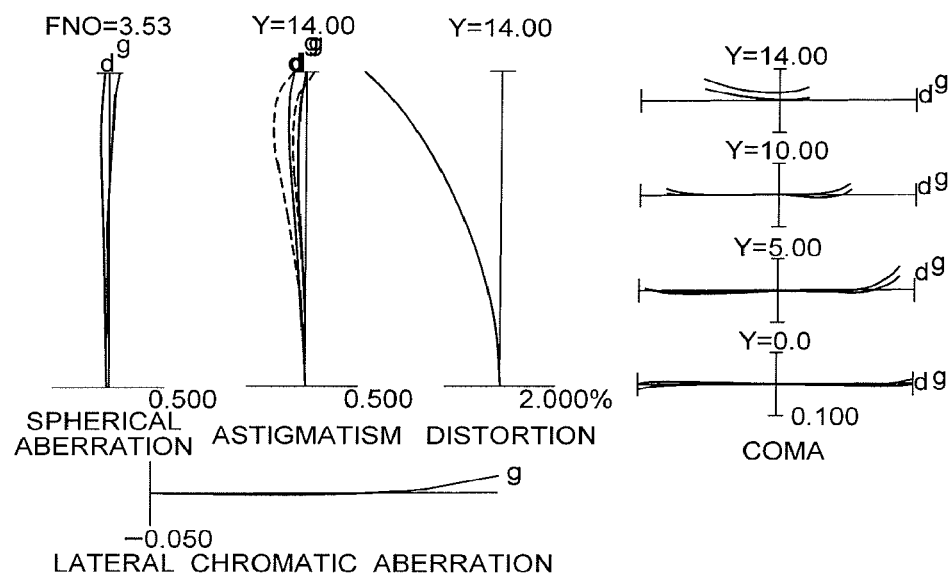
FIGS. 18A and 18B are graphs showing various aberrations of the zoom lens system according to Example 5 of the first embodiment in the wide-angle end state upon focusing on infinity, and coma upon correcting camera shake, respectively.
Figure 18B:
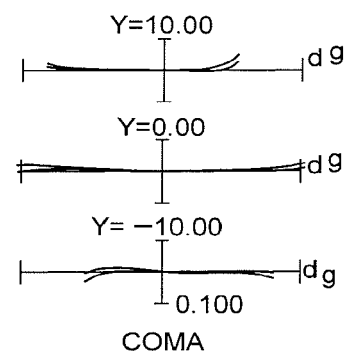
Figure 19:
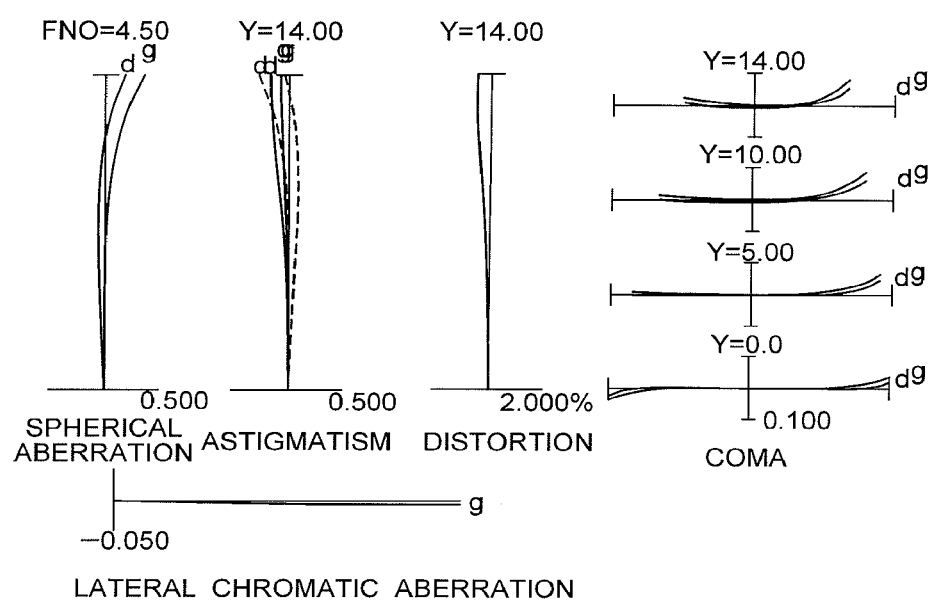
FIG. 19 is graphs showing various aberrations of the zoom lens system according to Example 5 of the first embodiment in the intermediate focal length state upon focusing on infinity.
Figure 20A:
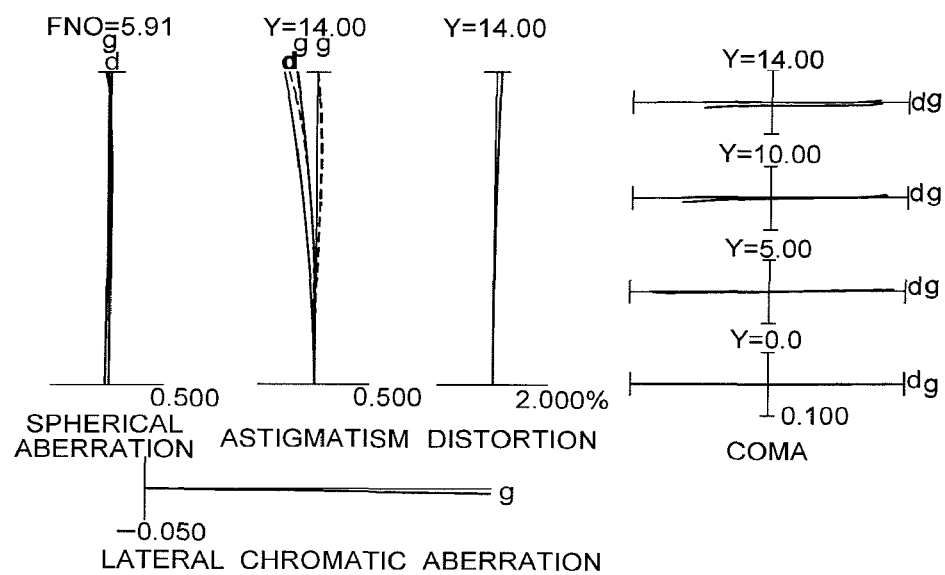
FIGS. 20A and 20B are graphs showing various aberrations of the zoom lens system according to Example 5 of the first embodiment in the telephoto end state upon focusing on infinity, and coma upon correcting camera shake, respectively.
Figure 20B:
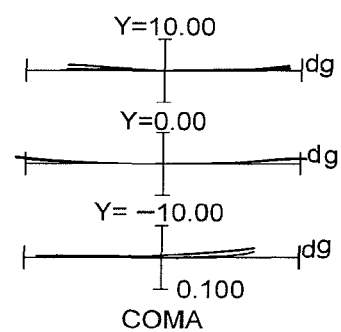

FIGS. 18A and 18B are graphs showing various aberrations of the zoom lens system according to Example 5 of the first embodiment in the wide-angle end state upon focusing on infinity, and coma upon correcting rotational camera shake, respectively. FIG. 19 is graphs showing various aberrations of the zoom lens system according to Example 5 of the first embodiment in the intermediate focal length state upon focusing on infinity. FIGS. 20A and 20B are graphs showing various aberrations of the zoom lens system according to Example 5 of the first embodiment in the telephoto end state upon focusing on infinity, and coma upon correcting rotational camera shake, respectively.

As is apparent from the respective graphs, the zoom lens system according to Example 5 shows superb optical performance as a result of good corrections to various aberrations from the wide-angle end state to the telephoto end state.

Example 6

FIG. 21 is a sectional view showing a lens configuration of a zoom lens system having a vibration reduction function according to Example 6 of the second embodiment in a wide angle end state.

The zoom lens system having a vibration reduction function according to Example 6 as shown in FIG. 21 includes, in order from an object, a first lens group G1 having negative refractive power, a second lens group G2 having positive refractive power, an aperture stop S, a third lens group G3 having negative refractive power, and a fourth lens group G4 having positive refractive power.

The first lens group G1 is composed of, in order from the object, a negative meniscus lens having a convex surface facing the object, a negative meniscus lens having a convex surface facing the object, and a positive meniscus lens having a convex surface facing the object. The most object side negative meniscus lens is an aspherical lens on which an aspherical surface is formed by forming a resin layer on the image plane I side of the glass lens surface.

The second lens group G2 is composed of, in order from the object, a cemented lens constructed by a negative meniscus lens having a convex surface facing the object cemented with a double convex positive lens, and a double convex positive lens.

The third lens group G3 is composed of, in order from the object, a cemented negative lens constructed by a positive meniscus lens having a concave surface facing the object cemented with a double concave negative lens, and a negative meniscus lens having a convex surface facing the object.

The fourth lens group G4 is composed of, in order from the object, a positive meniscus lens having a concave surface facing the object, and a cemented lens constructed by a double convex positive lens cemented with a negative meniscus lens having a convex surface facing to the image plane I side.

The aperture stop S is disposed between the second lens group G2 and the third lens group G3, and moved together with the third lens group G3 upon zooming from the wide-angle end state to the telephoto end state.

Upon zooming from the wide-angle end state to the telephoto end state, the first lens group G1 is moved along a trajectory having a convex shape facing the image plane I side, the second lens group G2 and the fourth lens group G4 are moved in a body to the object, and the third lens group G3 is moved to the object.

In the zoom lens system having a vibration reduction function according to Example 6, an image blur on the image plane is corrected by moving the cemented negative lens disposed to the object side of the third lens group G3 in a direction perpendicular to the optical axis.

In the wide-angle end state in Example 6, the vibration reduction coefficient K is 0.807, and the focal length is 18.5 (mm), so that the moving amount of the third lens group G3 for correcting a rotational camera shake of 0.734 degrees is 0.294 (mm).

In the telephoto end state, the vibration reduction coefficient K is 1.321, and the focal length is 53.4 (mm), so that the moving amount of the third lens group G3 for correcting a rotational camera shake of 0.433 degrees is 0.306 (mm).

Various values associated with the zoom lens system having a vibration reduction function according to Example 6 are listed in Table 6.

TABLE 6

| Specifications | | | |
|---|---|---|---|
| | W | M | T |
| f = | 18.5 | 35.0 | 53.4 |
| FNO = | 3.6 | 4.5 | 5.9 |

| Lens Data | | | | |
|---|---|---|---|---|
| N | r | d | vd | nd |
| 1 | 131.712 | 1.9 | 59.45 | 1.5400 |
| 2 | 15.971 | 0.2 | 38.09 | 1.5539 |
| 3 | 13.618 | 9.7 | | |
| 4 | 87.982 | 1.3 | 64.10 | 1.5168 |
| 5 | 25.700 | 1.2 | | |
| 6 | 22.185 | 3.2 | 28.46 | 1.7283 |
| 7 | 38.952 | D7 | | |
| 8 | 23.434 | 1.0 | 27.51 | 1.7552 |
| 9 | 13.559 | 4.1 | 64.10 | 1.5168 |
| 10 | −130.808 | 0.1 | | |
| 11 | 36.669 | 2.2 | 58.94 | 1.5182 |
| 12 | −206.683 | D12 | | |
| 13 | 0.000 | 4.2 | Aperture Stop S | |
| 14 | −32.479 | 2.4 | 28.69 | 1.7950 |
| 15 | −11.321 | 1.3 | 50.23 | 1.7200 |
| 16 | 368.302 | 1.0 | | |
| 17 | 150.000 | 1.5 | 49.31 | 1.7432 |
| 18 | 47.176 | D18 | | |
| 19 | −314.793 | 3.2 | 64.10 | 1.5168 |
| 20 | −24.314 | 0.2 | | |
| 21 | 57.333 | 4.8 | 64.10 | 1.5168 |
| 22 | −18.137 | 1.0 | 27.51 | 1.7552 |
| 23 | −60.079 | Bf | | |

| Aspherical Data Surface Number: 3 |
|---|
| $\kappa = 1$ |
| C4 = 2.06310E−05 |
| C6 = 4.26210E−08 |
| C8 = −6.23900E−11 |
| C10 = 3.77100E−13 |

| Variable Distances | | | |
|---|---|---|---|
| | W | M | T |
| D7 = | 33.24 | 9.81 | 1.35 |
| D12 = | 0.90 | 5.63 | 9.06 |
| D18 = | 11.53 | 6.80 | 3.37 |
| Bf = | 39.71 | 53.79 | 71.87 |

| Values for Conditional Expressions | |
|---|---|
| (5): (r2 + r1)/(r2 − r1) = | 0.838 |
| (6): \|fvr/fw\| = | 2.754 |
| (7): \|fvr/f2\| = | 1.738 |

Figure 22A:
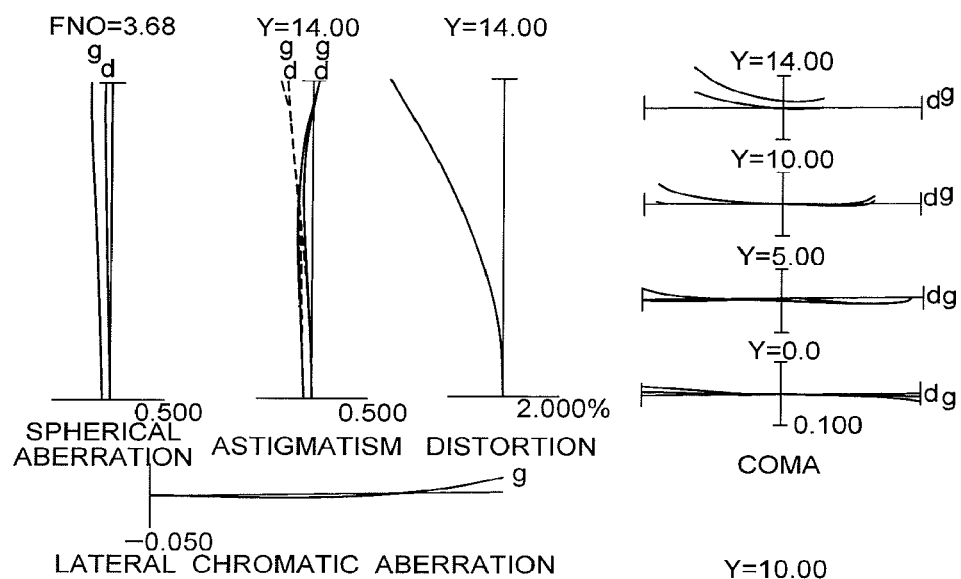
FIGS. 22A and 22B are graphs showing various aberrations of the zoom lens system according to Example 6 of the first embodiment in the wide-angle end state upon focusing on infinity, and coma upon correcting camera shake, respectively.
Figure 22B:
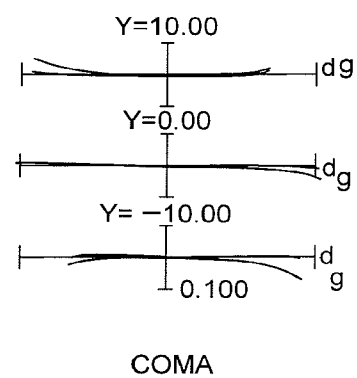
Figure 23:
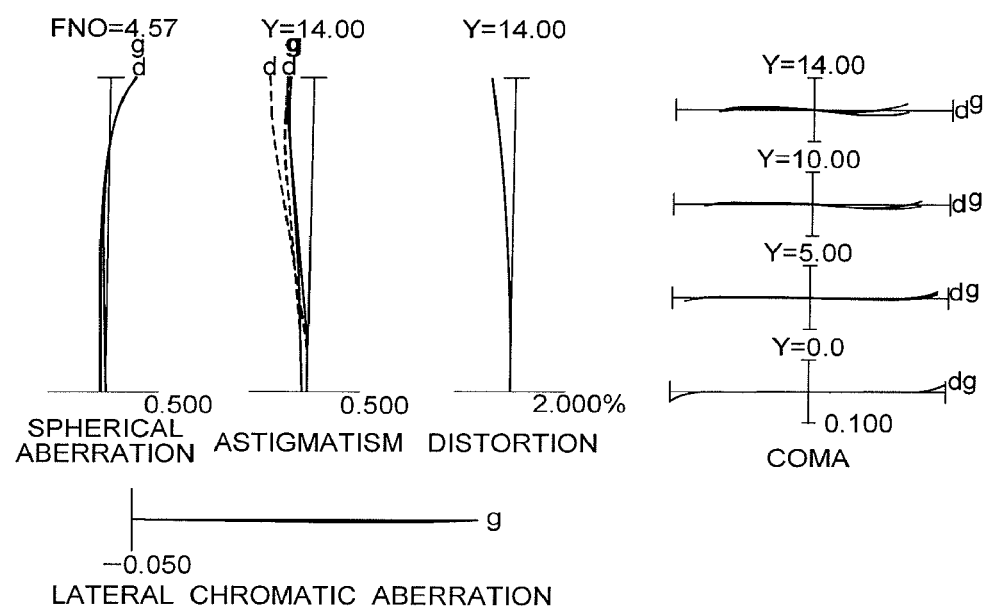
FIG. 23 is graphs showing various aberrations of the zoom lens system according to Example 6 of the first embodiment in the intermediate focal length state upon focusing on infinity.
Figure 24A:
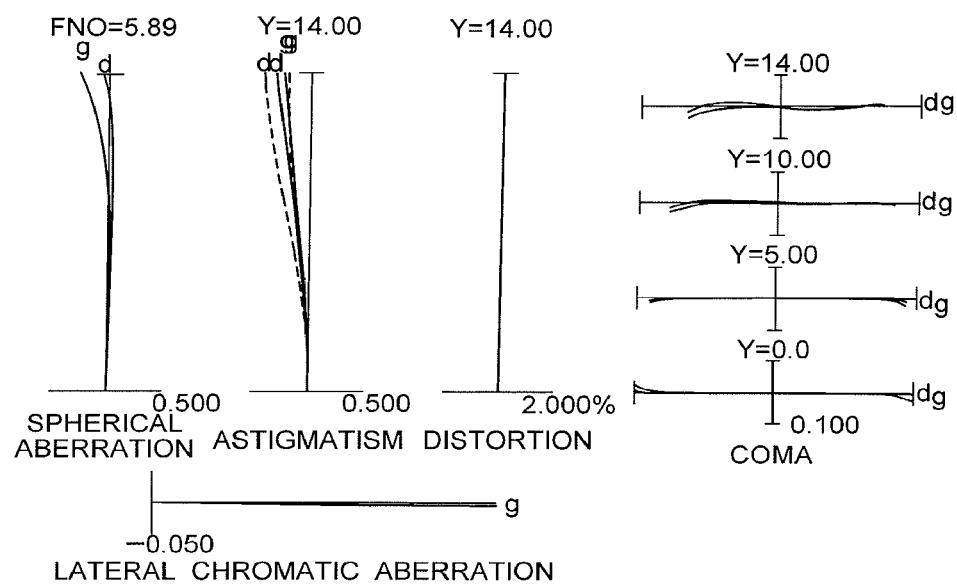
FIGS. 24A and 24B are graphs showing various aberrations of the zoom lens system according to Example 6 of the first embodiment in the telephoto end state upon focusing on infinity, and coma upon correcting camera shake, respectively.
Figure 24B:
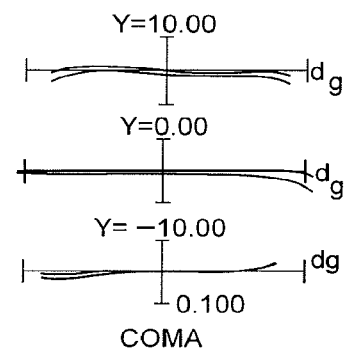

FIGS. 22A and 22B are graphs showing various aberrations of the zoom lens system according to Example 6 of the first embodiment in the wide-angle end state upon focusing on infinity, and coma upon correcting rotational camera shake, respectively. FIG. 23 is graphs showing various aberrations of the zoom lens system according to Example 6 of the first embodiment in the intermediate focal length state upon focusing on infinity. FIGS. 24A and 24B are graphs showing various aberrations of the zoom lens system according to Example 6 of the first embodiment in the telephoto end state upon focusing on infinity, and coma upon correcting rotational camera shake, respectively.

As is apparent from the respective graphs, the zoom lens system according to Example 6 shows superb optical performance as a result of good corrections to various aberrations from the wide-angle end state to the telephoto end state.

Example 7

Figure 25:
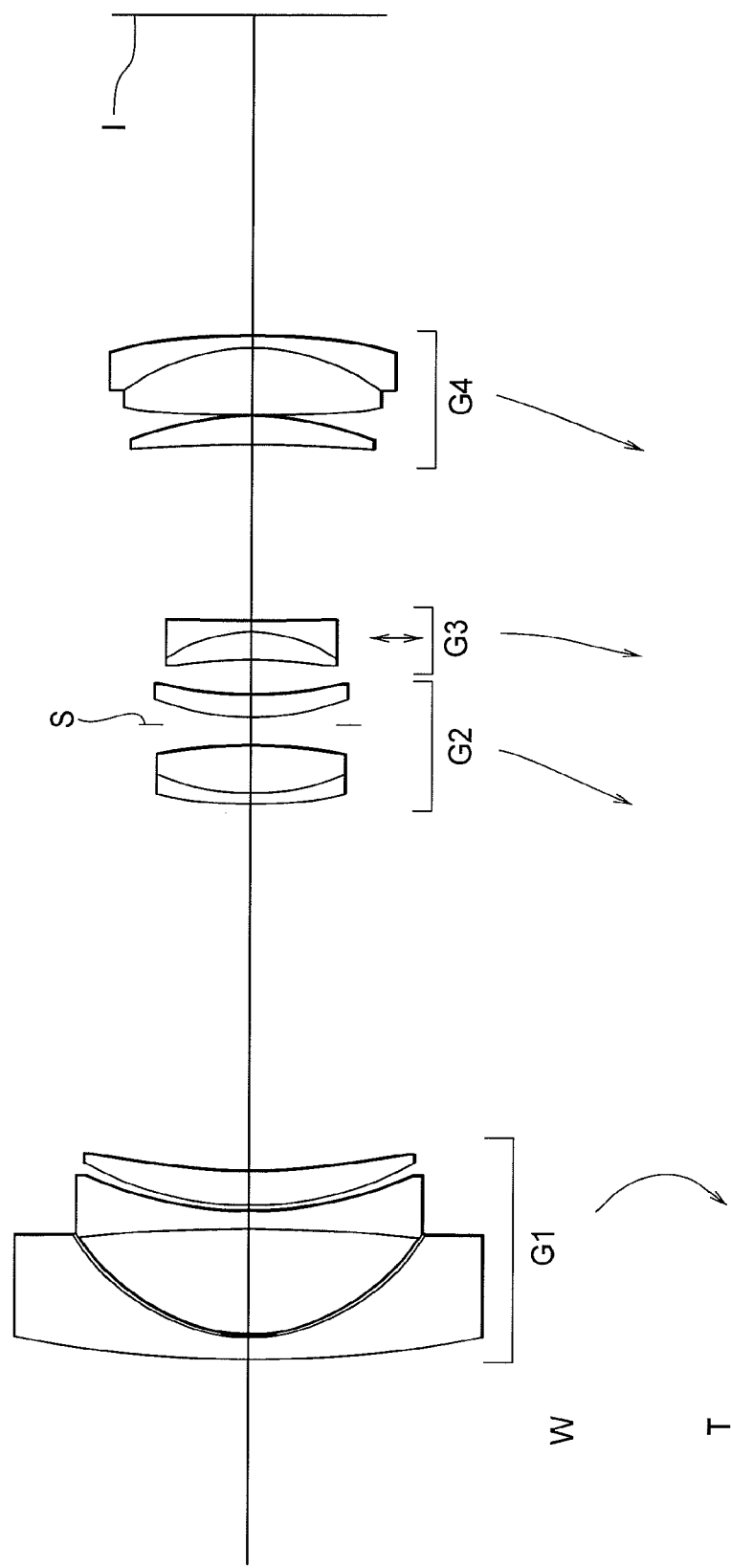
FIG. 25 is a sectional view showing a lens configuration of a zoom lens system according to Example 7 of a second embodiment in the wide-angle end state.

FIG. 25 is a sectional view showing a lens configuration of a zoom lens system having a vibration reduction function according to Example 7 of the second embodiment in a wide-angle end state.

The zoom lens system having a vibration reduction function according to Example 7 as shown in FIG. 25 includes, in order from an object, a first lens group G1 having negative refractive power, a second lens group G2 including an aperture stop S and having positive refractive power, a third lens group G3 having negative refractive power, and a fourth lens group G4 having positive refractive power.

The first lens group G1 is composed of, in order from the object, a negative meniscus lens having a convex surface facing the object, a double concave negative lens, and a positive meniscus lens having a convex surface facing the object. The most object side negative meniscus lens is an aspherical lens on which an aspherical surface is formed by forming a resin layer on the image plane I side of the glass lens surface.

The second lens group G2 is composed of, in order from the object, a cemented lens constructed by a negative meniscus lens having a convex surface facing the object cemented with a double convex positive lens, an aperture stop S, and a positive meniscus lens having a convex surface facing the object.

The third lens group G3 is composed of a cemented lens constructed by, in order from the object, a positive meniscus lens having a concave surface facing the object cemented with a double concave negative lens.

The fourth lens group G4 is composed of, in order from the object, a positive meniscus lens having a concave surface facing the object, and a cemented lens constructed by a double convex positive lens cemented with a negative meniscus lens having a convex surface facing to the image plane I side.

The aperture stop S is disposed in the second lens group G2, and moved in a body with the second lens group G2 upon zooming from the wide-angle end state to the telephoto end state.

Upon zooming from the wide-angle end state to the telephoto end state, the first lens group G1 is moved along a trajectory having a convex shape facing the image plane I side, the second lens group G2 and the fourth lens group G4 are moved in a body to the object, and the third lens group G3 is moved to the object.

In the zoom lens system having a vibration reduction function according to Example 7, an image blur on the image plane is corrected by moving the third lens group G3 in a direction perpendicular to the optical axis.

In the wide-angle end state in Example 7, the vibration reduction coefficient K is 1.024, and the focal length is 18.5 (mm), so that the moving amount of the third lens group G3 for correcting a rotational camera shake of 0.734 degrees is 0.231 (mm). In the telephoto end state, the vibration reduction coefficient K is 1.674, and the focal length is 53.4 (mm), so that the moving amount of the third lens group G3 for correcting a rotational camera shake of 0.432 degrees is 0.241 (mm).

Various values associated with the zoom lens system having a vibration reduction function according to Example 7 are listed in Table 7.

TABLE 7

| Specifications | | | |
|---|---|---|---|
| | W | M | T |
| f = | 18.5 | 35.0 | 53.4 |
| FNO = | 3.6 | 4.6 | 5.9 |

| Lens Data | | | | |
|---|---|---|---|---|
| N | r | d | vd | nd |
| 1 | 90.000 | 1.9 | 64.10 | 1.5168 |
| 2 | 15.600 | 0.2 | 38.09 | 1.5539 |
| 3 | 13.500 | 9.0 | | |
| 4 | −139.488 | 1.5 | 64.10 | 1.5168 |
| 5 | 29.888 | 0.5 | | |
| 6 | 25.526 | 2.9 | 27.51 | 1.7552 |
| 7 | 58.853 | D7 | | |
| 8 | 31.996 | 1.0 | 25.68 | 1.7847 |
| 9 | 16.606 | 4.1 | 58.94 | 1.5182 |
| 10 | −34.936 | 1.9 | | |
| 11 | 0.000 | 0.6 | Aperture Stop S | |
| 12 | 17.948 | 2.0 | 64.10 | 1.5168 |
| 13 | 30.374 | D13 | | |
| 14 | −41.530 | 2.4 | 32.35 | 1.8503 |
| 15 | −11.135 | 1.0 | 46.62 | 1.8160 |
| 16 | 116.283 | D16 | | |
| 17 | −123.488 | 2.5 | 64.10 | 1.5168 |
| 18 | −23.517 | 0.1 | | |
| 19 | 69.120 | 5.7 | 52.31 | 1.5174 |
| 20 | −15.976 | 1.0 | 28.69 | 1.7950 |
| 2 | −49.976 | Bf | | |

Aspherical Data
Surface Number: 3

κ = 1
C4 = 2.88580E−05
C6 = 4.53990E−08
C8 = −7.01060E−12
C10 = 8.75300E−13

| Variable Distances | | | |
|---|---|---|---|
| | W | M | T |
| D7 = | 31.69 | 9.47 | 12.19 |
| D13 = | 2.60 | 7.96 | 12.19 |
| D16 = | 15.19 | 9.83 | 5.60 |
| Bf = | 38.30 | 54.10 | 72.22 |

| Values for Conditional Expressions | |
|---|---|
| (5): (r2 + r1)/(r2 − r1) = | 0.474 |
| (6): |fvr/fw| = | 2.194 |
| (7): |fvr/f2| = | 1.413 |

Figure 26A:
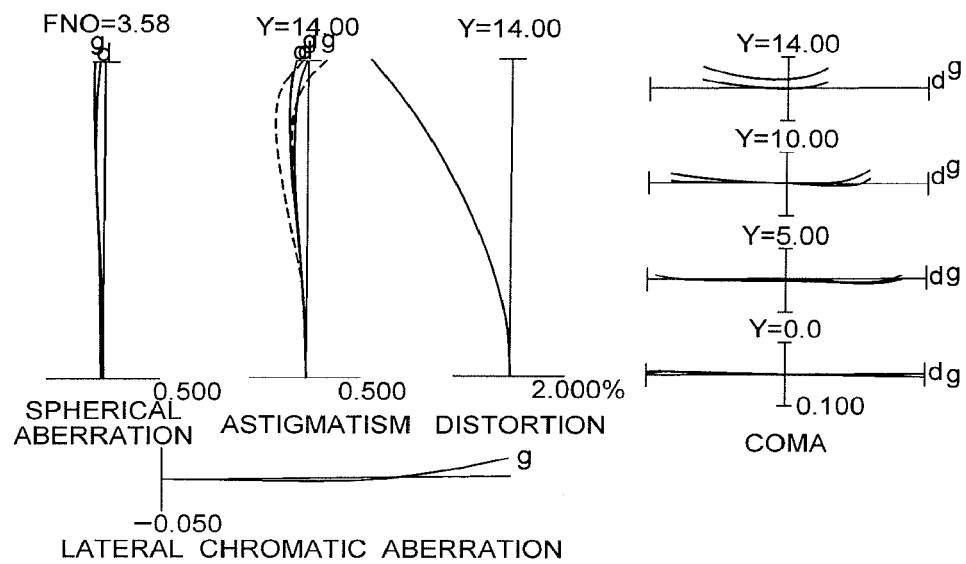
FIGS. 26A and 26B are graphs showing various aberrations of the zoom lens system according to Example 7 of the second embodiment in the wide-angle end state upon focusing on infinity, and coma upon correcting camera shake, respectively.
Figure 26B:
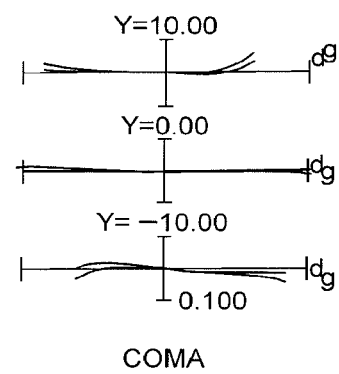
Figure 27:
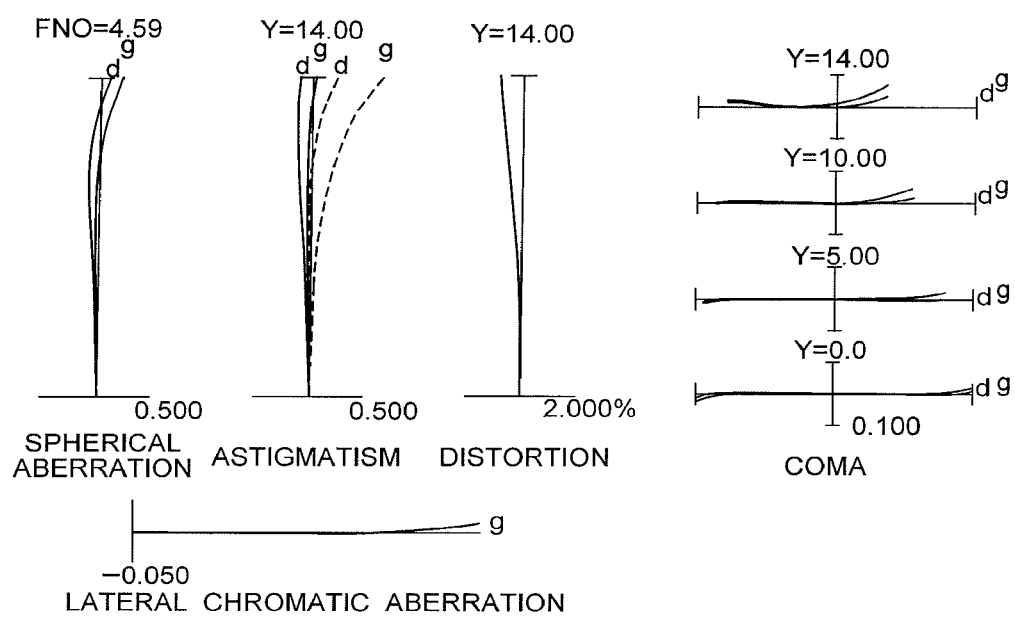
FIG. 27 is graphs showing various aberrations of the zoom lens system according to Example 7 of the first embodiment in the intermediate focal length state upon focusing on infinity.
Figure 28A:
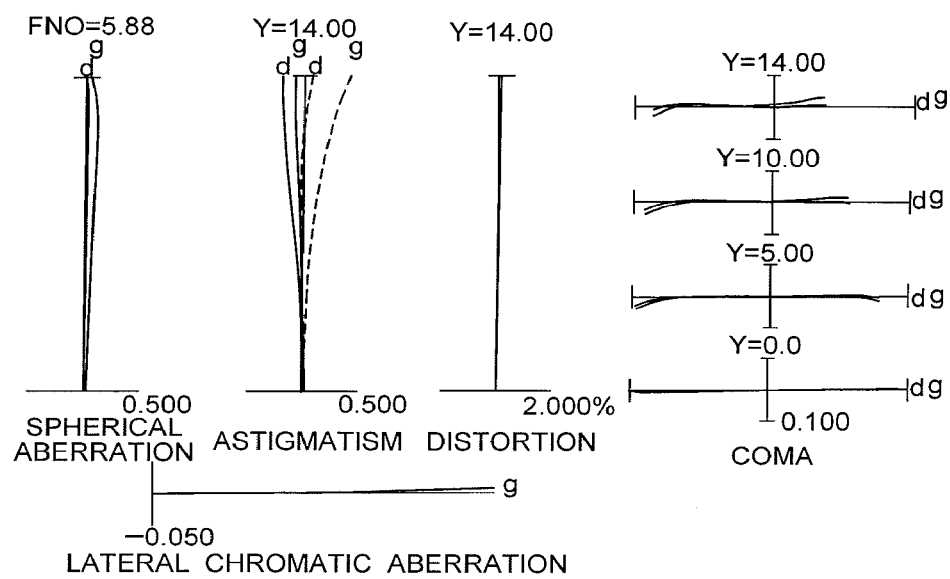
FIGS. 28A and 28B are graphs showing various aberrations of the zoom lens system according to Example 7 of the second embodiment in the telephoto end state upon focusing on infinity, and coma upon correcting camera shake, respectively.
Figure 28B:
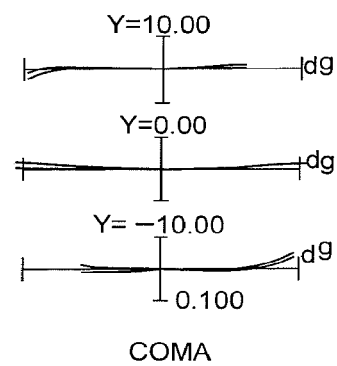

FIGS. 26A and 26B are graphs showing various aberrations of the zoom lens system according to Example 7 of the second embodiment in the wide-angle end state upon focusing on infinity, and coma upon correcting rotational camera shake, respectively. FIG. 27 is graphs showing various aberrations of the zoom lens system according to Example 7 of the first embodiment in the intermediate focal length state upon focusing on infinity. FIGS. 28A and 28B are graphs showing various aberrations of the zoom lens system according to Example 7 of the second embodiment in the telephoto end state upon focusing on infinity, and coma upon correcting rotational camera shake, respectively.

As is apparent from the respective graphs, the zoom lens system according to Example 7 shows superb optical performance as a result of good corrections to various aberrations from the wide-angle end state to the telephoto end state.

Example 8

FIG. 29 is a sectional view showing a lens configuration of a zoom lens system having a vibration reduction function according to Example 8 of the second embodiment in a wide-angle end state.

The zoom lens system having a vibration reduction function according to Example 8 as shown in FIG. 29 includes, in order from an object, a first lens group G1 having negative refractive power, a second lens group G2 having positive refractive power, an aperture stop S, a third lens group G3 having negative refractive power, a flare stop FS, and a fourth lens group G4 having positive refractive power.

The first lens group G1 is composed of, in order from the object, a negative meniscus lens having a convex surface facing the object, a double concave negative lens, and a positive meniscus lens having a convex surface facing the object. The most object side negative meniscus lens is an aspherical lens on which an aspherical surface is formed by forming a resin layer on the image plane I side of the glass lens surface.

The second lens group G2 is composed of, in order from the object, a cemented lens constructed by a negative meniscus lens having a convex surface facing the object cemented with a double convex positive lens, and a positive meniscus lens having a convex surface facing the object.

The third lens group G3 is composed of a cemented lens constructed by, in order from the object, a positive meniscus lens having a concave surface facing the object cemented with a double concave negative lens.

The fourth lens group G4 is composed of, in order from the object, a positive meniscus lens having a concave surface facing the object, and a cemented lens constructed by a double convex positive lens cemented with a negative meniscus lens having a convex surface facing to the image plane I side.

The aperture stop S is disposed between the second lens group G2 and the third lens group G3, and the fixed stop FS is disposed between the third lens group G3 and the fourth lens group G4, and moved together with the third lens group G3 upon zooming from the wide-angle end state to the telephoto end state.

Upon zooming from the wide-angle end state to the telephoto end state, the first lens group G1 is moved along a trajectory having a convex shape facing the image plane I side, the second lens group G2 and the fourth lens group G4 are moved in a body to the object, and the third lens group G3 is moved to the object.

In the zoom lens system having a vibration reduction function according to Example 8, an image blur on the image plane is corrected by moving the third lens group G3 in a direction perpendicular to the optical axis.

In the wide-angle end state in Example 8, the vibration reduction coefficient K is 1.186, and the focal length is 18.7 (mm), so that the moving amount of the third lens group G3 for correcting a rotational camera shake of 0.731 degrees is 0.202 (mm). In the telephoto end state, the vibration reduction coefficient K is 1.906, and the focal length is 53.4 (mm), so that the moving amount of the third lens group G3 for correcting a rotational camera shake of 0.432 degrees is 0.211 (mm).

Various values associated with the zoom lens system having a vibration reduction function according to Example 8 are listed in Table 8.

TABLE 8

Specifications

| | W | M | T |
|---|---|---|---|
| f = | 18.7 | 35.1 | 53.4 |
| FNO = | 3.6 | 4.8 | 5.8 |

Lens Data

| N | r | d | vd | nd |
|---|---|---|---|---|
| 1 | 119.035 | 1.9 | 64.10 | 1.5168 |
| 2 | 15.000 | 0.2 | 38.09 | 1.5539 |
| 3 | 12.800 | 10.4 | | |
| 4 | −437.199 | 1.7 | 61.16 | 1.5891 |
| 5 | 32.272 | 0.4 | | |
| 6 | 24.794 | 3.4 | 27.51 | 1.7552 |
| 7 | 57.814 | D7 | | |
| 8 | 25.900 | 1.2 | 23.78 | 1.8467 |
| 9 | 15.477 | 4.6 | 59.45 | 1.5400 |
| 10 | −38.388 | 0.1 | | |
| 11 | 27.920 | 2.3 | 52.31 | 1.5174 |
| 12 | 62.795 | D12 | | |
| 13 | 0.000 | 2.9 | Aperture Stop S | |
| 14 | −35.900 | 2.8 | 32.35 | 1.8503 |
| 15 | −10.500 | 0.9 | 46.62 | 1.8160 |
| 16 | 100.889 | 4.6 | | |
| 17 | 0.000 | D17 | Fixed Stop FS | |
| 18 | −300.000 | 3.0 | 70.41 | 1.4875 |
| 19 | −23.887 | 0.1 | | |
| 20 | 98.237 | 5.3 | 70.41 | 1.4875 |
| 21 | −17.144 | 1.4 | 32.35 | 1.8503 |
| 22 | −39.167 | Bf | | |

Aspherical Data
Surface Number: 3

κ = 1
C4 = 3.13260E−05
C6 = 7.07910E−08
C8 = −7.54810E−11
C10 = 1.22730E−12

Variable Distances

| | W | M | T |
|---|---|---|---|
| D7 = | 31.87 | 9.65 | 2.18 |
| D12 = | 2.6 | 7.96 | 12.19 |
| D17 = | 15.69 | 10.33 | 6.1 |
| Bf = | 38.36 | 54.08 | 72.07 |

Values for Conditional Expressions

| | |
|---|---|
| (5): (r2 + r1)/(r2 − r1) = | 0.475 |
| (6): \|fvr/fw\| = | 1.855 |
| (7): \|fvr/f2\| = | 1.276 |

Figure 30A:
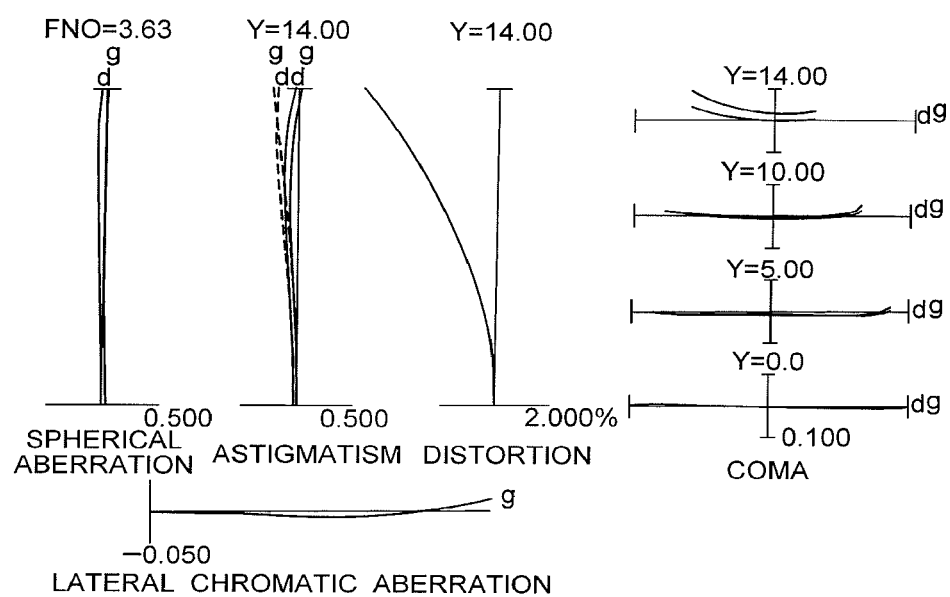
FIGS. 30A and 30B are graphs showing various aberrations of the zoom lens system according to Example 8 of the second embodiment in the wide-angle end state upon focusing on infinity, and coma upon correcting camera shake, respectively.
Figure 30B:
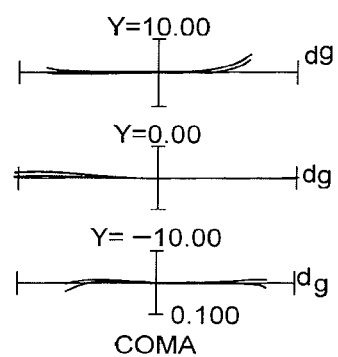
Figure 31:
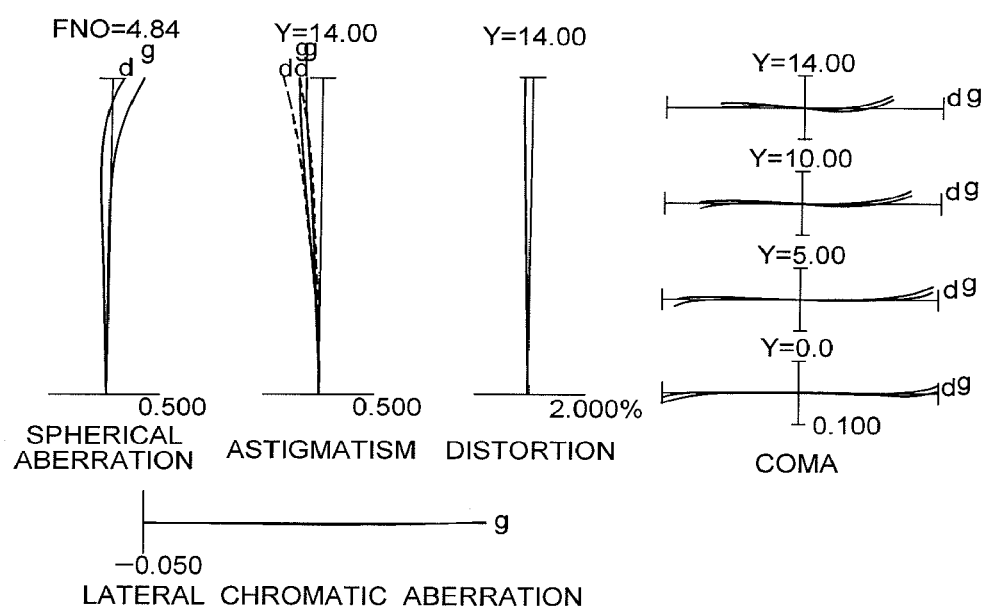
FIG. 31 is graphs showing various aberrations of the zoom lens system according to Example 8 of the second embodiment in the intermediate focal length state upon focusing on infinity.
Figure 32A:
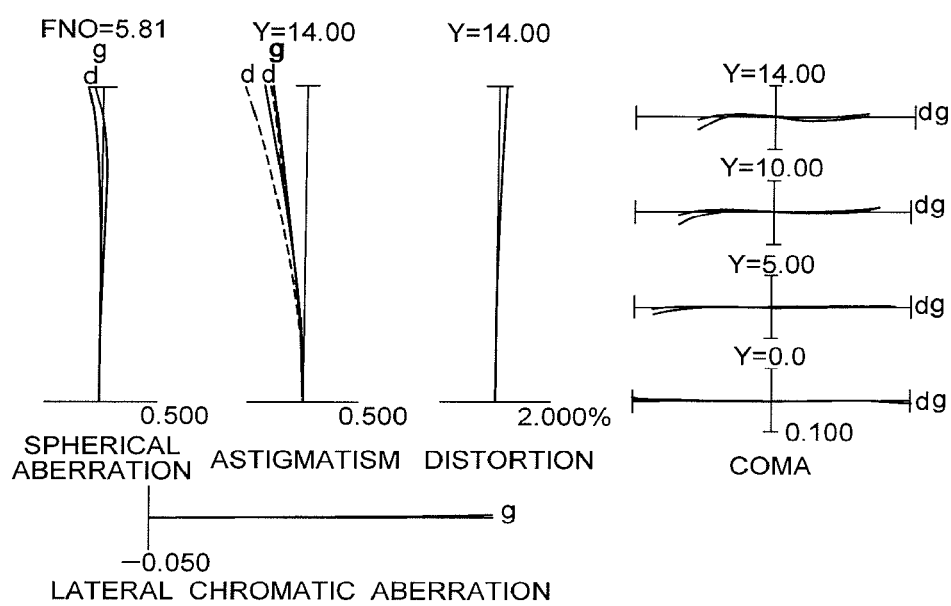
FIGS. 32A and 32B are graphs showing various aberrations of the zoom lens system according to Example 8 of the second embodiment in the telephoto end state upon focusing on infinity, and coma upon correcting camera shake, respectively.
Figure 32B:
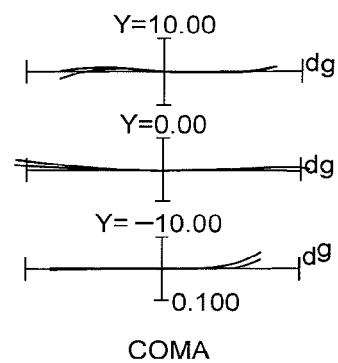

FIGS. 30A and 30B are graphs showing various aberrations of the zoom lens system according to Example 8 of the second embodiment in the wide-angle end state upon focusing on infinity, and coma upon correcting rotational camera shake, respectively. FIG. 31 is graphs showing various aberrations of the zoom lens system according to Example 8 of the second embodiment in the intermediate focal length state upon focusing on infinity. FIGS. 32A and 32B are graphs showing various aberrations of the zoom lens system according to Example 8 of the second embodiment in the telephoto end state upon focusing on infinity, and coma upon correcting rotational camera shake, respectively.

As is apparent from the respective graphs, the zoom lens system according to Example 8 shows superb optical performance as a result of good corrections to various aberrations from the wide-angle end state to the telephoto end state.

Example 9

FIG. 33 is a sectional view showing a lens configuration of a zoom lens system having a vibration reduction function according to Example 9 of the second embodiment in a wide-angle end state.

The zoom lens system having a vibration reduction function according to Example 9 as shown in FIG. 33 includes, in order from an object, a first lens group G1 having negative refractive power, a second lens group G2 having positive refractive power, an aperture stop S, a third lens group G3 having negative refractive power, and a fourth lens group G4 having positive refractive power.

The first lens group G1 is composed of, in order from the object, a negative meniscus lens having a convex surface facing the object, a negative meniscus lens having a convex surface facing the object, and a positive meniscus lens having a convex surface facing the object. The most object side negative meniscus lens is an aspherical lens on which an aspherical surface is formed by forming a resin layer on the image plane I side of the glass lens surface.

The second lens group G2 is composed of, in order from the object, a cemented lens constructed by a negative meniscus lens having a convex surface facing the object cemented with a double convex positive lens, and a double convex positive lens.

The third lens group G3 is composed of, in order from the object, a cemented negative lens constructed by a positive meniscus lens having a concave surface facing the object cemented with a double concave negative lens, a positive meniscus lens having a concave surface facing the object, and a negative meniscus lens having a convex surface facing the object.

The fourth lens group G4 is composed of, in order from the object, a positive meniscus lens having a concave surface facing the object, and a cemented lens constructed by a double convex positive lens cemented with a negative meniscus lens having a convex surface facing to the image plane T side.

The aperture stop S is disposed between the second lens group G2 and the third lens group G3, and moved together with the third lens group G3 upon zooming from the wide-angle end state to the telephoto end state.

Upon zooming from the wide-angle end state to the telephoto end state, the first lens group G1 is moved along a trajectory having a convex shape facing the image plane T side, the second lens group G2 and the fourth lens group G4 are moved in a body to the object, and the third lens group G3 is moved to the object.

In the zoom lens system having a vibration reduction function according to Example 9, an image blur on the image plane is corrected by moving the cemented negative lens and the positive meniscus lens having a convex surface facing the object in the third lens group G3 in a direction perpendicular to the optical axis.

In the wide-angle end state in Example 9, the vibration reduction coefficient K is 1.086, and the focal length is 18.7 (mm), so that the moving amount of the third lens group G3 for correcting a rotational camera shake of 0.731 degrees is 0.218 (mm). In the telephoto end state, the vibration reduction coefficient K is 1.792, and the focal length is 53.4 (mm), so that the moving amount of the third lens group G3 for correcting a rotational camera shake of 0.432 degrees is 0.225 (mm).

Various values associated with the zoom lens system having a vibration reduction function according to Example 9 are listed in Table 9.

TABLE 9

| Specifications | | | |
|---|---|---|---|
| | W | M | T |
| f = | 18.7 | 35.1 | 53.4 |
| FNO = | 3.6 | 4.8 | 5.8 |

| Lens Data | | | | |
|---|---|---|---|---|
| N | r | d | vd | nd |
| 1 | 131.711 | 1.9 | 59.40 | 1.5400 |
| 2 | 15.971 | 0.2 | 38.09 | 1.5539 |
| 3 | 13.618 | 9.7 | | |
| 4 | 134.981 | 1.3 | 58.89 | 1.5182 |
| 5 | 26.404 | 1.2 | | |
| 6 | 23.690 | 3.2 | 27.51 | 1.7552 |
| 7 | 46.383 | D7 | | |
| 8 | 22.804 | 1.0 | 27.51 | 1.7552 |
| 9 | 13.402 | 4.1 | 64.12 | 1.5168 |
| 10 | −128.299 | 0.1 | | |
| 11 | 33.277 | 2.2 | 58.89 | 1.5182 |
| 12 | −2813.664 | D12 | | |
| 13 | 0.000 | 4.2 | Aperture Stop S | |
| 14 | −29.652 | 2.4 | 28.69 | 1.7950 |
| 15 | −11.583 | 1.3 | 50.70 | 1.6779 |
| 16 | 31.636 | 1.0 | | |
| 17 | 43.452 | 1.5 | 58.89 | 1.5182 |
| 18 | 500 | 0.5 | | |
| 19 | 150 | 1.5 | 54.66 | 1.7292 |
| 20 | 84.620 | D20 | | |
| 21 | −365.935 | 3.2 | 64.12 | 1.5168 |
| 22 | −26.352 | 0.2 | | |
| 23 | 61.629 | 4.8 | 64.12 | 1.5168 |
| 24 | −17.815 | 1.0 | 27.51 | 1.7552 |
| 25 | −50.125 | Bf | | |

Aspherical Data
Surface Number: 3

κ = 1
C4 = 1.91160E−05
C6 = 4.26210E−08
C8 = −5.83820E−11
C10 = 2.93910E−13

| Variable Distances | | | |
|---|---|---|---|
| | W | M | T |
| D7 = | 33.11 | 9.69 | 1.23 |
| D12 = | 1.33 | 6.07 | 9.50 |
| D20 = | 8.90 | 4.17 | 0.73 |
| Bf = | 39.31 | 53.38 | 71.46 |

| Values for Conditional Expressions | |
|---|---|
| (5): (r2 + r1)/(r2 − r1) = | 0.888 |
| (6): \|fvr/fw\| = | 1.942 |
| (7): \|fvr/f2\| = | 1.226 |

Figure 34A:
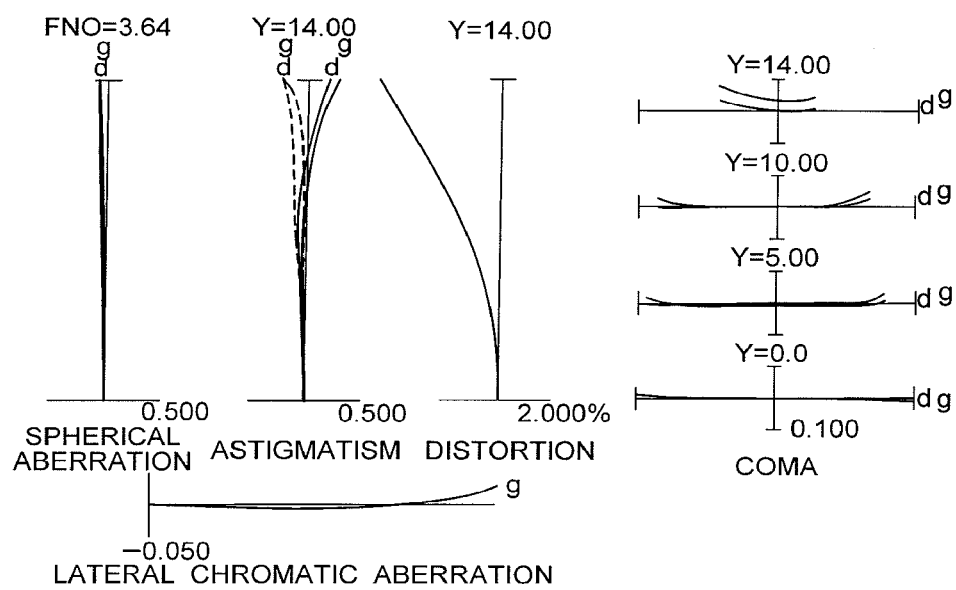
FIGS. 34A and 34B are graphs showing various aberrations of the zoom lens system according to Example 9 of the second embodiment in the wide-angle end state upon focusing on infinity, and coma upon correcting camera shake, respectively.
Figure 34B:
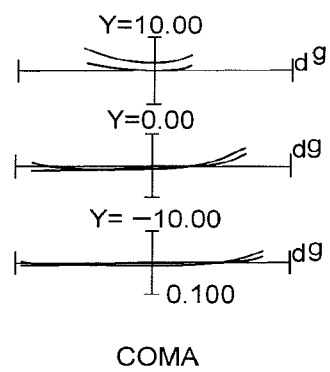
Figure 35:
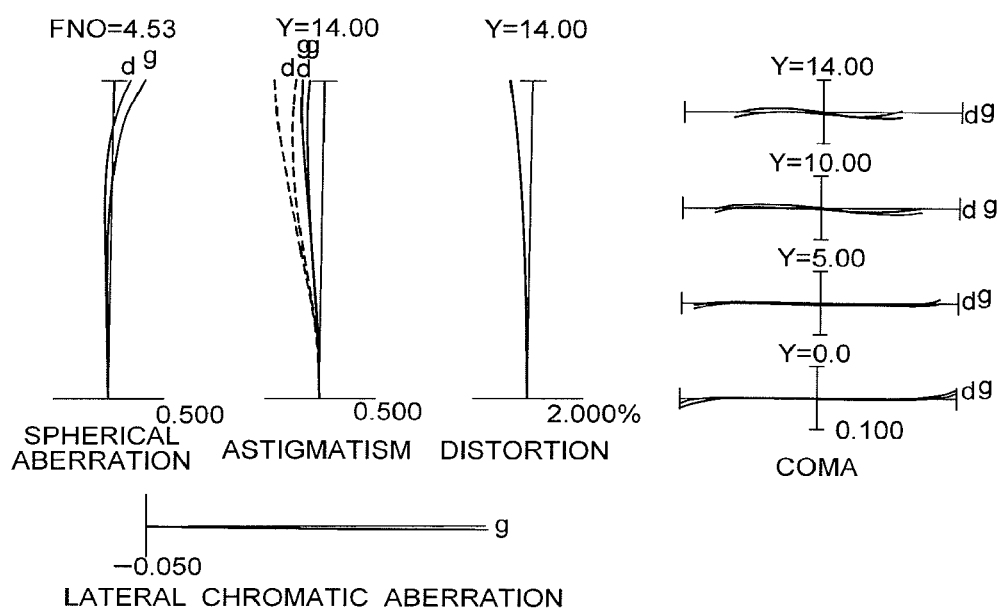
FIG. 35 is graphs showing various aberrations of the zoom lens system according to Example 9 of the second embodiment in the intermediate focal length state upon focusing on infinity.
Figure 36A:
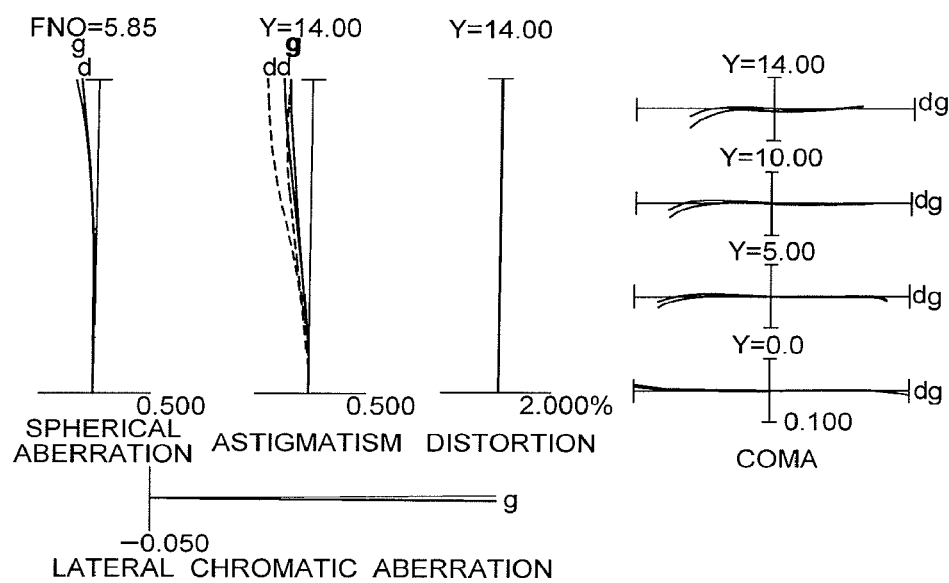
FIGS. 36A and 36B are graphs showing various aberrations of the zoom lens system according to Example 9 of the second embodiment in the telephoto end state upon focusing on infinity, and coma upon correcting camera shake, respectively.
Figure 36B:
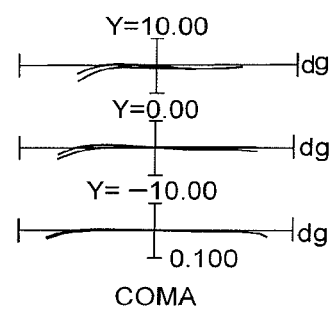

FIGS. 34A and 34B are graphs showing various aberrations of the zoom lens system according to Example 9 of the second embodiment in the wide-angle end state upon focusing on infinity, and coma upon correcting rotational camera shake, respectively. FIG. 35 is graphs showing various aberrations of the zoom lens system according to Example 9 of the second embodiment in the intermediate focal length state upon focusing on infinity. FIGS. 36A and 36B are graphs showing various aberrations of the zoom lens system according to Example 9 of the second embodiment in the telephoto end state upon focusing on infinity, rind coma upon correcting rotational camera shake, respectively.

As is apparent from the respective graphs, the zoom lens system according to Example 9 shows superb optical performance as a result of good corrections to various aberrations from the wide angle end state to the telephoto end state.

Third Embodiment

A zoom lens system having a vibration reduction function according to a third embodiment of the present application is explained below.

A zoom lens system having a vibration reduction function according to the third embodiment includes, in order from an object, a first lens group having negative refractive power, a second lens group having positive refractive power, a third lens group having negative refractive power, and a fourth lens group having positive refractive power. Upon zooming from a wide-angle end state to a telephoto end state, each lens group moves such that a distance between the second lens group and the third lens group varies, and a distance between the third lens group and the fourth lens group decreases. At least one portion of the third lens group is moved as a vibration reduction lens group in a direction perpendicular to the optical axis upon carrying out image plane correction upon a camera shake. The vibration reduction lens group includes at least one aspherical surface. The following conditional expressions (1) and (2) are satisfied:

$$1.20 < f2/fw < 2.50 \quad (1)$$

$$-2.10 < f3/fw < -0.80 \quad (2)$$

where f2 denotes a focal length of the second lens group, f3 denotes a focal length of the third lens group, and fw denotes a focal length of the zoom lens system in the wide-angle end state.

Conditional expression (1) defines refractive power of the second lens group. However, it has been explained above, so that duplicated explanation is omitted.

Conditional expression (2) defines refractive power of the third lens group. However, it has been explained above, so that duplicated explanation is omitted.

With increasing the distance between the second lens group and the third lens group, and decreasing the distance between the third lens group and the fourth lens group, it becomes possible to accomplish a high zoom ratio and to reduce variation in spherical aberration upon zooming, so that it is desirable.

Moreover, the at least one aspherical surface in the third lens group has a shape that positive refractive power becomes stronger or negative refractive power becomes weaker from the optical axis to the periphery in comparison with a spherical surface having a paraxial radius of curvature. The following conditional expressions (8), (9) and (10) are satisfied:

$$0.00001 < |ASPd0.5|/(H/2) < 0.01 \quad (8)$$

$$0.0001 < |ASPd1.0|/(H/2) < 0.01 \quad (9)$$

$$|ASPd0.5|/|ASPd1.0| < 1 \quad (10)$$

where H denotes effective diameter of the aspherical lens, ASPd0.5 denotes difference between the aspherical surface and the paraxial radius of curvature at the 50% height of the effective diameter of the aspherical surface, and ASPd1.0 denotes difference between the aspherical surface and the paraxial radius of curvature at the 100% height of the effective diameter of the aspherical surface.

Conditional expressions (8), (9) and (10) define the aspherical shape for suppressing deterioration in optical performance upon moving the third lens group as a vibration reduction lens group in a direction perpendicular to the optical axis. When respective values are equal to or fall below the lower limits of conditional expressions (8) and (9), effect of the aspherical surface cannot shows, and the number of lenses for correcting various aberrations increases, so that it is undesirable. Otherwise, coma becomes worse, so that it is undesirable. On the other hand, when the values are equal to or exceed the upper limits of conditional expressions (8) and (9), correction of aberrations such as spherical aberration become excessive, and optical performance upon moving the vibration reduction lens group becomes worse. When the aspherical surface has a shape that positive refractive power becomes stronger or negative refractive power becomes weaker from the optical axis to the periphery than a spherical surface having the same paraxial radius of curvature, it becomes possible to effectively correct on axis and off-axis aberrations upon moving the vibration reduction lens. When the value is equal to or exceeds the upper limit of conditional expression (10), spherical aberration and high order coma are generated in the vibration reduction lens group upon moving the vibration reduction lens group, so that optical performance upon vibration reduction becomes worse.

In a zoom lens system having a vibration reduction function according to the third embodiment, the third lens group preferably has a cemented lens. With this configuration, it becomes possible to sufficiently suppress lateral chromatic aberration upon vibration reduction.

In a zoom lens system having a vibration reduction function according to the third embodiment, it is preferable that the first lens group includes at least one aspherical surface, and is composed of three lenses or less. With this configuration, it becomes possible to reduce total lens length, and to excellently correct curvature of field.

In a zoom lens system having a vibration reduction function according to the third embodiment, it is preferable that the most object side lens in the first lens group has negative refractive power and an aspherical surface formed on the image side surface. With this configuration, it becomes possible to excellently correct curvature of field and coma in the wide-angle side.

In a zoom lens system having a vibration reduction function according to the third embodiment, it is preferable that the fourth lens group is composed of three lenses or less, and has at least one aspherical surface. With this configuration, it becomes possible to shorten the lens length, and to excellently correct coma.

In a zoom lens system having a vibration reduction function according to the third embodiment, it is preferable that each of the second lens group through the fourth lens group has at least one cemented lens. With this configuration, it becomes possible to sufficiently suppress chromatic aberration, in particular, lateral chromatic aberration generated upon vibration reduction.

In a zoom lens system having a vibration reduction function according to the third embodiment, it is preferable that the most image side lens surface has a convex shape facing the image plane. With this configuration, it becomes possible to excellently correct curvature of field, and to reduce ghost images formed by reflection light from the image plane.

With disposing an aperture stop in the vicinity of the third lens group, it becomes possible to excellently correct various aberrations such as spherical aberration.

With moving the aperture stop together with the third lens group upon zooming from the wide-angle end state to the telephoto end state, it becomes possible to reduce variation in various aberrations such as spherical aberration upon zooming.

A zoom lens system having a vibration reduction function according to the third embodiment is explained below with reference to accompanying drawings.

Example 10

FIG. 37 is a sectional view showing a lens configuration of a zoom lens system having a vibration reduction function according to Example 10 of a third embodiment in a wide-angle end state.

The zoom lens system having a vibration reduction function according to Example 10 is composed of as shown in FIG. 37, in order from an object, a first lens group G1 having negative refractive power, a second lens group G2 having positive refractive power, an aperture stop S, a third lens group G3 having negative refractive power, and a fourth lens group G4 having positive refractive power.

The first lens group G1 is composed of, in order from the object, a negative meniscus lens having a convex surface facing the object, a double concave negative lens, and a positive meniscus lens having a convex surface facing the object. The most object side negative meniscus lens is an aspherical lens on which an aspherical surface is formed by forming a resin layer on the image plane I side of the glass lens surface.

The second lens group G2 is composed of, in order from the object, a cemented lens constructed by a negative meniscus lens having a convex surface facing the object cemented with a double convex positive lens, and a positive meniscus lens having a convex surface facing the object.

The third lens group G3 is composed of a cemented lens constructed by, in order from the object, a positive meniscus lens having a concave surface facing the object cemented with a double concave negative lens.

The fourth lens group G4 is composed of, in order from the object, a double convex positive lens, and a cemented lens constructed by a double convex positive lens cemented with a negative meniscus lens having d convex surface facing the image plane I side.

The aperture stop S is disposed between the second lens group G2 and the third lens group G3, and is moved together with the third lens group G3 upon zooming from the wide-angle end state to the telephoto end state.

Upon zooming from the wide-angle end state to the telephoto end state, the first lens group G1 is moved along a trajectory having a convex shape facing the image plane I, and the second lens group G2, the third lens group G3, and the fourth lens group G4 are moved to the object side.

In the zoom lens system having a vibration reduction function according to Example 10, an image blur on the image plane is corrected by moving the third lens group G3 group in a direction perpendicular to the optical axis.

In the wide-angle end state in Example 10, the vibration reduction coefficient K is 1.155, and the focal length is 18.7/(mm), so that the moving amount of the third lens group G3 for correcting a rotational camera shake of 0.731 degrees is 0.207 (mm) In the telephoto end state, the vibration reduction coefficient K is 1.845, and the focal length is 53.3 (mm), so that the moving amount of the third lens group G3 for correcting a rotational camera shake of 0.433 degrees is 0.218 (mm).

Various values associated with the zoom lens system having a vibration reduction function according to Example 10 are listed in Table 10.

TABLE 10

Specifications

|  | W | T |
|---|---|---|
| f = | 18.7 | 53.3 |
| FNO = | 3.70 | 5.88 |

Lens Data

| N | r | d | vd | nd |
|---|---|---|---|---|
| 1 | 109.000 | 1.90 | 64.12 | 1.5168 |
| 2 | 15.000 | 0.17 | 38.09 | 1.5539 |
| 3 | 12.800 | 10.40 | | |
| 4 | −95.070 | 1.70 | 61.18 | 1.5891 |
| 5 | 36.608 | 0.40 | | |
| 6 | 28.725 | 3.40 | 27.51 | 1.7552 |
| 7 | 100.883 | D7 | | |
| 8 | 31.555 | 1.10 | 23.78 | 1.8467 |
| 9 | 17.803 | 4.30 | 59.4 | 1.5400 |
| 10 | −35.066 | 0.10 | | |
| 11 | 23.456 | 2.30 | 70.45 | 1.4875 |
| 12 | 56.371 | D12 | | |
| 13 | 0.000 | 2.60 | Aperture Stop S | |
| 14 | −46.798 | 3.00 | 32.35 | 1.8503 |
| 15 | −11.046 | 0.90 | 46.63 | 1.8160 |
| 16 | 69.497 | D16 | | |
| 17 | 2543.571 | 3.20 | 64.12 | 1.5168 |
| 18 | −25.206 | 0.10 | | |
| 19 | 188.439 | 5.00 | 70.45 | 1.4875 |
| 20 | −16.411 | 1.40 | 32.35 | 1.8503 |
| 21 | −39.355 | Bf | | |

Aspherical Data

Surface Number: 3

κ = 0
C4 = 3.0295E−05
C6 = 4.4581E−08
C8 = 3.8221E−10
C10 = −1.7489E−12
C12 = 6.8147E−15
Surface Number: 14
Effective Diameter H = 6.00

κ = 13.8934
C4 = −2.9312E−05
C6 = 2.4670E−08
C8 = 0.0000E+00
C10 = 0.0000E+00
C12 = 0.0000E+00
Surface Number: 16
Effective Diameter H = 6.49

κ = 12.5281
C4 = −6.1184E−06
C6 = −3.5034E−08
C8 = 0.0000E+00
C10 = 0.0000E+00
C12 = 0.0000E+00

Variable Distances

|  | W | M | T |
|---|---|---|---|
| D7 = | 31.87 | 9.65 | 2.18 |
| D12 = | 2.60 | 7.96 | 12.19 |
| D16 = | 16.54 | 11.18 | 6.95 |
| Bf = | 37.67 | 54.02 | 72.46 |

TABLE 10-continued

Values for Conditional Expressions

| (1): f2/fW = | 1.49 |
|---|---|
| (2): f3/fW = | −1.60 |
| (8): |ASPd0.5|/(H/2) = | 0.000307 (surface: 14) |
| = | 0.000391 (surface: 16) |
| (9): |ASPd1.0|/(H/2) = | 0.00527 (surface: 14) |
| = | 0.00677 (surface: 16) |
| (10): |ASPd0.5|/|ASPd1.0| = | 0.058 |

Figure 38A:
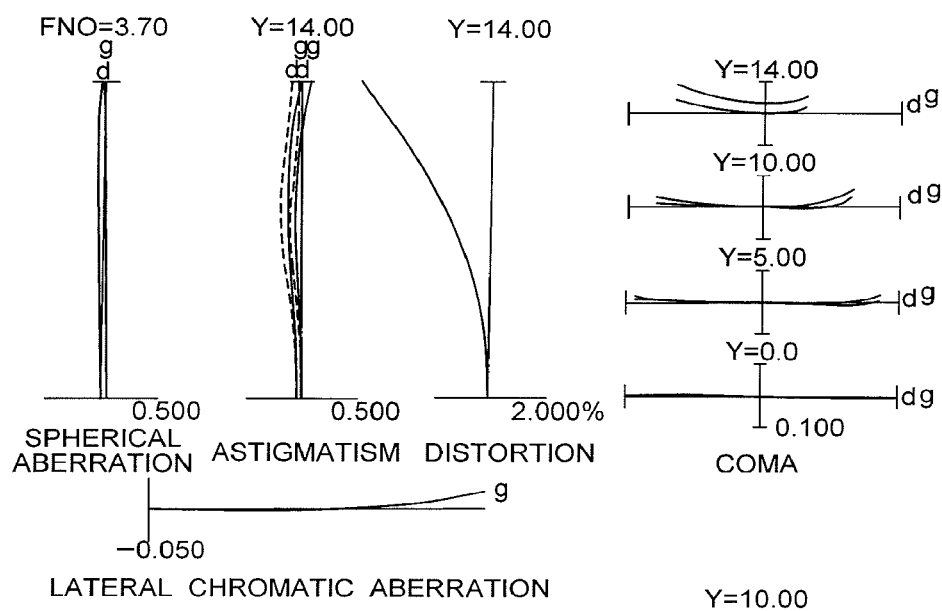
FIGS. 38A and 38B are graphs showing various aberrations of the zoom lens system according to Example 10 of the third embodiment in the wide-angle end state upon focusing on infinity, and coma upon correcting camera shake, respectively.
Figure 38B:
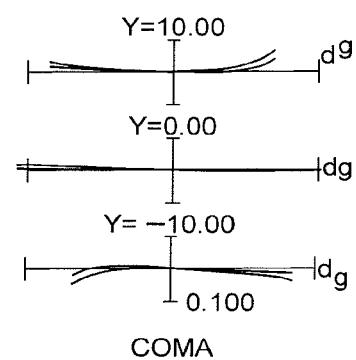
Figure 39:
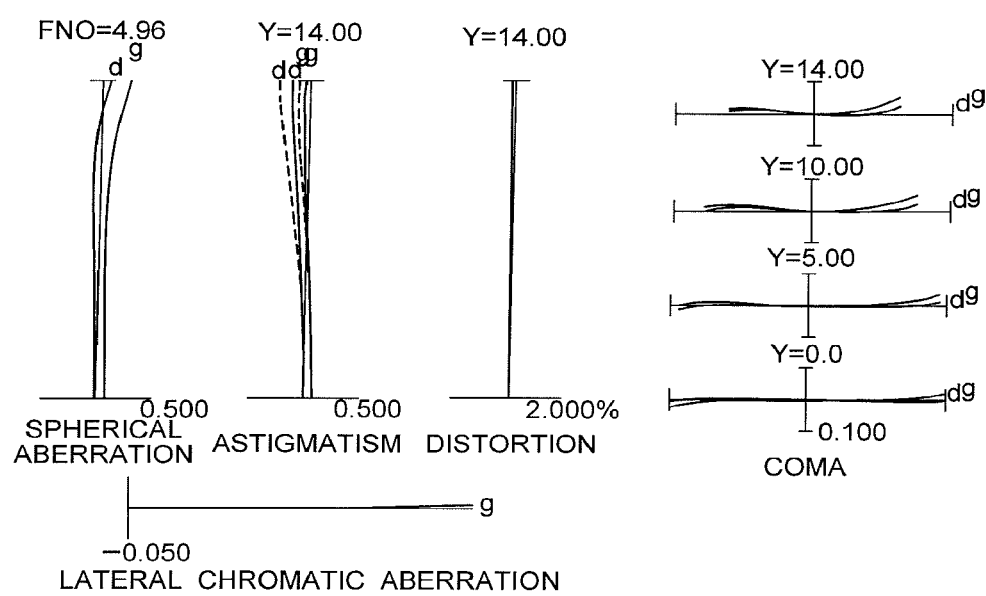
FIG. 39 is graphs showing various aberrations of the zoom lens system according to Example 10 of the third embodiment in the intermediate focal length state upon focusing on infinity.
Figure 40A:
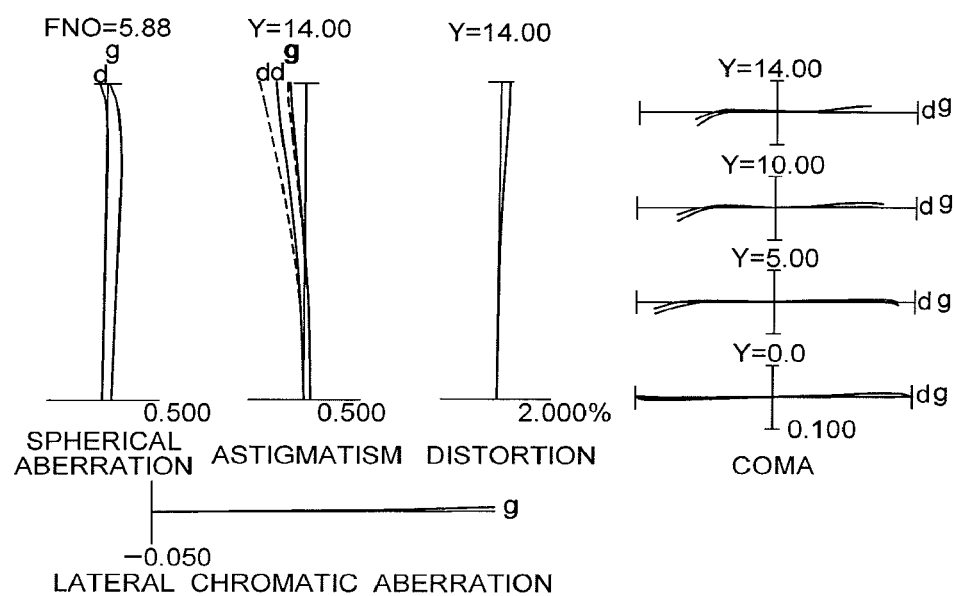
FIGS. 40A and 40B are graphs showing various b aberrations of the zoom lens system according to Example 10 of the third embodiment in the telephoto end state upon focusing on infinity, and coma upon correcting camera shake, respectively.
Figure 40B:
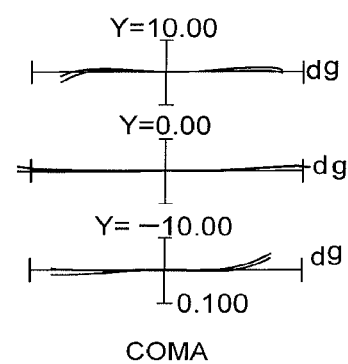

FIGS. 38A and 38B are graphs showing various aberrations of the zoom lens system according to Example 10 of the third embodiment in the wide-angle end state upon focusing on infinity, and coma upon correcting rotational camera shake, respectively. FIG. 39 is graphs showing various aberrations of the zoom lens system according to Example 10 of the Lthird embodiment in the intermediate focal length state upon focusing on infinity. FIGS. 40A and 40B are graphs showing various aberrations of the zoom lens system according to Example 10 of the third embodiment in the telephoto end state upon focusing on infinity, and coma upon correcting rotational camera shake, respectively.

As is apparent from the respective graphs, the zoom lens system having a vibration reduction function according to Example 10 shows superb optical performance as a result of good corrections to various aberrations from the wide-angle end state to the telephoto end state.

Example 11

Figure 41:
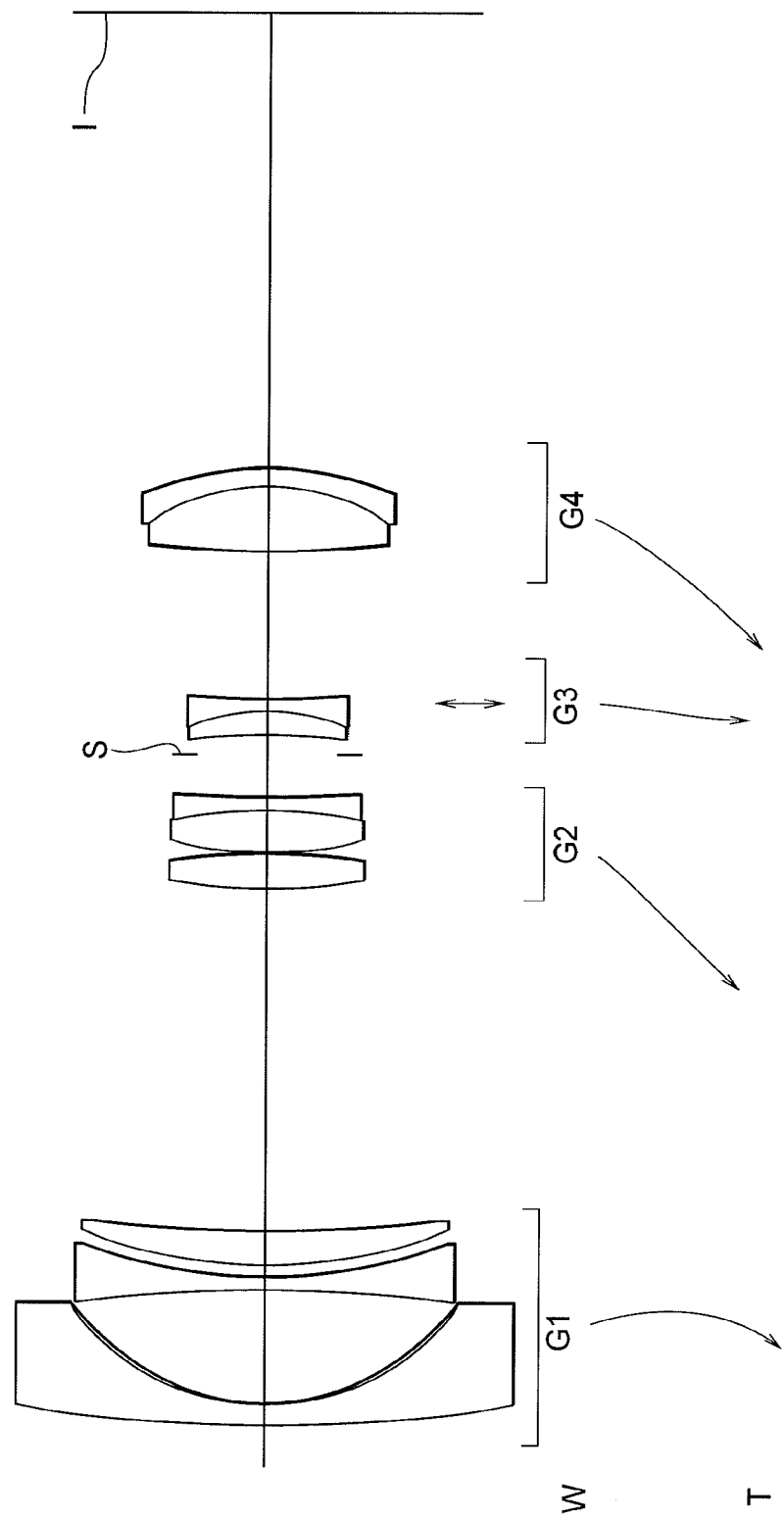
FIG. 41 is a sectional view showing a lens configuration of a zoom lens system according to Example 11 of the third embodiment in the wide-angle end state.

FIG. 41 is a sectional view showing a lens configuration of a zoom lens system having a vibration reduction function according to Example 11 of the third embodiment in a wide angle end state.

The zoom lens system having a vibration reduction function according to Example 11 is composed of as shown in FIG. 41, in order from an object, a first lens group G1 having negative refractive power, a second lens group G2 having positive refractive power, an aperture stop S, a third lens group G3 having negative refractive power, and a fourth lens group G4 having positive refractive power.

The first lens group G1 is composed of, in order from the object, a negative meniscus lens having a convex surface facing the object, a double concave negative lens, and a positive meniscus lens having a convex surface facing the object. The most object side negative meniscus lens is an aspherical lens on which an aspherical surface is formed by forming a resin layer on the image plane I side of the glass lens surface.

The second lens group G2 is composed of, in order from the object, a double convex positive lens, and a cemented lens constructed by a double convex positive lens cemented with a double concave negative lens.

The third lens group G3 is composed of a cemented lens constructed by, in order from the object, a positive meniscus lens having a concave surface facing the object cemented with a double concave negative lens.

The fourth lens group G4 is composed of a cemented lens constructed by, in order from the object, a double convex positive lens cemented with a negative meniscus lens having a convex surface facing the image plane I side. The cemented lens is an aspherical lens on which an aspherical surface is formed by forming a resin layer on the object side glass lens surface.

The aperture stop S is disposed between the second lens group G2 and the third lens group G3, and is moved together with the third lens group G3 upon zooming from the wide-angle end state to the telephoto end state.

Upon zooming from the wide-angle end state to the telephoto end state, the first lens group G1 is moved along a trajectory having a convex shape facing the image plane T, and the second lens group G2, the third lens group G3, and the fourth lens group G4 are moved to the object side.

In the wide-angle end state in Example 11, the vibration reduction coefficient K is 1.024, and the focal length is 19.0 (mm), so that the moving amount of the third lens group G3 for correcting a rotational camera shake of 0.725 degrees is 0.234 (mm). In the telephoto end state, the vibration reduction coefficient K is 1.785, and the focal length is 54.0 (mm), so that the moving amount of the third lens group G3 for correcting a rotational camera shake of 0.430 degrees is 0.227 (mm).

Various values associated with the zoom lens system having a vibration reduction function according to Example 11 are listed in Table 11.

TABLE 11

| Specifications | | |
|---|---|---|
| | W | T |
| f = | 19.0 | 54.0 |
| FNO = | 3.65 | 5.88 |

| Lens Data | | | | |
|---|---|---|---|---|
| N | r | d | vd | nd |
| 1 | 110.000 | 1.70 | 64.12 | 1.5168 |
| 2 | 17.200 | 0.10 | 38.09 | 1.5539 |
| 3 | 14.913 | 9.50 | | |
| 4 | −97.315 | 1.00 | 64.12 | 1.5168 |
| 5 | 36.219 | 1.00 | | |
| 6 | 33.516 | 2.90 | 27.51 | 1.7552 |
| 7 | 114.806 | D7 | | |
| 8 | 35.379 | 3.00 | 64.12 | 1.5168 |
| 9 | −40.809 | 0.10 | | |
| 10 | 25.811 | 3.50 | 64.12 | 1.5168 |
| 11 | −29.800 | 1.00 | 35.04 | 1.7495 |
| 12 | 82.862 | D12 | | |
| 13 | 0.000 | 1.78 | Aperture Stop S | |
| 14 | −46.332 | 2.00 | 32.35 | 1.8503 |
| 15 | −14.027 | 1.00 | 46.58 | 1.8040 |
| 16 | 62.280 | D16 | | |
| 17 | 69.419 | 0.07 | 38.09 | 1.5539 |
| 18 | 69.419 | 5.50 | 65.47 | 1.6030 |
| 19 | −14.809 | 1.50 | 25.43 | 1.8052 |
| 20 | −22.287 | Bf | | |

Aspherical Data

Surface Number: 3

κ = 0
C4 = 1.6377E−05
C6 = 2.4342E−08
C8 = −1.5364E−11
C10 = 2.1684E−13

Surface Number: 16
Effective Diameter H = 5.56

κ = 17.882
C4 = −1.1191E−05
C6 = 0.0000E+00
C8 = 0.0000E+00
C10 = 0.0000E+00

TABLE 11-continued

Surface Number: 17

κ = 32.566
C4 = −3.2797E−05
C6 = −6.0249E−08
C8 = 9.8569E−10
C10 = −1.0180E−11

| Variable Distances | | | |
|---|---|---|---|
| | W | M | T |
| D7 = | 28.74 | 9.04 | 1.72 |
| D12 = | 3.64 | 9.50 | 15.34 |
| D16 = | 12.59 | 6.73 | 0.89 |
| Bf = | 39.37 | 51.65 | 68.44 |

| Values for Conditional Expressions | |
|---|---|
| (1): f2/fW = | 1.52 |
| (2): f3/fW = | −1.88 |
| (8): \|ASPd0.5\|/(H/2) = | 0.0000492 |
| (9): \|ASPd1.0\|/(H/2) = | 0.000604 |
| (10): \|ASPd0.5\|/\|ASPd1.0\| = | 0.081 |

Figure 42A:
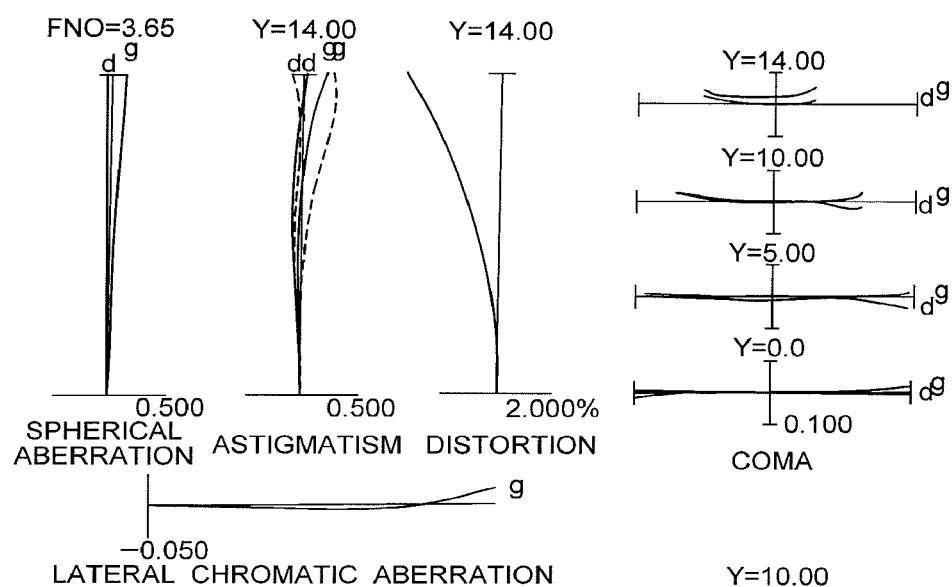
FIGS. 42A and 42B are graphs showing various aberrations of the zoom lens system according to Example 11 of the third embodiment in the wide-angle end state upon focusing on infinity, and coma upon correcting camera shake, respectively.
Figure 42B:
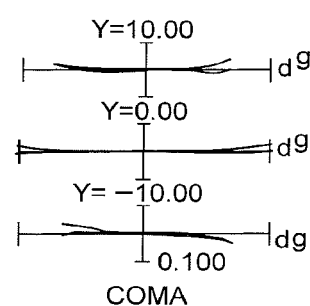
Figure 43:
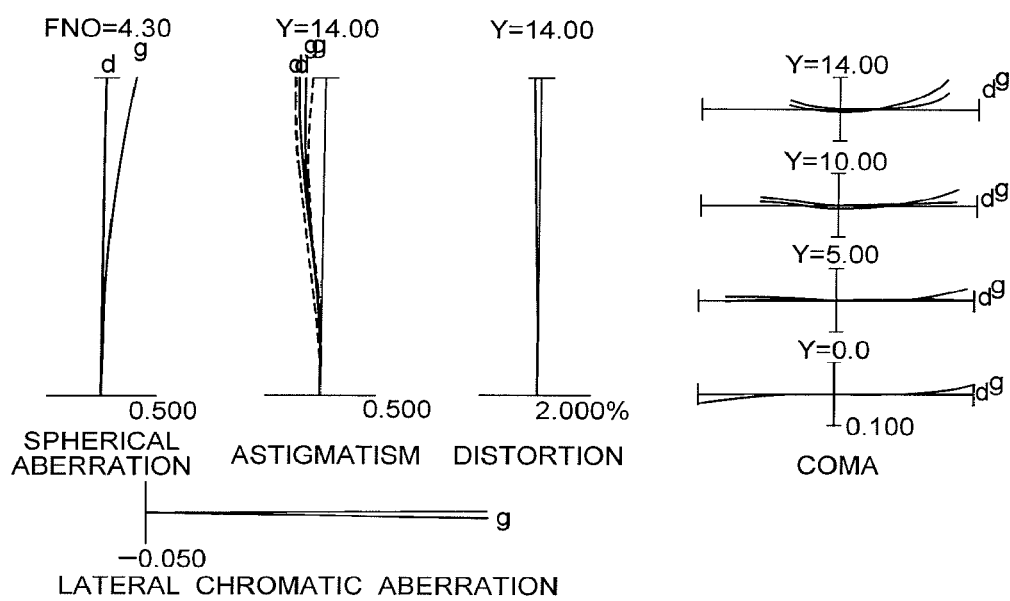
FIG. 43 is graphs showing various aberrations of the zoom lens system according to Example 11 of the third embodiment in the intermediate focal length state upon focusing on infinity.
Figure 44A:
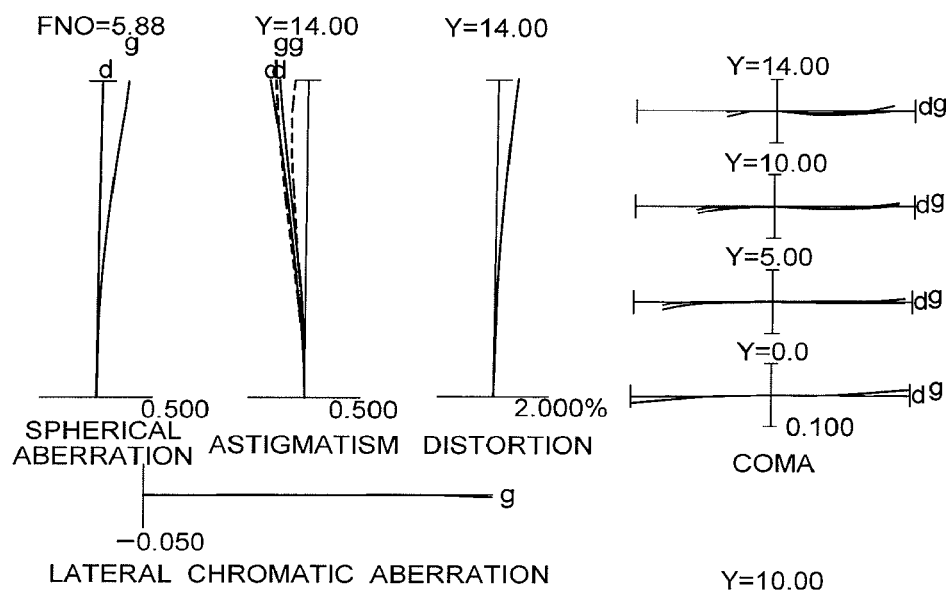
FIGS. 44A and 44B are graphs showing various aberrations of the zoom lens system according to Example 11 of the third embodiment in the telephoto end state upon focusing on infinity, and coma upon correcting camera shake, respectively.
Figure 44B:
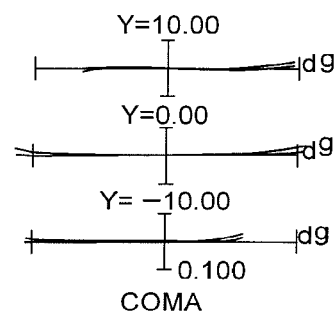

FIGS. 42A and 42B are graphs showing various aberrations of the zoom lens system according to Example 11 of the third embodiment in the wide-angle end state upon focusing on infinity, and coma upon correcting rotational camera shake, respectively. FIG. 43 is graphs showing various aberrations of the zoom lens system according to Example 11 of the third embodiment in the intermediate focal length state upon focusing on infinity. FIGS. 44A and 44B are graphs showing various aberrations of the zoom lens system according to Example 11 of the third embodiment in the telephoto end state upon focusing on infinity, and coma upon correcting rotational camera shake, respectively.

As is apparent from the respective graphs, the zoom lens system having a vibration reduction function according to Example 11 shows superb optical performance as a result of good corrections to various aberrations from the wide-angle end state to the telephoto end state.

Example 12

FIG. 45 is a sectional view showing a lens configuration of a zoom lens system having a vibration reduction function according to Example 12 of the third embodiment in a wide-angle end state.

The zoom lens system having a vibration reduction function according to Example 12 is composed of as shown in FIG. 45, in order from an object, a first lens group G1 having negative refractive power, a second lens group G2 having positive refractive power, an aperture stop S, a third lens group G3 having negative refractive power, and a fourth lens group G4 having positive refractive power.

The first lens group G1 is composed of, in order from the object, a negative meniscus lens having a convex surface facing the object, a double concave negative lens, and a positive meniscus lens having a convex surface facing the object. The most object side negative meniscus lens is an aspherical lens on which an aspherical surface is formed by forming a resin layer on the image plane I side of the glass lens surface.

The second lens group G2 is composed of, in order from the object, a cemented lens constructed by a negative meniscus lens having a convex surface facing the object cemented with a double convex positive lens, and a positive meniscus lens having a convex surface facing the object.

The third lens group G3 is composed of a cemented lens constructed by, in order from the object, a positive meniscus lens having a concave surface facing the object cemented with a double concave negative lens.

The fourth lens group G4 is composed of, in order from the object, a double convex positive lens, and a cemented lens constructed by a double convex positive lens cemented with a negative meniscus lens having a convex surface facing the image plane I side.

The aperture stop S is disposed between the second lens group G2 and the third lens group G3, and is moved together with the third lens group G3 upon zooming from the wide-angle end state to the telephoto end state.

Upon zooming from the wide-angle end state to the telephoto end state, the first lens group G1 is moved along a trajectory having a convex shape facing the image plane I, and the second lens group G2, the third lens group G3, and the fourth lens group G4 are moved to the object side.

In the zoom lens system having a vibration reduction function according to Example 12, an image blur on the image plane is corrected by moving the third lens group G3 group in a direction perpendicular to the optical axis.

In the wide-angle end state in Example 12, the vibration reduction coefficient K is 1.162, and the focal length is 18.5 (mm), so that the moving amount of the third lens group G3 for correcting a rotational camera shake of 0.734 degrees is 0.204 (mm).

In the telephoto end state, the vibration reduction coefficient K is 2.037, and the focal length is 53.5 (mm), so that the moving amount of the third lens group G3 for correcting a rotational camera shake of 0.432 degrees is 0.198 (mm).

Various values associated with the zoom lens system having a vibration reduction function according to Example 12 are listed in Table 12.

TABLE 12

| Specifications | | |
| --- | --- | --- |
| | W | T |
| f = | 18.5 | 53.5 |
| FNO = | 3.6 | 5.8 |

| Lens Data | | | | |
| --- | --- | --- | --- | --- |
| N | r | d | vd | nd |
| 1 | 116.280 | 1.9 | 58.9 | 1.51823 |
| 2 | 16.299 | 0.2 | 38.09 | 1.55389 |
| 3 | 13.699 | 10.0 | | |
| 4 | −713.443 | 1.3 | 64.12 | 1.51680 |
| 5 | 32.842 | 1.2 | | |
| 6 | 26.928 | 2.9 | 27.51 | 1.75520 |
| 7 | 55.608 | D7 | | |
| 8 | 26.524 | 1.0 | 27.51 | 1.75520 |
| 9 | 15.327 | 4.1 | 64.12 | 1.51680 |
| 10 | −59.620 | 0.1 | | |
| 11 | 25.800 | 2.2 | 64.12 | 1.51680 |
| 12 | 82.059 | D12 | | |
| 13 | 0.000 | 2.6 | Aperture Stop S | |
| 14 | −38.072 | 2.1 | 28.69 | 1.79504 |
| 15 | −13.274 | 1.4 | 50.24 | 1.71999 |
| 16 | 63.523 | D16 | | |
| 18 | 253.480 | 3.0 | 64.12 | 1.51680 |
| 19 | −22.683 | 0.2 | | |
| 20 | 135.687 | 3.7 | 64.12 | 1.51680 |
| 21 | −18.552 | 1.0 | 28.69 | 1.79504 |
| 22 | −70.947 | Bf | | |

TABLE 12-continued

| Aspherical Data |
| --- |
| Surface Number: 3 |
| κ = 0 |
| C4 = 2.3519E−05 |
| C6 = 4.6561E−08 |
| C8 = −1.0850E−10 |
| C10 = 6.4207E−13 |
| Surface Number: 14 |
| Effective Diameter H = 6.11 |
| κ = 0 |
| C4 = −9.0304E−07 |
| C6 = −6.8311E−09 |
| C8 = 0.00E+00 |
| C10 = 0.00E+00 |
| Surface Number: 18 |
| κ = 1 |
| C4 = −9.1652E−06 |
| C6 = −3.3073E−08 |
| C8 = 2.4437E−10 |
| C10 = 1.3217E−13 |

| Variable Distances | | | |
| --- | --- | --- | --- |
| | W | M | T |
| D7 = | 32.98 | 20.45 | 1.20 |
| D12 = | 1.89 | 3.84 | 10.08 |
| D16 = | 12.20 | 10.26 | 4.01 |
| Bf = | 37.79 | 42.86 | 69.35 |

| Values for Conditional Expressions | |
| --- | --- |
| (1): f2/fW = | 1.55 |
| (2): f3/fW = | −2.04 |
| (8): \|ASPd0.5\|/(H/2) = | 0.0000373 |
| (9): \|ASPd1.0\|/(H/2) = | 0.000517 |
| (10): \|ASPd0.5\|/\|ASPd1.0\| = | 0.072 |

Figure 46A:
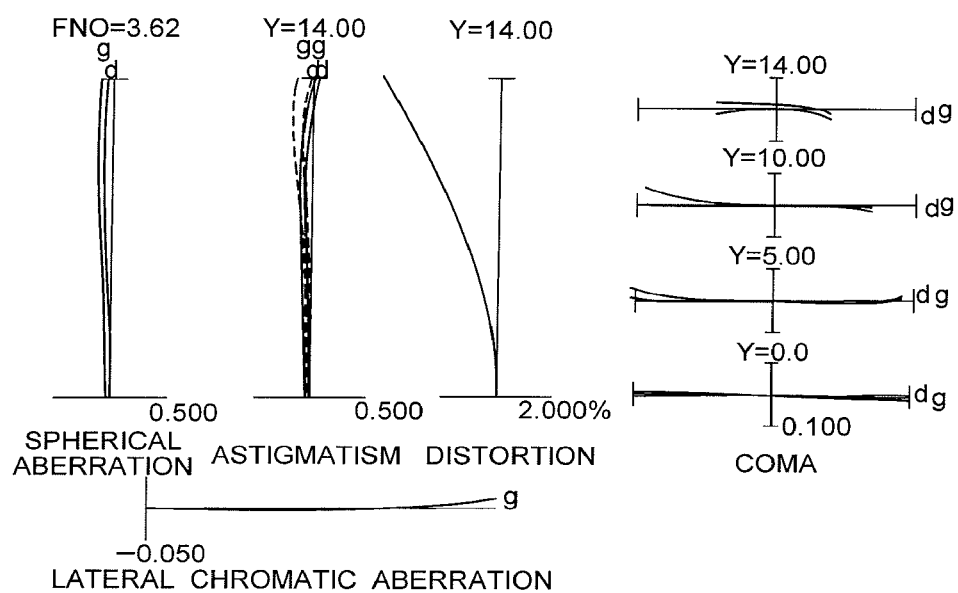
FIGS. 46A and 46B are graphs showing various aberrations of the zoom lens system according to Example 12 of the third embodiment in the wide-angle end state upon focusing on infinity, and coma upon correcting camera shake, respectively.
Figure 46B:
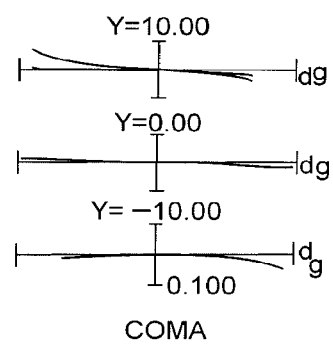
Figure 47:
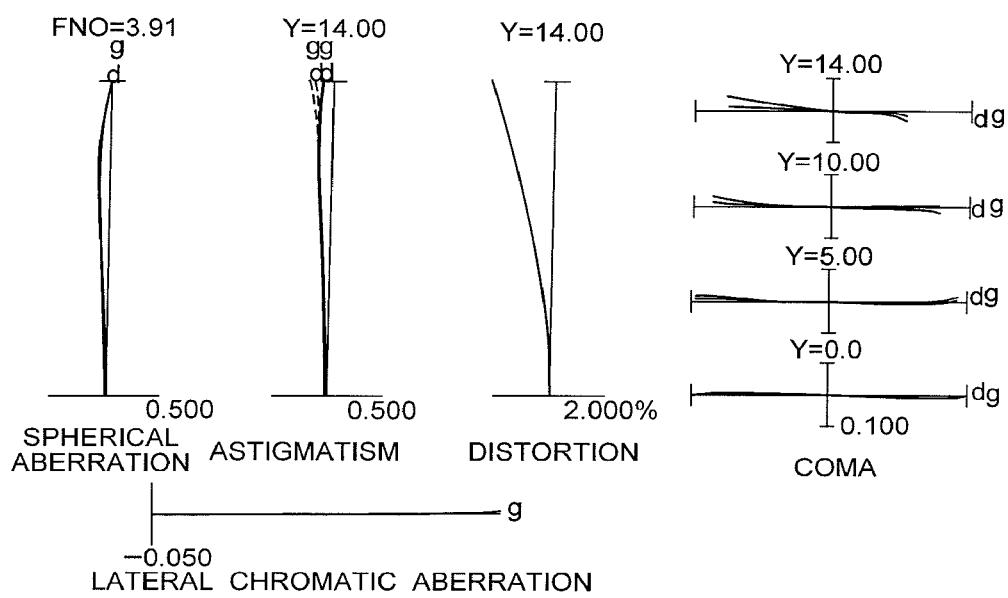
FIG. 47 is graphs showing various aberrations of the zoom lens system according to Example 12 of the third embodiment in the intermediate focal length state upon focusing on infinity.
Figure 48A:
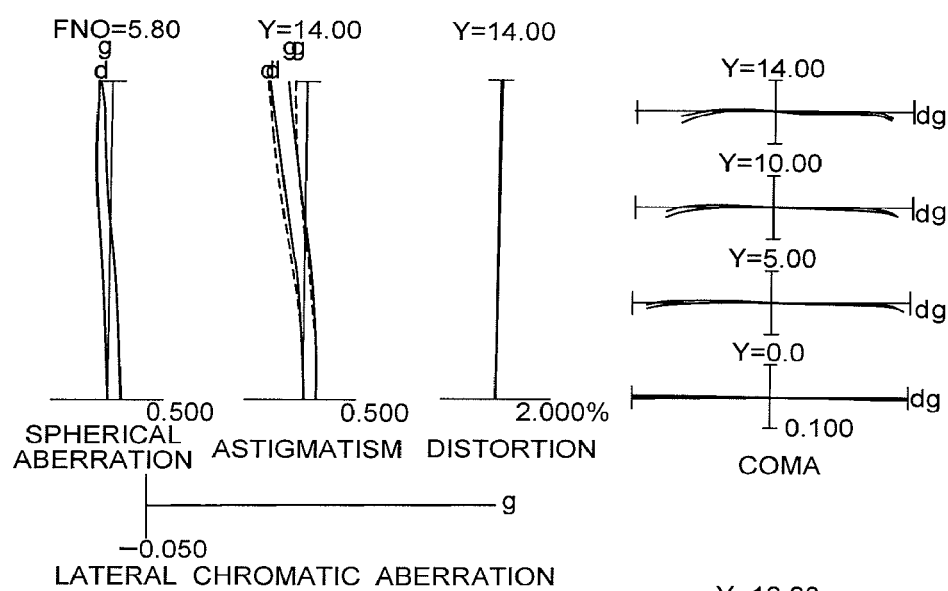
FIGS. 48A and 48B are graphs showing various aberrations of the zoom lens system according to Example 12 of the third embodiment in the telephoto end state upon focusing on infinity, and coma upon correcting camera shake, respectively.
Figure 48B:
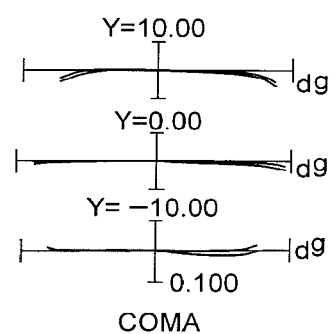

FIGS. 46A and 46B are graphs showing various aberrations of the zoom lens system according to Example 12 of the third embodiment in the wide-angle end state upon focusing on infinity, and coma upon correcting rotational camera shake, respectively. FIG. 47 is graphs showing various aberrations of the zoom lens system according to Example 12 of the third embodiment in the intermediate focal length state upon focusing on infinity. FIGS. 48A and 48B are graphs showing various aberrations of the zoom lens system according to Example 12 of the third embodiment in the telephoto end state upon focusing on infinity, and coma upon correcting rotational camera shake, respectively.

As is apparent from the respective graphs, the zoom lens system having a vibration reduction function according to Example 12 shows superb optical performance as a result of good corrections to various aberrations from the wide-angle end state to the telephoto end state.

As described above, each embodiment makes it possible to provide a zoom lens system having a vibration reduction function with excellent optical performance capable of correcting an image blur on the image plane cased by a camera shake with keeping a high zoom ratio.

Although a four-lens-group configuration are shown as a zoom lens system having a vibration reduction function according to each Example of the present embodiment, the lens configuration according to the present embodiment is not limited to this, and is applicable to other lens configurations such as a five-lens-group configuration.

In a zoom lens system having a vibration reduction function according to the present application, in order to carry out focusing from an infinity object to a close object, a portion of a lens group, a single lens group, or a plurality of lens groups may be moved along the optical axis. The focusing lens group(s) may be used for auto focus, and suitable for being driven by a motor such as an ultrasonic motor. It is preferable that the first lens group G1 or a portion thereof is used for the focusing lens group.

In each Example shown above, although the third lens group G3 or a portion thereof is moved as a vibration reduction lens group in a direction perpendicular to the optical axis, another lens group or a portion thereof, in particular, the second lens group G2 or the fourth lens group G4 may be made as a vibration reduction lens group In a zoom lens system having a vibration reduction function according to the present application, any lens surface composing the high zoom ratio zoom lens system according to the present application may be an aspherical surface. The aspherical surface may be fabricated by a fine grinding process, a glass molding process that a glass material is formed into an aspherical shape by a mold, or a compound type process that a resin material is formed into an aspherical shape on a glass surface.

An antireflection coating having high transmittance over a broad wavelength range may be applied to each lens surface of the zoom lens system having a vibration reduction function according to the present application to reduce flare or ghost images, so that high optical performance with a high contrast can be attained.

Then, an imaging apparatus (a single-lens reflex camera) equipped with the zoom lens system having a vibration reduction function according to present application is explained.

Figure 49:
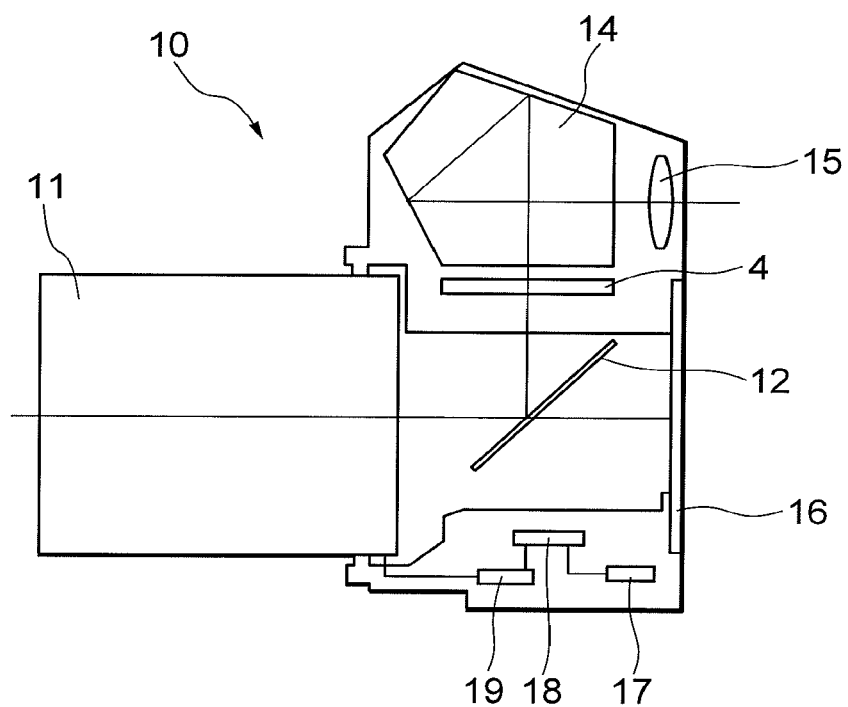
FIG. 49 is a diagram showing an imaging apparatus (camera) equipped with the zoom lens system with a vibration reduction function according to Example 1 of the first embodiment.

FIG. 49 is a diagram showing an imaging apparatus (camera) equipped with the zoom lens system with a vibration reduction function according to Example 1 of the first embodiment.

In FIG. 49, light coming out from an object (not shown) is converged by a zoom lens system 11 with a vibration reduction function, reflected by a quick return mirror 12, and focused on a focusing screen 4. The object image focused on the focusing screen 4 is reflected a plurality of times by a pentagonal roof prism 14, and observed by a photographer as an erected image through an eyepiece 15.

After fixing a picture composition with observing the object image through the eyepiece 15 by half-pressing a release button (not shown), the photographer presses the release button all the way down. Upon pressing the release button all the way down, the quick return mirror 12 is flipped up, the light from the object is detected by an imaging device 16, and a photographed image is captured and stored in a memory (not shown).

When the release button is pressed all the way down, a tilt of the camera 10 is detected by a sensor 17 such as an angular sensor stored in the camera 10, and transmitted to a CPU 18. Then, an amount of a rotational camera shake is detected by the CPU 18, a lens driver 19 for driving a vibration reduction lens group in a direction perpendicular to the optical axis is driven, and an image blur on the imaging device 16 upon generating a camera shake is corrected. In this manner, the imaging apparatus 10 using the zoom lens system 11 with a vibration reduction function is constructed.

The above described each example only shows a specific example, and the present application is not limited to the above-described construction or configuration, so that suitable modification and alteration may be made without departing from the spirit or scope of the invention.

What is claimed is:

1. A zoom lens system comprising, in order from an object:
a first lens group having negative refractive power;
a second lens group having positive refractive power;
a third lens group having negative refractive power; and
a fourth lens group having positive refractive power;
an aperture stop being disposed between the second lens group and the third lens group,
upon zooming from a wide-angle end state to a telephoto end state, each lens group being moved such that a distance between the second lens group and the third lens group varies, and a distance between the third lens group and the fourth lens group varies, and the aperture stop being moved together with the third lens group, and
the following conditional expressions being satisfied:

$$1.64 \leq f2/fw < 1.80$$

$$-2.10 < f3/fw \leq -1.88$$

$$0.98 \leq f2/(-f3) < 1.5$$

where f2 denotes a focal length of the second lens group, f3 denotes a focal length of the third lens group, and fw denotes a focal length of the zoom lens system in the wide-angle end state,
wherein the fourth lens group is composed of three lenses or less.

2. The zoom lens system according to claim 1, wherein upon zooming from the wide-angle end state to the telephoto end state, the first lens group is moved at first to an image plane side then to the object side.

3. The zoom lens system according to claim 1, wherein the following conditional expression is satisfied:

$$-0.3 < (d1w - d1t)/Y\max < 0.17$$

where d1w denotes a distance along an optical axis between a most object side lens surface of the zoom lens system to an image plane in the wide-angle end state, d1t denotes a distance along an optical axis between the most object side lens surface of the zoom lens system to the image plane in the telephoto end state, and Ymax denotes a maximum image height.

4. A method for zooming a zoom lens system including, in order from an object, a first lens group having negative refractive power, a second lens group having positive refractive power, a third lens group having negative refractive power, and a fourth lens group having positive refractive power, the method comprising:
providing an aperture stop between the second lens group and the third lens group;
moving each lens group upon zooming from a wide-angle end state to a telephoto end state such that a distance between the second lens group and the third lens group varies, and a distance between the third lens group and the fourth lens group varies;
moving aperture stop together with the third lens group upon zooming from the wide-angle end state to the telephoto end state; and
satisfying the following conditional expressions:

$$1.64 \leq f2/fw < 1.80$$

$$-2.10 < f3/fw \leq -1.88$$

$$0.98 \leq f2/(-f3) < 1.5$$

where f2 denotes a focal length of the second lens group, f3 denotes a focal length of the third lens group, and fw denotes a focal length of the zoom lens system in the wide-angle end state, wherein the fourth lens group is composed of three lenses or less.

5. The zoom lens system according to claim 4, further comprising:
shifting at least a portion of the third lens group in a direction perpendicular to an optical axis as a vibration reduction lens group.

6. A zoom lens system comprising, in order from an object:
a first lens group having negative refractive power;
a second lens group having positive refractive power;
a third lens group having negative refractive power; and
a fourth lens group having positive refractive power;
an aperture stop being disposed between the second lens group and the third lens group,
upon zooming from a wide-angle end state to a telephoto end state, each lens group being moved such that a distance between the second lens group and the third lens group varies, and a distance between the third lens group and the fourth lens group varies, and the aperture stop being moved together with the third lens group,
the fourth lens group being composed of, in order from an image plane side, a cemented lens constructed by a negative lens cemented with a positive lens, and a single lens having positive refractive power, and
the following conditional expressions being satisfied:

$1.52 \leq f2/fw < 1.80$ $-2.10 < f3/fw \leq -1.88$ $-0.3 < (d1w-d1t)/Ymax < 0.17$ where f2 denotes a focal length of the second lens group, f3 denotes a focal length of the third lens group, fw denotes a focal length of the zoom lens system in the wide-angle end state, d1w denotes a distance along an optical axis between a most object side lens surface of the zoom lens system to an image plane in the wide-angle end state, d1t denotes a distance along the optical axis between the most object side lens surface of the zoom lens system to the image plane in the telephoto end state, and Ymax denotes a maximum image height.

7. The zoom lens system according to claim 6, wherein upon zooming from the wide-angle end state to the telephoto end state, the distance between the second lens group and the third lens group increases, the distance between the third lens group and the fourth lens group decreases.

8. The zoom lens system according to claim 6, wherein the third lens group has a cemented lens.

9. The zoom lens system according to claim 6, wherein each of the second lens group, third lens group, and the fourth lens group has at least one cemented lens.

10. The zoom lens system according to claim 6, wherein a most image plane side lens surface of the zoom lens system has a convex shape facing an image plane.

11. The zoom lens system according to claim 6, wherein the first lens group includes at least one aspherical surface.

12. The zoom lens system according to claim 6, wherein at least one portion of the third lens group is moved as a vibration reduction lens group in a direction perpendicular to an optical axis.

13. The zoom lens system according to claim 12, wherein the vibration reduction lens group includes at least one aspherical surface.

14. The zoom lens system according to claim 13, wherein the at least one aspherical surface in the third lens group has a shape that positive refractive power becomes stronger or negative refractive power becomes weaker from the optical axis to the periphery in comparison with a spherical surface having a paraxial radius of curvature, and the following conditional expressions are satisfied:

$0.00001 < |ASPd0.5|/(H/2) < 0.01$ $0.0001 < |ASPd1.0|/(H/2) < 0.01$ $|ASPd0.5|/|ASPd1.0| < 1$ where H denotes an effective diameter of the aspherical lens, ASPd0.5 denotes difference between the aspherical surface and the paraxial radius of curvature at the 50% height of the effective diameter of the aspherical surface, and ASPd1.0 denotes difference between the aspherical surface and the paraxial radius of curvature at the 100% height of the effective diameter of the aspherical surface.

15. The zoom lens system according to claim 12, wherein the third lens group includes a cemented lens.

16. The zoom lens system according to claim 12, wherein the first lens group is composed of three lenses or less and includes at least one aspherical surface.

17. The zoom lens system according to claim 12, wherein the most object side lens of the first lens group is a negative lens whose image plane side surface is formed with an aspherical surface.

18. The zoom lens system according to claim 12, wherein the fourth lens group is composed of three lenses or less, and includes at least one aspherical surface.

19. The zoom lens system according to claim 12, wherein each of the second lens group through the fourth lens group includes at least one cemented lens.

20. The zoom lens system according to claim 12, wherein a most image plane side lens surface is a convex surface facing the image plane.

21. An imaging apparatus equipped with the zoom lens system according to claim 6.

22. A zoom lens system comprising, in order from an object:
a first lens group having negative refractive power;
a second lens group having positive refractive power;
a third lens group having negative refractive power; and
a fourth lens group having positive refractive power;
an aperture stop being disposed between the second lens group and the third lens group,
upon zooming from a wide-angle end state to a telephoto end state, each lens group being moved such that a distance between the second lens group and the third lens group varies, and a distance between the third lens group and the fourth lens group varies, and the aperture stop being moved together with the third lens group, and
the following conditional expressions being satisfied:

$1.2 < f2/fw \leq 1.64$ $-2.10 < f3/fw < -1.88$ $-0.3 < (d1w-d1t)/Ymax < 0.17$ $0.72 < f2/(-f3) \leq 0.806$ where f2 denotes a focal length of the second lens group, f3 denotes a focal length of the third lens group, and fw denotes a focal length of the zoom lens system in the wide-angle end state, d1w denotes a distance along an optical axis between a most object side lens surface of the zoom lens system to an image plane in the wide-angle end state, d1t denotes a distance along the optical axis between the most object side lens surface of the zoom lens system to the image plane in the telephoto end state, and Ymax denotes a maximum image height, wherein the fourth lens group is composed of three lenses or less.

23. A method for zooming a zoom lens system including, in order from an object, a first lens group having negative refractive power, a second lens group having positive refractive power, a third lens group having negative refractive power, and a fourth lens group having positive refractive power, the method comprising:

provides an aperture stop between the second lens group and the third lens group;

moving each lens group upon zooming from a wide-angle end state to a telephoto end state such that a distance between the second lens group and the third lens group varies, and a distance between the third lens group and the fourth lens group varies;

moving the aperture stop together with the third lens group upon zooming from a wide-angle end state to a telephoto end state;

disposing the fourth lens group to be composed of, in order from an image plane side, a cemented lens constructed by a negative lens cemented with a positive lens, and a single lens having positive refractive power, and satisfying the following conditional expressions:

$1.52 \leq f2/fw < 1.80$ $-2.10 < f3/fw \leq -1.88$ $-0.3 < (d1w - d1t)/Y\max < 0.17$ where f2 denotes a focal length of the second lens group, f3 denotes a focal length of the third lens group, fw denotes a focal length of the zoom lens system in the wide-angle end state, d1w denotes a distance along an optical axis between a most object side lens surface of the zoom lens system to an image plane in the wide-angle end state, d1t denotes a distance along the optical axis between the most object side lens surface of the zoom lens system to the image plane in the telephoto end state, and Ymax denotes a maximum image height.

24. A method for zooming a zoom lens system including, in order from an object, a first lens group having negative refractive power, a second lens group having positive refractive power, a third lens group having negative refractive power, and a fourth lens group having positive refractive power, the method comprising:

providing an aperture stop between the second lens group and the third lens group;

moving each lens group upon zooming from a wide-angle end state to a telephoto end state such that a distance between the second lens group and the third lens group varies, and a distance between the third lens group and the fourth lens group varies;

moving the aperture stop together with the third lens group upon zooming from a wide-angle end state to a telephoto end state; and satisfying the following conditional expressions:

$1.2 < f2/fw \leq 1.64$ $-2.10 < f3/fw \leq -1.88$ $-0.3 < (d1w - d1t)/Y\max < 0.17$ $0.72 < f2/(-f3) \leq 0.806$ where f2 denotes a focal length of the second lens group, f3 denotes a focal length of the third lens group, fw denotes a focal length of the zoom lens system in the wide-angle end state, d1w denotes a distance along an optical axis between a most object side lens surface of the zoom lens system to an image plane in the wide-angle end state, d1t denotes a distance along the optical axis between the most object side lens surface of the zoom lens system to the image plane in the telephoto end state, and Ymax denotes a maximum image height, wherein the fourth lens group is composed of three lenses or less.

* * * * *